United States Patent
Tanaka et al.

(10) Patent No.: US 8,391,110 B2
(45) Date of Patent: Mar. 5, 2013

(54) PLAYBACK DEVICE, RECORDING MEDIUM, PLAYBACK METHOD AND PROGRAM

(75) Inventors: Keiichi Tanaka, Osaka (JP); Hidetaka Oto, Osaka (JP); Toshihisa Nakano, Osaka (JP); Takahiro Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/113,573

(22) Filed: May 23, 2011

(65) Prior Publication Data
US 2012/0002520 A1 Jan. 5, 2012

Related U.S. Application Data

(60) Provisional application No. 61/360,552, filed on Jul. 1, 2010.

(51) Int. Cl.
*G11B 7/00* (2006.01)
(52) U.S. Cl. ............... 369/30.05; 369/84; 369/47.12; 386/279
(58) Field of Classification Search ............... 369/84, 369/47.12, 47.15, 30.04, 30.19, 30.07–30.09, 369/59.23, 59.24, 30.05; 386/428, 279; 709/217–219
See application file for complete search history.

(56) References Cited

U.S. PATENT DOCUMENTS

| | | | |
|---|---|---|---|
| 2006/0143666 A1* | 6/2006 | Okada et al. ............ | 725/89 |
| 2006/0155786 A1 | 7/2006 | Seo et al. | |
| 2007/0070828 A1* | 3/2007 | Watanabe et al. ......... | 369/30.19 |
| 2007/0086727 A1* | 4/2007 | Tanaka et al. ............ | 386/95 |
| 2007/0220021 A1* | 9/2007 | Kato et al. ............... | 707/100 |
| 2007/0263514 A1* | 11/2007 | Iwata et al. ............. | 369/84 |
| 2009/0313621 A1* | 12/2009 | Dewa ..................... | 719/313 |
| 2009/0324196 A1* | 12/2009 | Ueda et al. .............. | 386/94 |
| 2009/0324197 A1 | 12/2009 | Ueda et al. | |
| 2010/0014580 A1 | 1/2010 | Tanaka et al. | |
| 2010/0142930 A1 | 6/2010 | Tanaka et al. | |
| 2010/0150529 A1* | 6/2010 | Leichsenring et al. ...... | 386/95 |
| 2010/0254679 A1* | 10/2010 | Sasaki et al. ............. | 386/108 |
| 2011/0305435 A1* | 12/2011 | Tanaka et al. ............ | 386/248 |

FOREIGN PATENT DOCUMENTS

| | | |
|---|---|---|
| JP | 9-222974 | 8/1997 |
| JP | 2004-295463 | 10/2004 |
| JP | 2007-221364 | 8/2007 |
| JP | 2007-251803 | 9/2007 |
| JP | 2008-527600 | 7/2008 |
| JP | 2010-009407 | 1/2010 |

OTHER PUBLICATIONS

International Search Report in International Application No. PCT/JP2011/002439, mail date is Aug. 16, 2011.

* cited by examiner

*Primary Examiner* — Thang Tran
(74) *Attorney, Agent, or Firm* — Greenblum & Bernstein, P.L.C.

(57) ABSTRACT

A playback device reads a BD-J application from a BD-ROM and runs the BD-J application. The BD-J application causes, by using a socket connection API, the digital copy module of the playback device to execute copying of a protected content for portable terminals to a removable recording medium and setting of a resume playback point on the copied content. The resume playback point is specified by the BD-J application according to playback time information read from the PSR set.

13 Claims, 44 Drawing Sheets

FIG. 4A  Normal playback in HDMV mode
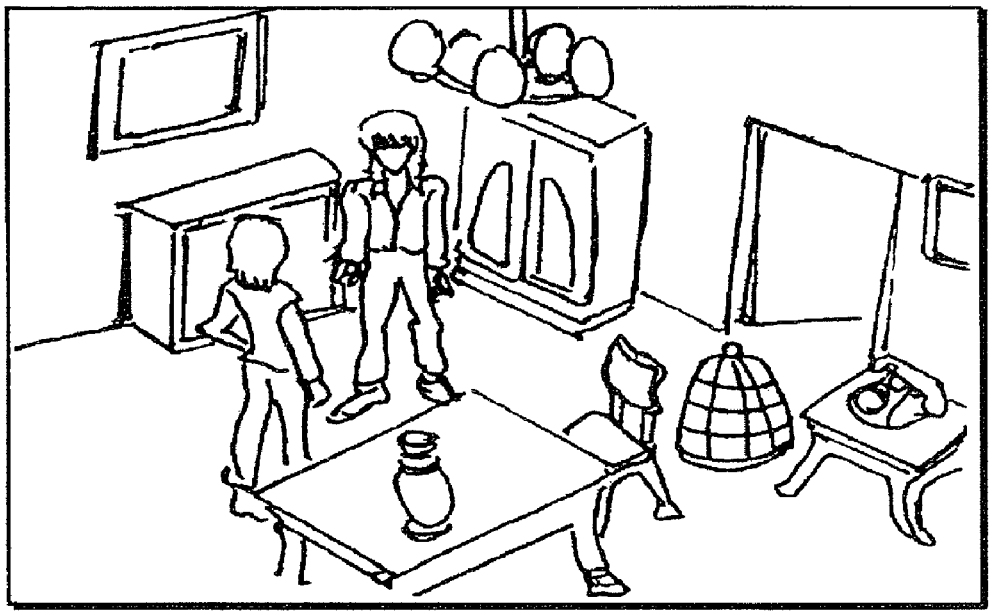
FIG. 4B  High added-value in BD-J mode
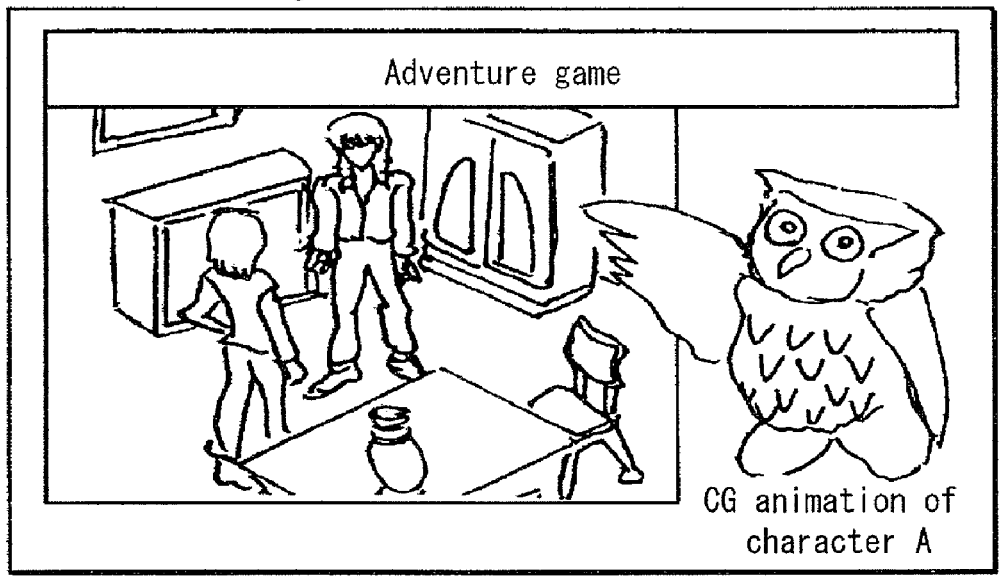

| Deleted scenes | |
|---|---|
| #1 | t1 - t2 |
| #2 | t3 - t4 |

| Added scenes | |
|---|---|
| #1 | t'0 - t'1 |
| #2 | t'4 - t'5 |

$$t'r = tr - \underbrace{[(t2-t1)+(t4-t3)]}_{\text{Deleted scenes}} + \underbrace{[(t'1-t'0)]}_{\text{Added scenes}}$$

Perform resume playback point conversion in BD-J application

Perform resume playback point conversion in playback device

FIG. 33
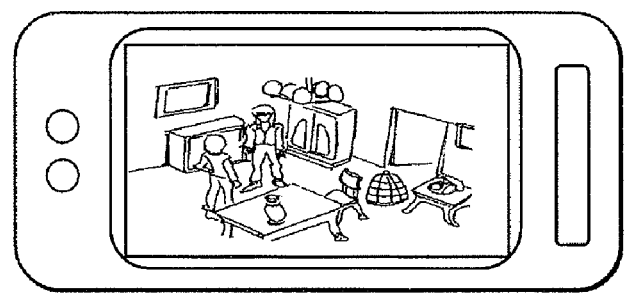
Remove SD memory card from portable terminal
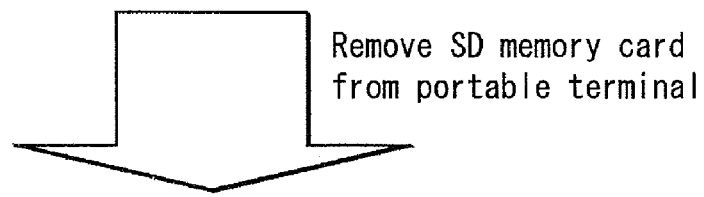
SD memory card
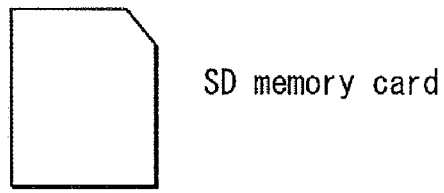
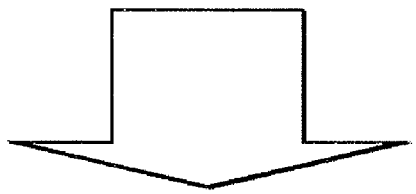
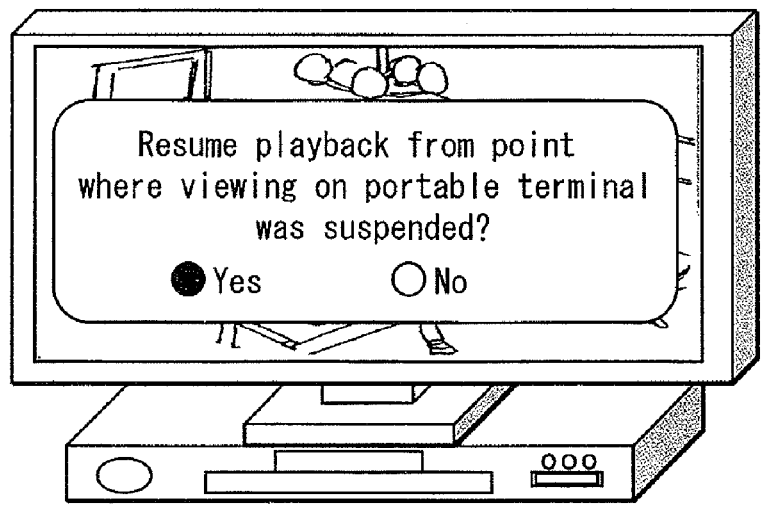
Stationary playback device

FIG. 35

Resume status storage file

| Parameter | Value |
| --- | --- |
| Mode | BD-J |
| Menu graphics stream number | 0 |
| Audio stream number | 1 |
| Subtitle stream number | 1 |
| Angle number | 1 |
| Title number | 2 |
| Chapter number | 3 |
| PlayList identifier | 1000 |
| PlayItem identifier | 1 |
| Playback time information | 1000 |
| Navigation timer | 0 |
| Selection key information | 0 |
| Page identifier | 0 |
| Subtitle style identifier | 0 |

BD-ROM

FIG. 39

<Language table>

| Storage location | | Audio | Subtitles |
|---|---|---|---|
| BD | EMOVE/DATA01 | English | Japanese |
| BD | EMOVE/DATA02 | Japanese | None |
| LS | 12345ABC/DCOPY/KOREAN | Korean | None |

<Updated language table>

| Storage location | | Audio | Subtitles |
|---|---|---|---|
| BD | EMOVE/DATA01 | English | Japanese |
| BD | EMOVE/DATA02 | Japanese | None |
| LS | 12345ABC/DCOPY/KOREAN | Korean | None |

Added

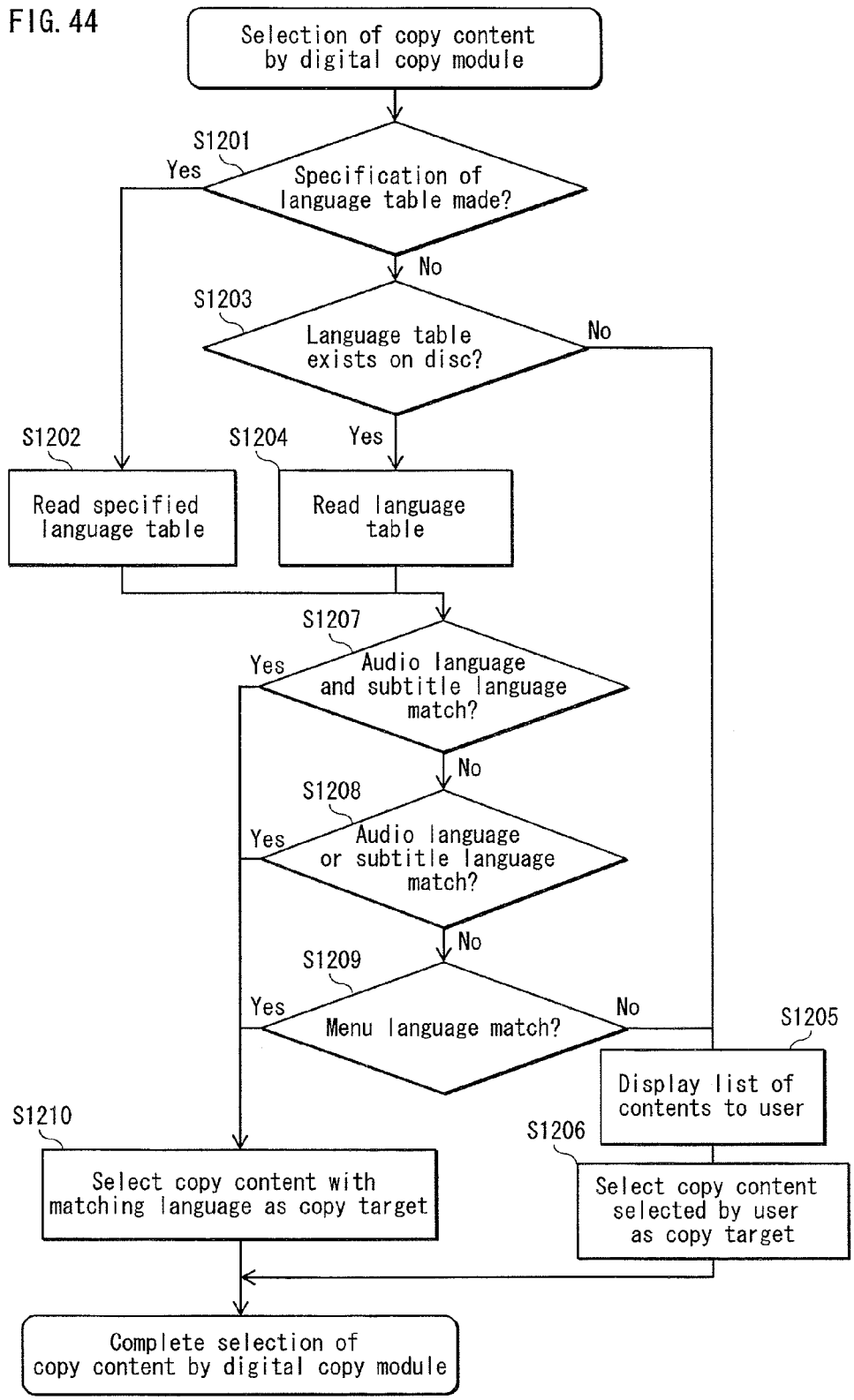

PLAYBACK DEVICE, RECORDING MEDIUM, PLAYBACK METHOD AND PROGRAM

This application claims benefit to the U.S. provisional Application 61/360,552, filed on Jul. 1, 2010.

BACKGROUND OF THE INVENTION (1) Field of the Invention

The present invention relates to a technology used for copying of data, and in particular to an inter-media copy technology of copying data recorded on one recording medium to another recording medium.

(2) Description of the Related Art

Recently, portable terminals provided with a function of playing back video contents such as movies have been gaining much popularity. With the spread of such portable terminals, there has arisen a demand among purchasers of packaged media to view contents recorded on a packaged medium not only on a stationary playback device but also on a portable terminal. So as to satisfy such a demand, Patent Literature 1 discloses a technology (managed copying) of performing backup of contents recorded on a BD-ROM (Blu-Ray Disc Read Only Memory) to another recording medium from an application recorded on the BD-ROM.

CITATION LIST

Patent Literature

[Patent Literature 1]
Japanese Patent Application Publication No. 2010-9407

SUMMARY OF THE INVENTION

Technical Problems

Viewing of contents recorded on a packaged medium on a portable terminal or the like can be realized by utilizing the managed copying technology disclosed in Patent Literature 1. More specifically, a user is able to enjoy viewing of contents recorded on a packaged medium on a portable terminal or the like by copying the contents to a portable terminal or the like. However, in general, a portable terminal has a lower processing capability compared to a stationary playback device, and this gives rise to certain problems. Especially in a case where a user executes entire backup of data on a packaged medium to a portable terminal, there is a possibility that playback may not be carried out properly, due to the portable terminal having insufficient processing capability. That is, a portable terminal may not have enough processing capability to execute applications included in the packaged medium and to decode digital streams included in the packaged medium. One way as to overcome such problems is to reconvert applications and to re-encode digital streams before executing copying thereof to a portable terminal, in such a manner that the applications may be executed and the digital streams may be decoded on the portable terminal. However, this is not a perfect measure, since the copying of contents will take a longer amount of time when such processing is incorporated in the copying. As a result, the demand of the user to take out contents as quickly as possible is not satisfied.

Another method which may be conceived, taking such problems into account, is a method of recording, on a packaged medium in advance, digital streams specially designed for viewing on a portable terminal, and performing copying of the specially-designed digital streams from an application which is similarly recorded on the packaged medium. This allows the user to quickly take out contents which have been optimized for viewing on a portable terminal. However, there exists a problem yet to be resolved concerning such a method. Specifically, the problem lies in that viewing of a content on a portable terminal cannot be resumed from a scene where viewing of the same content had been suspended on a stationary playback device.

In specific, in conventional technology, when copying of a certain content to a portable terminal is performed following viewing of the content up to a certain scene on a stationary playback device, the playback of the content on the portable terminal is started from the beginning of the content. Therefore, to view the content from a certain scene at which the viewing on the stationary playback device had been suspended, the user would have to take the trouble of fast-forwarding or skipping the contents to arrive at the certain scene. On the basis that there actually exists such a demand of the users to view contents on a portable terminal from a scene where viewing on a stationary playback device in a house or the like has been suspended, the conventional technology is unsatisfactory, especially in terms of user-friendliness. This is since, as already mentioned in the above, conventional technology does not enable the user to resume playback of contents on a portable terminal from a scene at which viewing thereof on a stationary playback device has been suspended.

One resolution to the above-described problems is causing the playback device used for playing back the contents on the packaged media to copy information such as resume information and bookmark information which have been set on the playback device to a medium for use with portable terminals. By copying such information, playback of contents on a portable terminal can be resumed from where playback on the playback device has been suspended when the medium is loaded into the portable terminal. However, there exists a problem to be solved even in such a case. The resume information and the bookmark information which have been copied to the medium for use with portable terminals maintain validity provided that the content associated to such information is copied to the medium at its original state. However, this is not always the case, since the file format of contents on the packaged media and the file format of contents on the medium for use with portable terminals differ in many cases. Such a difference in file format is problematic since the contents on the package medium and the contents on the medium are not the same in a strict sense. This means that, even if the playback device performs uniform copying of the resume information and bookmark information associated to the contents on the packaged medium to a portable terminal, the playback of the contents on the portable terminal referring to such information is not performed properly from the scene at which the viewing thereof on the stationary playback device has been suspended in many cases. As a result, transition between playback on the stationary playback device and playback on the portable terminal of the same contents is not performed smoothly.

In addition, the managed copying technology disclosed in Patent Literature 1 involves implementation of new APIs (Application Programming Interface) in a playback device. However, when realizing the special function of copying contents for use on portable terminals by expanding the original APIs held by playback devices through implementation of additional APIs, a problem occurs. In particular, when a playback device does not hold the additional APIs, the launch of an application which utilizes the additional APIs may not be executed properly. In detail, when launching an application, the playback device performs link processing between APIs used by the application and APIs implemented on the playback device. Here, if an API used by the application is not held by the playback device, a link error occurs, and the launch of the application results in failure.

One measure for avoiding such a problem is separately preparing one application which uses only existing APIs and another application which uses additional APIs, obtaining and checking information regarding the playback device such as the version thereof, and making configurations such that one of the two application is launched according to such information. However, when considering that various functions will be added in the future and that the playback devices would have to expand their APIs for each of the functions added, it can be readily assumed that the management of APIs and applications will become increasingly complex. In other words, it will become increasingly difficult to determine, from among the various APIs, which range of APIs can or cannot be safely used along with a certain application. Further, it would become extremely difficult to provide applications with a high degree of compatibility so that the applications can be executed on playback devices manufactured by different manufacturers.

For such reasons, when a new function is added to a BD-ROM, APIs corresponding to the newly-added function is carefully defined by a standards developing organization or the like such that there would be no compatibility issues concerning the newly defined APIs. Further, additional APIs are disclosed to device manufacturers and application developers. All such measures are taken so as to clarify which range of APIs can or cannot be safely used with certain applications, and also to ensure that a BD-ROM having the newly added function may be played back without any problems even on comparatively old playback devices.

However, if such measures are to be taken every time a new function is added, the defining of additional APIs will be carried out in an excessively careful manner, and accordingly, a longer time will be required until additional APIs are finally defined. This would ultimately result in a holdback in the evolution of services brought about by playback devices and applications. Additionally, it should be noted that newly-added APIs are disclosed to others as mentioned above. Therefore, even if a device manufacturer or the like develops a unique service which can be realized by using newly-added APIs, the service will be readily copied by others when the APIs are disclosed, and hence, it would be difficult for manufacturers to distinguish their own playback devices over other playback devices.

The present invention has been made in view of the aforementioned problems, and provides a playback device that performs copying of a content for use on a portable terminal while retaining a point on the content where playback has been suspended during playback thereof on the playback device. Further, the playback device of the present invention is capable of performing such copying without the need of expanding existing APIs.

Solution to Problems

In view of the above-described problems, the present invention provides a playback device for playing back a first content recorded on a first recording medium and copying a second content recorded on the first recording medium to a second recording medium, the playback device comprising: a platform unit configured to read a bytecode application recorded on the first recording medium and run the bytecode application; a copy control unit configured to execute copy control processing of the second content; and a register configured to store a parameter indicating a playback point on the first content, the playback point on the first content updated as the playback of the first content progresses, wherein the platform unit includes a communication programming interface for use by the bytecode application, and the bytecode application (i) reads the parameter from the register, (ii) establishes a socket connection with the copy control unit by using the communication programming interface, and (iii) causes the copy control unit to execute the copy control processing via the socket connection, the copy control processing including the copying of the second content to the second recording medium and setting of a playback point on the copied second content, the playback point on the copied second content specified by the bytecode application according to the parameter.

Advantageous Effects of Invention

According to the present invention, a bytecode application specifies a playback point in copy processing. The bytecode application is created by an authorizer, who is the developer of contents. Thus, a playback point can be set according to the contents on the medium for use with portable terminals. Further, in the present invention, when the bytecode application issues an instruction for copy processing, the bytecode application also performs the specification of the playback point. As such, appropriate setting of the playback point is possible, unlike in uniform copying of resume information and bookmark information by the playback device. In consequence, the transition between playback of a content on the package medium and playback of a content on the medium for use with a portable terminal which corresponds to the content on the package medium is carried out smoothly.

Further, the bytecode application issues the instruction for copy processing using a socket communication which utilizes a communication programming interface which is supported as an existing API (Application Programming Interface). Thus, the special function of copying a content for portable terminals while retaining a point on the content at which playback on the playback device has been suspended is realized without the need of expanding the existing APIs. Hence, problems including that of compatibility which is brought about by the expansion of existing APIs do not occur. In short, the present invention realizes stable launching of the bytecode application without having to standardize APIs.

Furthermore, since, in the present invention, the copy control function provided to the playback device is utilized from a bytecode application recorded on the recording medium, it could be expected that diverse applications will be developed by various contents providers. That is, contents providers will be able to store applications which they have developed onto a recording medium and realize a copy control function having unique added values. For instance, by applying the present invention, a contents provider will be able to provide a unique user interface to be used during the execution of the copy control function. Hence, users of playback devices will be able to choose not only user interfaces developed by manufacturers of playback devices but also user interfaces developed by contents providers, and thus will be able to select the most attractive user interface from among the choices provided. Accordingly, the user will be able to perform copying of contents recorded on packaged media to portable terminals and the like by using highly attractive user interfaces uniquely developed and provided by contents providers.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIGS. 4A and 4B each illustrate an example of a movie scene created by each of two modes of dynamic playback control in embodiment 1 of the present invention;

FIG. 33 illustrates how resume playback is performed when a content is returned to viewing on a stationary playback device from viewing on a portable terminal in embodiment 5 of the present invention;

FIG. 35 illustrates a table of parameters and an example of parameter values which are stored in a resume state storage file in embodiment 5 of the present invention;

FIG. 39 illustrates an example of a language table in embodiment 6 of the present invention;

FIG. 44 is a flowchart illustrating the selection of a copy target content performed by the digital copy module in embodiment 6 of the present invention.

DESCRIPTION OF THE EMBODIMENTS

The following describes preferred embodiments of the present invention with reference to accompanying drawings.

Embodiment 1

Figure 1:
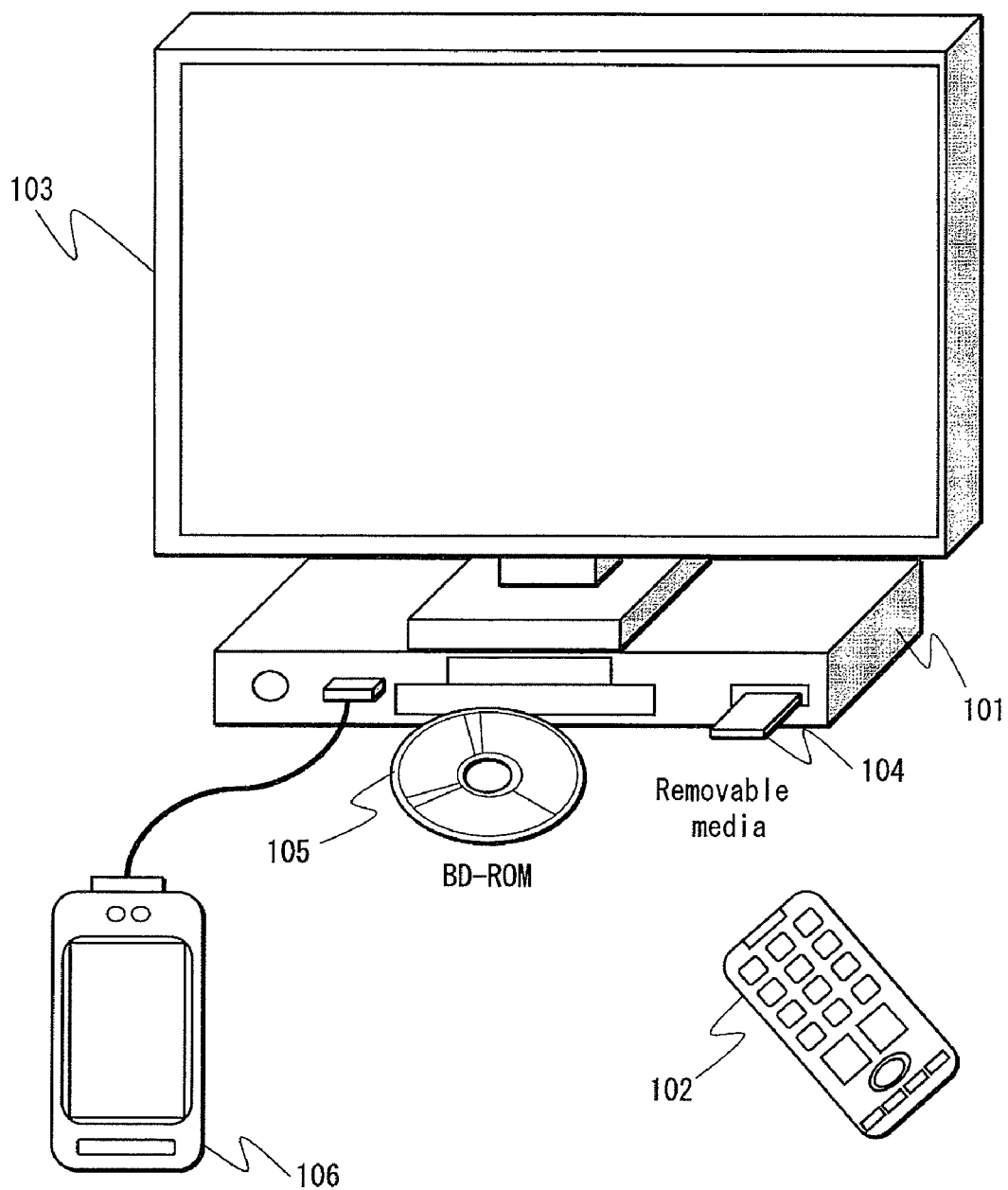
FIG. 1 illustrates a system in embodiment 1 of the present invention.

Firstly, explanation is provided on a usage of the playback device pertaining to the present invention, among various implementations thereof. FIG. 1 illustrates one form of a usage of the playback device pertaining to the present invention. In FIG. 1, the playback device 101 is a playback device pertaining to the present invention. The playback device 101 is used, for instance, to supply movies to a home theater system which includes a remote controller 102 and a television 103. The playback device 101 is provided with a slot through which a removable medium 104 is inserted therein. Examples of the removable medium 104 include: an SD memory card, a memory stick, a Compact Flash™, a Smart Media™, and a multimedia card. In addition, the playback device 101 is provided with another slot through which a USB or the like is inserted therein. The USB or the like enables the playback device 101 to connect with a portable terminal 106.

This concludes the description on a form of usage of the playback device pertaining to the present invention. Next, description is provided on a recording medium which is to be played back by the playback device pertaining to the present invention. In the example illustrated in FIG. 1, the recording medium to be played back by the playback device pertaining to the present invention is a BD-ROM 105, which is an optical disc.

Figure 2:
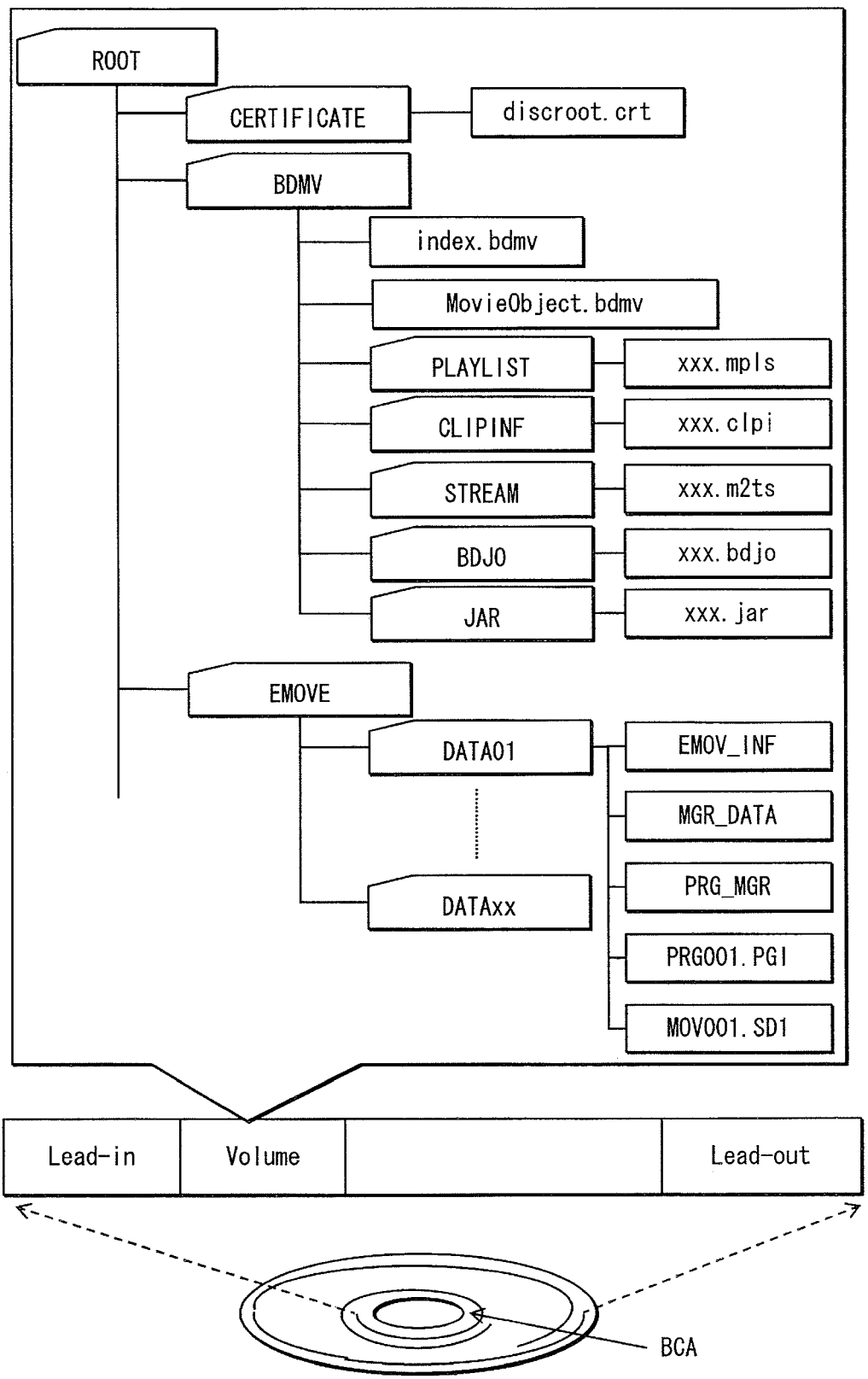
FIG. 2 illustrates a data layer structure of a BD-ROM in embodiment 1 of the present invention.

FIG. 2 illustrates the structure of the BD-ROM (hereinafter also referred to as merely "BD"). In the present embodiment, description will be provided on the BD-ROM with focus on an AV application for playing back AV contents such as movies. However, it should be noted that the BD-ROM may also be used as a recording medium for use with a computer, in the same way that a CD-ROM, a DVD-ROM and the like are used. A BD-ROM, similar to other optical discs such as a DVD and a CD, has a recording area that extends spirally from the inner circumference to the outer circumference thereof. A BD-ROM also has a logical address space for storing logical data between a lead-in disposed near the inner circumference thereof and a lead-out disposed near the outer circumference thereof. Further, there exists a special area on a BD-ROM called a BCA (Burst Cutting Area), which is disposed further towards the center of the disc than the lead-in and which can only be read by a drive. Since the BCA cannot be read by an application, it is used for the implementation of technologies such as copyright protection. In addition, a PMSN (Pre-recorded Media Serial Number), which indicates a physical serial number provided to the recording medium, is recorded in the BCA.

The logical address space stores file system information (volume) at the head thereof, followed by application data such as image data. A file system refers to the UDF and the ISO9660 for example, and enables logical data stored on the BD-ROM to be read out in the same manner as in a regular PC with the use of a directory file structure. File names and directory names of up to 255 characters can be read.

In the directory file structure of the BD-ROM according to the present embodiment, a BDMV directory, a CERTIFICATE directory, and an EMOVE directory are disposed immediately below the ROOT directory (ROOT). The BDMV directory is a directory in which data such as AV contents and management information provided on the BD-ROM is recorded. The CERTIFICATE directory has the "discroot.crt" file (file name fixed) therebelow, in which a certificate used in the signature verification of the application is stored. The EMOVE directory holds therebelow data such as AV contents for viewing on a portable terminal and management information.

Below the BDMV directory, five sub-directories each named the "PLAYLIST directory", the "CLIPINF" directory, the "STREAM" directory, the "BDJO directory", and the "JAR" directory are located. The BDMV directory contains two types of files, which are "index.bdmv" and "MovieObject.bdmv".

The STREAM directory is a directory where a file which is, so to speak, the body of a digital stream is stored, and the file has an extension "m2ts" (xxx.m2ts [where "xxx" is variable, the extension "m2ts" is fixed]) exists. The PLAYLIST holds a file having an extension "mpls" (xxx.mpls [where "xxx" is variable, the extension "mpls" is fixed]). The CLIPINF directory holds a file having an extension "cpli" (xxx.cpli [where "xxx" is variable, the extension "cpli" is fixed]). The JAR directory holds a file having an extension "jar" (xxx.mpls [where "xxx" is variable, the extension "jar" is fixed]). The BDJO directory holds a file having an extension "bdjo" (xxx.bdjo [where "xxx" is variable, the extension "bdjo" is fixed]).

The file having the extension "m2ts" is a digital AV stream in the MPEG-TS (Transport Stream) format, and is generated by multiplexing a video stream, at least one audio stream, and at least one sub-picture stream. The video stream corresponds to the moving picture portion of a movie, the audio stream corresponds to the audio portion of a movie, and the sub-picture stream corresponds to the subtitles of a movie.

The file having the extension "clpi" is a piece of Clip information which is in one-to-one correspondence with a digital AV stream. Since it is a form of management information, the Clip information includes such information indicating: an encoding format of the digital AV stream, a frame rate of the digital AV stream, a bit rate of the digital AV stream, and a resolution of the digital AV stream, and also an EP_map indicating a start address of a GOP.

The file having the extension "mpls" stores PlayList information, and indicates a playback section ("InTime"/"Out Time") of a digital AV stream.

The file having the extension "jar" is a Java™ archive file which includes a description of a BD-J application program. The BD-J application executes dynamic scenario control with the use of a Java™ virtual machine. The Java™ archive file is necessary when it is desired to control the playback of the titles using the BD-J application. A "title" herein indicates a unit in which a content residing on the BD-ROM is played back.

The file having the extension "bdjo" stores a BD-J object. A BD-J object is information defining a title by associating an AV stream indicated by the PlayList information with an application. The BD-J object shows an "application management table" and a table of PlayLists which are available for playback in the title. In the application management table, application identifiers (application IDs) and the IDs of the Java™ archive files belonging to the applications are shown. Hence, the application management table functions as a table of applications whose life cycles fall within the title. In other words, one application is composed of more than one Java™ archive file.

The index.bdmv file (file name fixed) is a database file for the entire BD-ROM and stores such information as an organization ID (32 bit) which is an identifier specifying a provider of a movie and a disc ID (128 bit) which is an identifier allocated to each of the BD-ROMS provided by the provider. The index.bdmv file is the first file to be read when a BD-ROM disc is inserted into the playback device, and allows the playback device to uniquely identify the disc. In addition to the above, the index.bdmv file includes a table indicating, in an associated state, a plurality of titles which are available for playback on the BD-ROM and BD-J objects defining each of the titles.

The MovieObject.bdmv file (file name fixed) includes a scenario program which includes a description of a scenario.

A scenario is used in the playback of each of the titles in the HDMV mode (described later), and changes the playback progress of the title dynamically.

Below the EMOVE directory, AV contents and management information for viewing the contents recorded on the BD-ROM on a portable terminal are stored. In detail, a content piece for playback on a portable terminal is stored below a corresponding sub-directory indicated by a file name of DATAxx (where "xx" is a two digit variable). In detail, below each of the DATAxx directories, five types of files which are: EMOV_INF; MGR_DATA; PRG_MGR; PRG001.PGI; and MOV001.SD1, exist. In the EMOV_INF file, a content ID (hereinafter also referred to as "CID") is recorded. The CID is a 128 bit identifier allocated to and uniquely identifying each of the contents for viewing on a portable terminal. In the MGR_DATA file, a playback point on the content for viewing on a portable terminal is stored. In the PRG_MGR file, a total playback time of the content for viewing on a portable terminal is recorded. In the PRG001.PGI file, a title of the content for viewing on a portable terminal is recorded. In the MOV001.SD1 file, an encrypted AV digital stream for viewing on a portable terminal is recorded. The four files, namely the MGR_DATA file, the PRG_MGR file, the PRG001.PGI file, and the MOV001.SD1 are compliant with the SD video format. Further, the MOV001.SD1 file which corresponds to a digital stream is encrypted by using a predetermined encryption method (the CPRM standard, for example), and the key information (title key) which is required in decrypting the digital stream encrypted using the predetermined encryption method (the CPRM standard, for example) is not recorded on the BD-ROM. Thus, the digital stream is protected from unauthorized playback (hereinafter, the combination of the four files as mentioned in the above is referred to as "protected contents" or "protected contents for portable terminals").

In FIG. 2, illustration is provided of an example where protected contents for portable terminals in the SD-Video Mobile Video Profile format is stored below the DATA01 directory. Further, the other DATAxx directories may store copy source units for contents for viewing on a portable terminal in other formats, including the SD-Video ISDB-T format, the Quicktime format, and the Windows Media Player format, for example.

Figure 3:
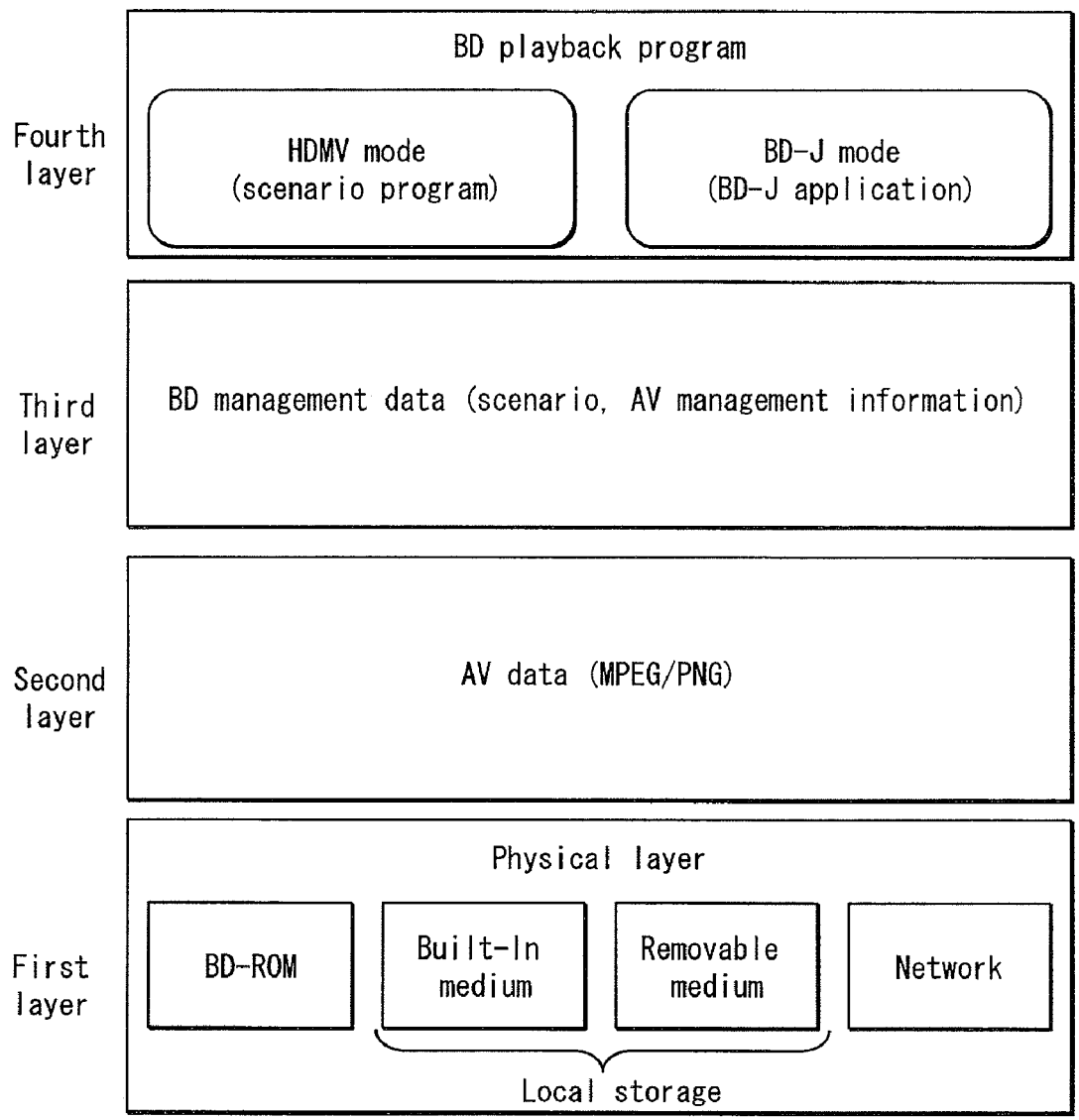
FIG. 3 illustrates a layer model of playback control in embodiment 1 of the present invention.

FIG. 3 illustrates a layer model of the playback control. The first layer in FIG. 3 illustrates a physical layer that controls the supply of the body of a stream to be the target of processing. As shown in the first layer, the process target stream may be supplied from the BD-ROM and as well as from any recording medium and communication medium. For example, the stream body may be supplied from a local storage such as a Built-In medium, a removable medium, a network, and a recordable disc. Note that a Built-In medium as referred to here is a recording medium which is built-in to the playback apparatus in advance, such as a HDD (hard disk drive). On the other hand, a removable medium as referred to here is a portable recording medium such as an SD memory card, a memory stick, a Compact Flash™, a Smart Media™, a multimedia card, and the like. In addition, there are two forms of usages of such removable media. One form is where a removable medium is directly inserted to the playback device, whereas another form is where the removable medium is connected to the playback device via a USB cable or the like. Further in addition, each of the Built-In media and the removable media as referred to here is a recording medium which is to be locally accessed by the device, and therefore are referred to by use of the generic name of "local storage". The control by the first layer is the control over the supply sources such as a local storage and a network (disk access, card access, and network communications). The second layer is a layer of AV data. The second layer defines the decoding method to be used for decoding the stream supplied on the first layer.

The third layer (BD management data) is a layer that defines a static scenario of the stream. The static scenario consists of playback path information and stream management information which are determined in advance by a creator of the disc. The third layer, therefore, defines the playback control based on the respective pieces of information.

The fourth layer (BD playback program) is a layer for implementing a dynamic scenario of the stream. The dynamic scenario is a program for executing at least either of the playback procedure of an AV stream and the control procedure relating to the AV playback. The playback control based on the dynamic scenario changes in response to user operations made on the playback device. In this sense, the dynamic scenario has a property similar to that of a program. The dynamic playback control as referred to herein is executed in either of two modes. One is a mode of playing back the video data recorded on the BD-ROM in a unique playback environment of an AV device (HDMV mode). The other is a mode which increases additional value of the video data recorded on the BD-ROM (BD-J mode). On the fourth layer shown in FIG. 3, both the HDMV mode and the BD-J mode are illustrated. The HDMV mode refers to a playback mode in a DVD-like playback environment. In this mode, a scenario program describing a scenario for dynamically changing the progress of playback is executed. In contrast, the BD-J mode is a playback mode whose execution entity is a Java™ virtual machine. In the BD-J mode, a BD-J application executes playback control.

FIGS. 4A and 4B illustrate movies created under dynamic playback control in the two aforementioned modes. FIG. 4A illustrates one scene of a movie played by defining dynamic playback control in the HDMV mode. The playback control in the HDMV mode is described in commands similar to those interpretable by a DVD playback device. Thus, playback control similar to DVD playback control can be defined. In other words, playback control can be so defined that the playback proceeds according to selections made on a menu.

FIG. 4B shows one scene of a movie created by defining dynamic playback control in the BD-J mode. The control procedures in the BD-J mode are described in the Java™ language that is interpretable by a Java™ virtual machine. By defining the playback control for controlling the motion of a computer graphics (CG) image, the CG image (a picture of an owl in FIG. 4B) moving about on a screen besides the display of video playback is presented.

Figure 5:
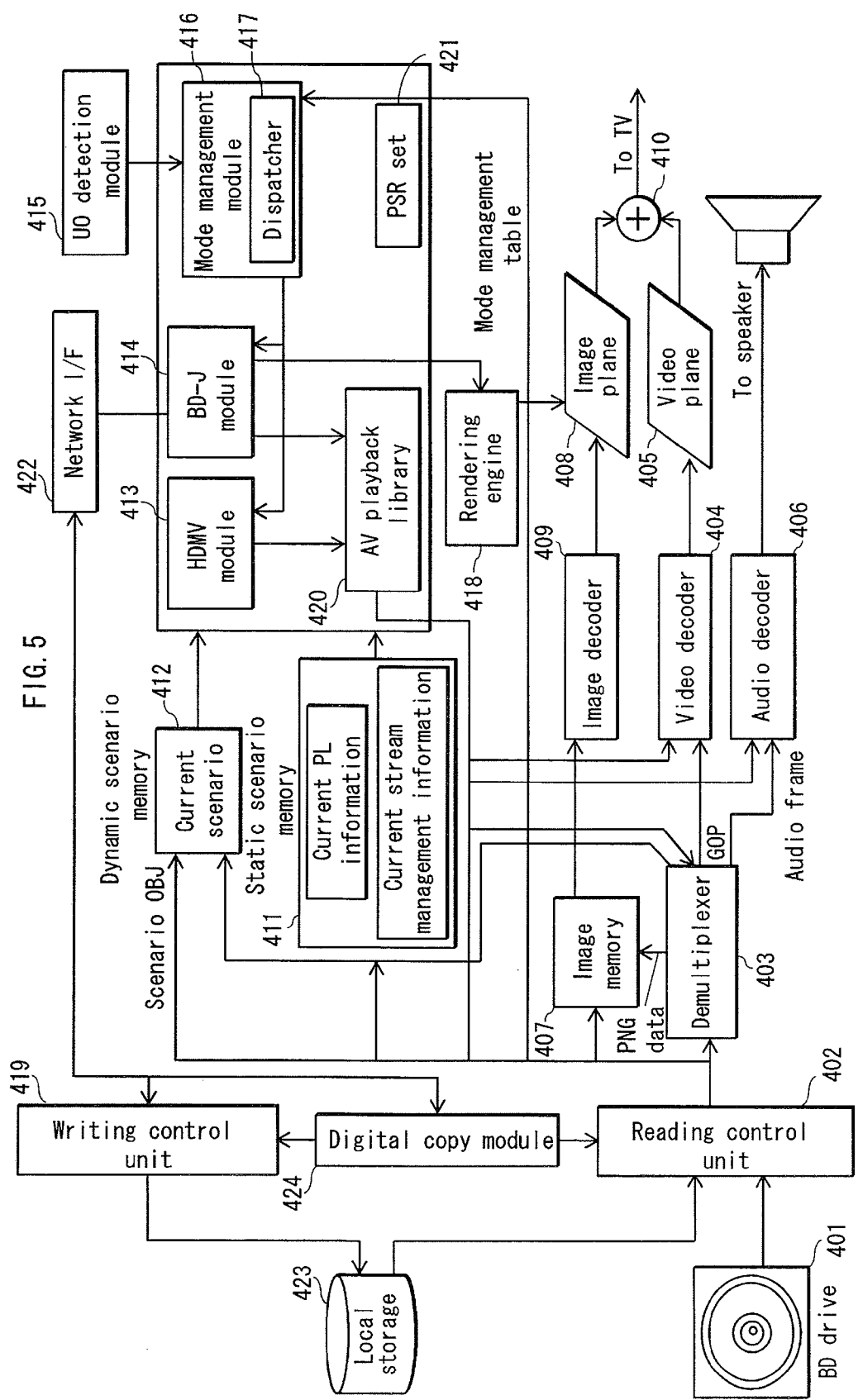
FIG. 5 illustrates an internal structure of a playback device in embodiment 1 of the present invention.

FIG. 5 is a block diagram illustrating the major functional segments of the playback device. As shown in FIG. 5, the playback device includes: a BD-ROM drive 401, a reading control unit 402, a demultiplexer 403, a video decoder 404, a video plane 405, an audio decoder 406, an image memory 407, an image plane 408, an image decoder 409, an adder 410, a static scenario memory 411, a dynamic scenario memory 412, an HDMV module 413, a BD-J module 414, a UO detection module 415, a mode management module 416, a dispatcher 417, a rendering engine 418, a writing control unit 419, an AV playback library 420, a PSR set 421, a network interface 422, a local storage 423, and a digital copy module 424.

The BD-ROM drive 401 loads/ejects the BD-ROM and executes access to the BD-ROM.

The reading control unit 402 controls reading of data recorded on the BD-ROM 105 which is loaded in the BD-ROM drive 401 and also the reading of data recorded on the local storage 423.

The demultiplexer 403 demultiplexes transport streams read out by the reading control unit 402. As a result of the demultiplexing, the demultiplexer 403 acquires video frames constituting the GOPs, audio frames. The demultiplexer 403 further outputs the resultant video frames to the video decoder 404, and the audio frames to the audio decoder 406. The demultiplexer 403 also stores sub-picture streams to the image memory 407, and stores the Navigation Button information to the dynamic scenario memory 412. Demultiplexing by the demultiplexer 403 involves the process of converting TS packets into PES packets.

The video decoder 404 decodes video frames output from the demultiplexer 403 and writes the resultant uncompressed picture data to the video plane 405.

The video plane 405 is a memory for storing uncompressed picture data.

The audio decoder 406 decodes audio frames output from the demultiplexer 403 and outputs the resultant uncompressed audio data.

The image memory 407 is a buffer for storing the sub-picture stream read from the demultiplexer 403, PNG data included in the Navigation Button information, and image files directly read from the reading control unit 402.

The image plane 408 is memory having an area corresponding to one screen image. On the image plane 408, expanded sub-picture streams, PNG data, and image files are placed.

The image decoder 409 expands the sub-picture stream, the PNG data, and the image files stored on the image memory 407 and writes the resultant expanded data into the image plane 408. As a result of the decoding of the sub-picture stream, various menus and sub-pictures appear on the display screen.

The adder 410 overlays uncompressed picture data stored on the picture plane 405 with the expanded images stored on the image plane 408 and outputs a composite image acquired as a result of the overlaying. The screen image (a screen where a CG image (the image of owl in the figure) moves about next to the video display screen) illustrated in FIG. 4B is output as a result of the adder 410 overlaying the image stored on the image plane 408 with the picture stored on the video plane 405.

The static scenario memory 411 is memory for storing a current PlayList and current stream management information. The current PlayList refers to a specific PlayList that is currently being processed, among a plurality of PlayLists recorded on the BD-ROM or the local storage 423. Similarly, the current stream management information refers to a specific piece of management information that is currently being processed, among a plurality of pieces of stream management information recorded on the BD-ROM or the local storage 423.

The dynamic scenario memory 412 is memory for storing a current dynamic scenario and is used by the HDMV module 413 and the BD-J module 414. The current dynamic scenario refers to a specific scenario that is currently being executed, among a plurality of scenarios recorded on the BD-ROM or the local storage 423.

The HDMV module 413 is a virtual DVD player that is an execution entity in the HDMV mode. Specifically, the HDMV module 413 executes the current scenario program read to the dynamic scenario memory 412.

The BD-J module 414 is a Java™ platform and includes a Java™ virtual machine, configuration, and profile. The BD-J module 414 creates a current Java™ object from a Java™ class file read to the dynamic scenario memory 412 and executes the current Java™ object. The Java™ virtual machine converts the Java™ object written in the Java™ language into native code that runs on the CPU of the playback apparatus, and causes the CPU to execute the converted object.

The UO detection module 415 detects a user operation made on the remote controller or on the front panel of the playback apparatus and outputs information indicative of the detected user operation (hereinafter referred to as "UO (User Operation)") to the mode management module 416.

The mode management module 416 holds a mode management table read from the BD-ROM or the local storage 423, and performs mode management and branch control. The mode management performed by the mode management module 416 refers to a module allocation processing of determining which of the HDMV module 413 and the BD-J module 414 is to execute the dynamic scenario.

The dispatcher 417 selects, from among a variety of UOs, UOs that are permitted in the current mode of the playback apparatus and passes the selected UOs to a suitable one of the modules that execute in the mode. Suppose, for example, UOs of "up", "down", "right", "left" and "activate" are received during the HDMV mode. In this case, the dispatcher 417 outputs the received UOs to corresponding modules that operate in the HDMV mode.

The rendering engine 418 is provided with basic software, such as Java™ 2D and OPEN-GL. The rendering engine 418 renders computer graphics according to instructions provided by the BD-J module 414, and outputs the rendered computer graphics to the image plane 408.

The writing control unit 419 writes data onto the local storage 423 according to data downloaded via the network interface 422 and instructions provided from the digital copy module 424.

The AV playback library 420 executes an AV playback function and a PlayList playback function in response to a function call from the HDMV module 413 and the BD-J module 414. The AV playback function is a group of functions inherited from DVD players and CD players, and includes the following processing: playback start; playback stop; playback pause, pause release, release of freeze image function, fast forward at a speed specified by an intermediate value, reverse at a speed specified by an intermediate value, audio switching, subpicture switching, and angle switching. The PlayList playback function refers to, from among such functions, playback start and playback stop performed in accordance with the PlayList information.

The PSR set 421 is a set of registers built into the playback device, and includes a plurality of player status registers (PSRs) and a plurality of general purpose registers (GPRs). The player status registers each indicate a state of the playback device, which include, for instance, a current playback point and the like. Detailed description on the registers will be provided in the following.

The network interface 422 is for processing protocols required in downloading BD-ROM additional contents and executing digital copying. In detail, BD-ROM additional contents are contents which are not found on the original BD-ROM but instead, are found on the internet. Examples of BD-ROM additional contents include additional sub-audio, subtitles, bonus content, and application. The BD-J module 414 controls the network interface 422 so as to download additional contents made publically available on the internet to the local storage 423.

The local storage 423 is used as the storage destination for downloaded additional contents and data used by the application, as well as being used as the copy destination of digital copies. The local storage 423 has separate storage areas for each of additional contents of different BD-ROMs. Similarly, the local storage 423 uses separate areas for storing data for different applications. In addition, the local storage 423 also stores merge management information that describes rules for merging a downloaded additional content with data residing on the BD-ROM.

The digital copy module 424 copies protected contents for portable terminals recorded on the BD-ROM to the local storage 423, and at the same time, performs authentication with a digital copy server via the network interface 422 so as to obtain a decryption key. The decryption key is required to enable playback of the protected contents for portable terminals at the copy destination. Note that the functions of the digital copy module 424 are not laid open to the HDMV module 413 and the BD-J module 414, and only indirect control thereof via the network interface 422 is available.

This concludes the description on the structure of the playback device pertaining to the present invention. In the following, description is provided on each of the PSRs included in the PSR set. The following is a list of the PSRs included in the PSR set.

PSR(0): Menu Graphics Stream Number
PSR(1): Audio Stream Number
PSR(2): Subtitle Stream Number
PSR(3): Angle Number
PSR(4): Currently Playing Title Number
PSR(5): Currently Playing Chapter Number
PSR(6): Currently Playing Playlist Identifier
PSR(7): Currently Playing PlayItem Identifier
PSR(8): Playback Time Information
PSR(9): Navigation Timer
PSR(10): Selected Key Information
PSR(11): Identifier of Current Page in Menu Graphics Stream
PSR(12): Identifier of User Style in Subtitle Stream
PSR(13): Parental Level
PSR(14): Subtitle Support Information
PSR(15): Player Setting Value (Audio)
PSR(16): Language Code for Audio Stream
PSR(17): Language Code for Subtitle Stream
PSR(18): Language Code for Menu
PSR(19): Player Version Information
PSR(20): Backup register for PSR(0)
PSR(21): Backup register for PSR(1)
PSR(22): Backup register for PSR(2)
PSR(23): Backup register for PSR(3)
PSR(24): Backup register for PSR(4)
PSR(25): Backup register for PSR(5)
PSR(26): Backup register for PSR(6)
PSR(27): Backup register for PSR(7)
PSR(28): Backup register for PSR(8)
PSR(29): Backup register for PSR(9)
PSR(30): Backup register for PSR(10)
PSR(31): Backup register for PSR(11)
PSR(32): Backup register for PSR(12)

PSRs (0) to (12) hold system parameters indicating playback status, and PSRs (13) to (19) hold system parameters set to the playback device as preferences. PSRs (20) to (32) are registers for backup (backup registers) of PSRs (0) to (12). When switching between titles is performed by using a Call command in the HDMV mode, the parameters indicating the current playback status in PSRs (0) to (12) are temporarily stored to PSRs (20) through (32).

Particularly, PSR(8) is updated every time a picture data is displayed, and a value in the range of 0-0xFFFFFFFF is set thereto. Thus, the PSR(8) indicates the current playback time with a time accuracy of 45 kHz. When the main content is a BD-J mode title, the backup registers are not used. Instead, the current playback time information is obtained by reading the parameter set to PSR(8). On the other hand, when the main content is an HDMV mode title, the parameter of PSR(8) is temporarily stored to PSR(28). Thus, the current playback time information is obtained by reading the parameter set to PSR(28). This concludes the description on the PSRs. In the following, description is provided on the data structure of the local storage.

Figure 6:
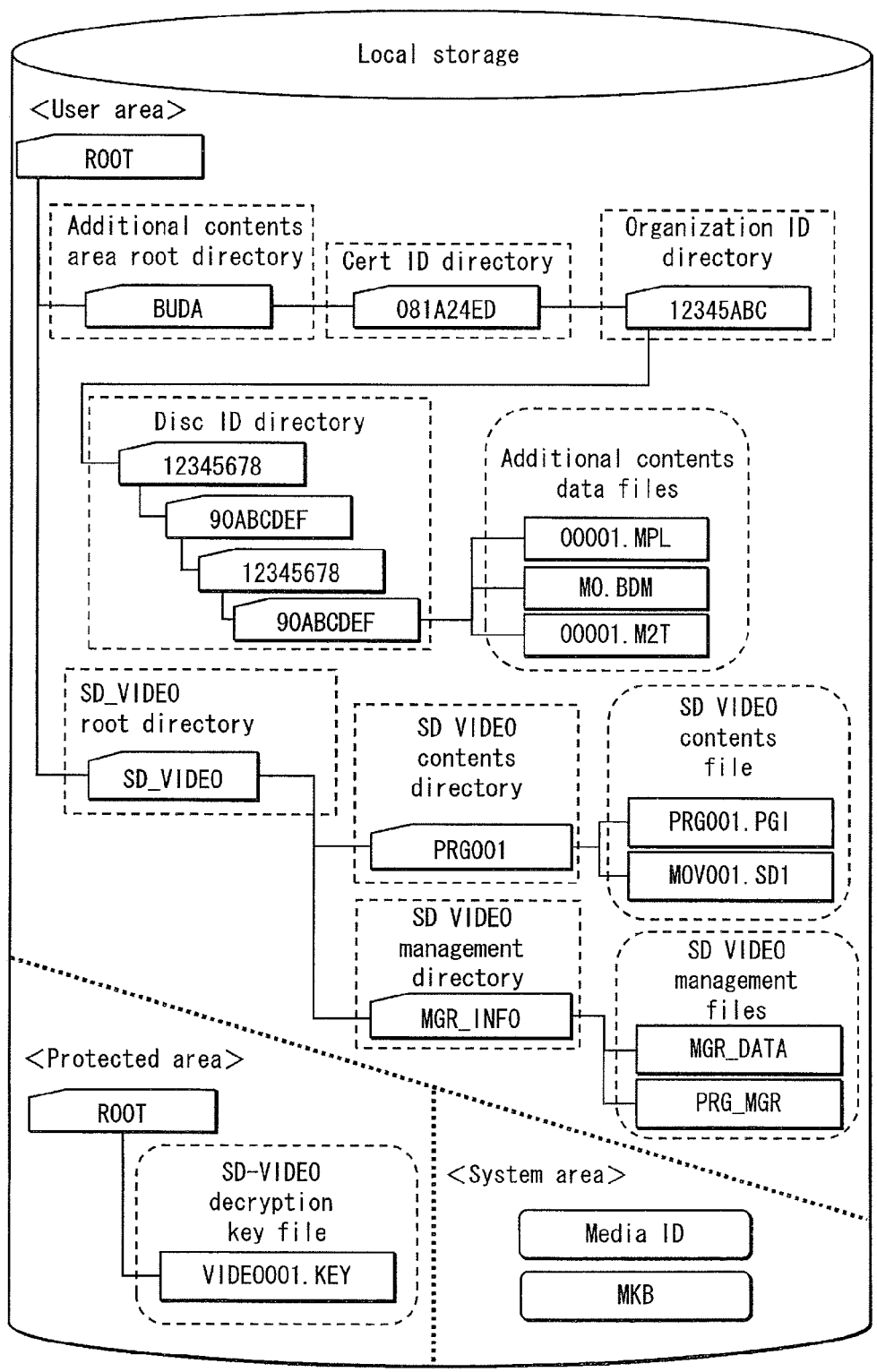
FIG. 6 illustrates a directory structure of a local storage in embodiment 1 of the present invention.

FIG. 6 shows the data structure of the local storage. The local storage can be divided into three main areas. The first is the "user area", which is visible to the user and is freely readable/writable by the user. The second area is the "protected area", which is not made visible to the user and is not available for reading/writing by the user. Reading/writing of the protected area can only be performed by systems which are compliant to copyright. The final area is the "system area", which is neither readable/writable by the user nor writable by a system, and is only available for reading by the system.

The user area is further divided into two sub-areas: an additional contents area and an SD video area. The additional contents area stores contents to be used in supplement during the playback of a BD-ROM, while the SD video area stores contents compliant with the SD video specification (SD video contents) which are mainly for playback on portable terminals. Both areas exist directly below the root directory in the user area of the local storage. The directory name indicating the additional contents area is a fixed value (BUDA) composed of eight characters or less. An application can store any file, including additional files downloaded from the server and the like, below the BUDA directory (including subdirectories and files located below the subdirectories).

Further, an Organization ID directory and a Disc ID directory exist below the BUDA directory. By creating a directory corresponding to each respective BD-ROM below a directory corresponding to a specific provider (Organization), download data associated with each respective BD-ROM is stored separately.

On the other hand, the directory indicating the SD video area is the SD_VIDEO directory, which exists immediately below the root directory of the user area, similar as the additional contents area. Further, the SD_VIDEO directory has therebelow SD video contents directories (PRGxxx (xxx is variable)), each of which corresponding to a respective SD video content, and an SD video management directory (MGR_INFO) storing a management file of the entire SD video area. Each SD video contents directory holds the aforementioned PRG001.PGI and MOV001.SD1 files, and the SD video management directory holds the aforementioned MGR_DATA and PRG_MGR files.

In the protected area which cannot be accessed by the user, a decryption key (VIDEO001.KEY) for decrypting protected contents for portable terminals is recorded. Note that the protected contents for portable terminals is in encrypted state. Only systems compliant with copyright protection are permitted access to the decryption key.

In the system area which is not accessible by the user and access to which by the system is limited to only reading, a media key block (MKB) and a media ID are stored. A media key block includes key information required for generation of the aforementioned decryption key. A media ID is an identifier for uniquely specifying a recording medium, such as an SD memory card, which is allocated to the local storage. Every individual medium, including those of the same type, is provided with a media ID of an unique value, thus making it possible to identify each individual medium.

Figure 7:
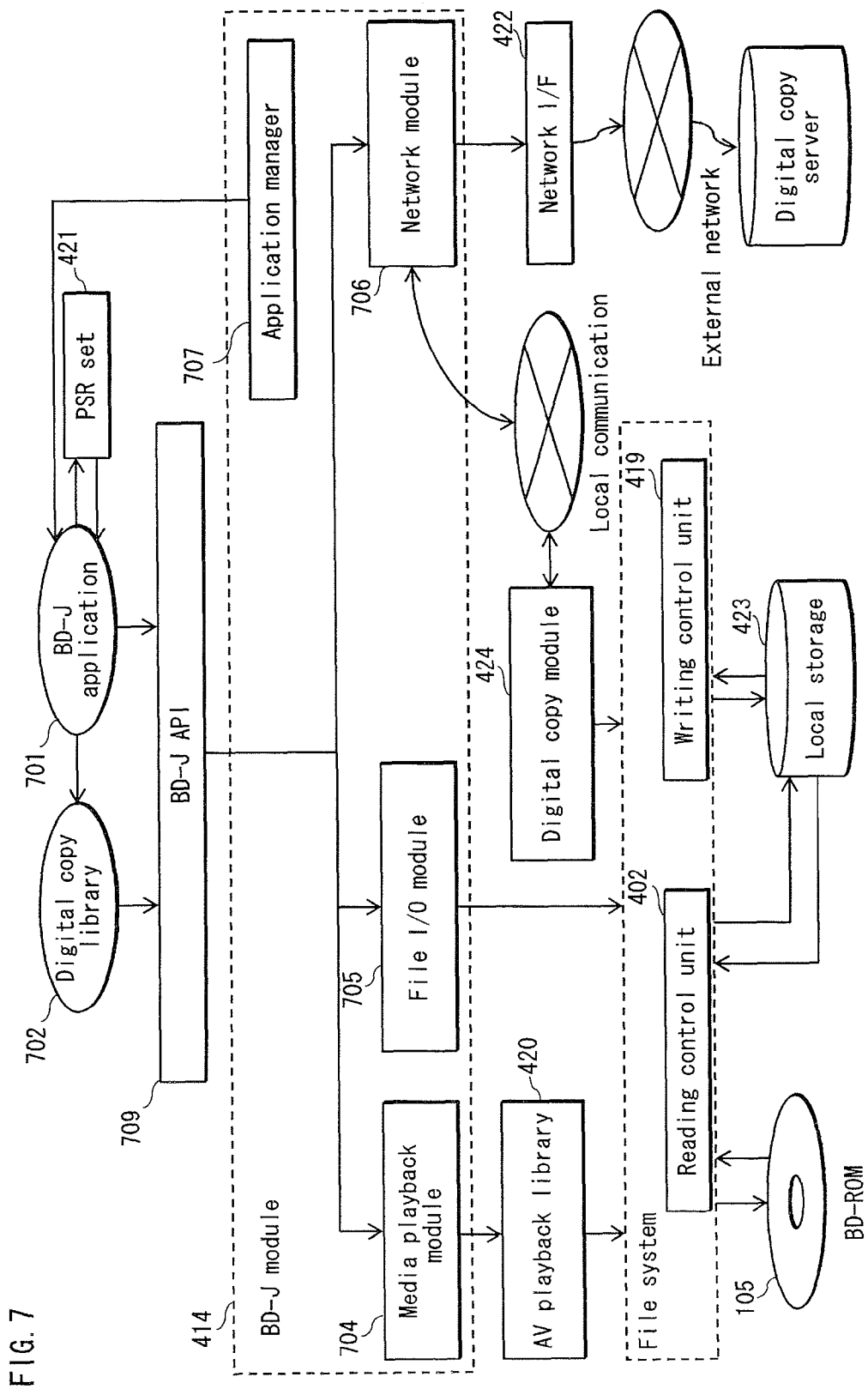
FIG. 7 illustrates a specific structure of a BD-J module in embodiment 1 of the present invention.

FIG. 7 illustrates a more detailed structure of the BD-J module depicted in FIG. 5. The BD-J module 414 includes a media playback module 704, a file I/O module 705, a network module 706, and an application manager 707. Note that the AV playback library 420, the PSR set 421, the network I/F 422, the local storage 423, and the digital copy module 424 shown in FIG. 7 are equivalent to those shown in FIG. 5, and are shown for the mere sake of explanation of the components newly introduced, namely the media playback module 704, the file I/O module 705, the network module 706, and the application manager 707.

The application manager 707 manages the launch/termination of the BD-J application based on the application management information recorded on the BD-ROM. The application manager 707 also receives an UO event from the dispatcher 417 and passes on the UO event to the BD-J application 701 currently in operation.

The media playback module 704 supplies the BD-J application 701 with APIs for media playback control. When the BD-J application 701 calls a media playback control API, the media playback module 704 calls a corresponding function from the AV playback library 420 and executes the corresponding AV playback control.

The file I/O module 705 processes file access requests made from the BD-J application 701 with respect to such media as the BD-ROM, the local storage, and the BD writer.

The network module 706 provides the BD-J application 701 with APIs for network control. Based on the network control requests from the BD-J application 701, the network module 706 utilizes the network interface 422 to establish a network connection. The BD-J application 701 accesses the digital copy server by using the network module 706, and thus, is able to search for and download additional contents being laid open to the public. Additionally, in the present embodiment, the network module 706 is also utilized for a protocol communication within the playback device between the BD-J application 701 and the digital copy module 424. As is illustrated in FIG. 7, the APIs for directly controlling the digital copy module 424 are not provided to the BD-J application 701. When the BD-J application 701 issues any kind of processing to be performed by the digital copy module 424, the transmission/reception of necessary data is performed via a network established between the digital copy module 424 and the network module 706. As a result, the network module 706 provides interfaces for both the external network access and the local network access to the BD-J application 701.

Note that the function of the transmission/reception of data with the digital copy module 424 via the local network access may be separated from the BD-J application 701. That is, the function of exchanging such data on the local network access may be implemented as a library. In detail, a common protocol is to be defined for the transmission/reception of data with the digital copy module 424, rather than using a protocol which is dependent upon each of the BD-J applications. Further, a library (digital copy library 702) exclusively used for the analysis of the defined protocol is to be prepared. Thus, the function of the transmission/reception of data with the digital copy module can be separated from the BD-J application. Further in detail, the digital copy library 702 may provide the BD-J application with APIs (digital copy library APIs, to be described in detail in the following) which yield such effects as may be yielded if the BD-J APIs were to be expanded. Note that, in this case, details of the protocol are to be concealed in the digital copy library 702. By making such a configuration, the BD-J application will no longer need to perform analysis of the protocol used in the transmission/reception of data with the digital copy module 424. That is, the provision of the library realizes centralized management of the analysis of protocols, and in consequence, the productivity of the BD-J application is improved. Note that the details of the protocol (digital copy socket protocol) mutually exchanged between the digital copy library 702 and the digital copy module 424 utilizing the local network access are to be described in the following.

Figure 8:
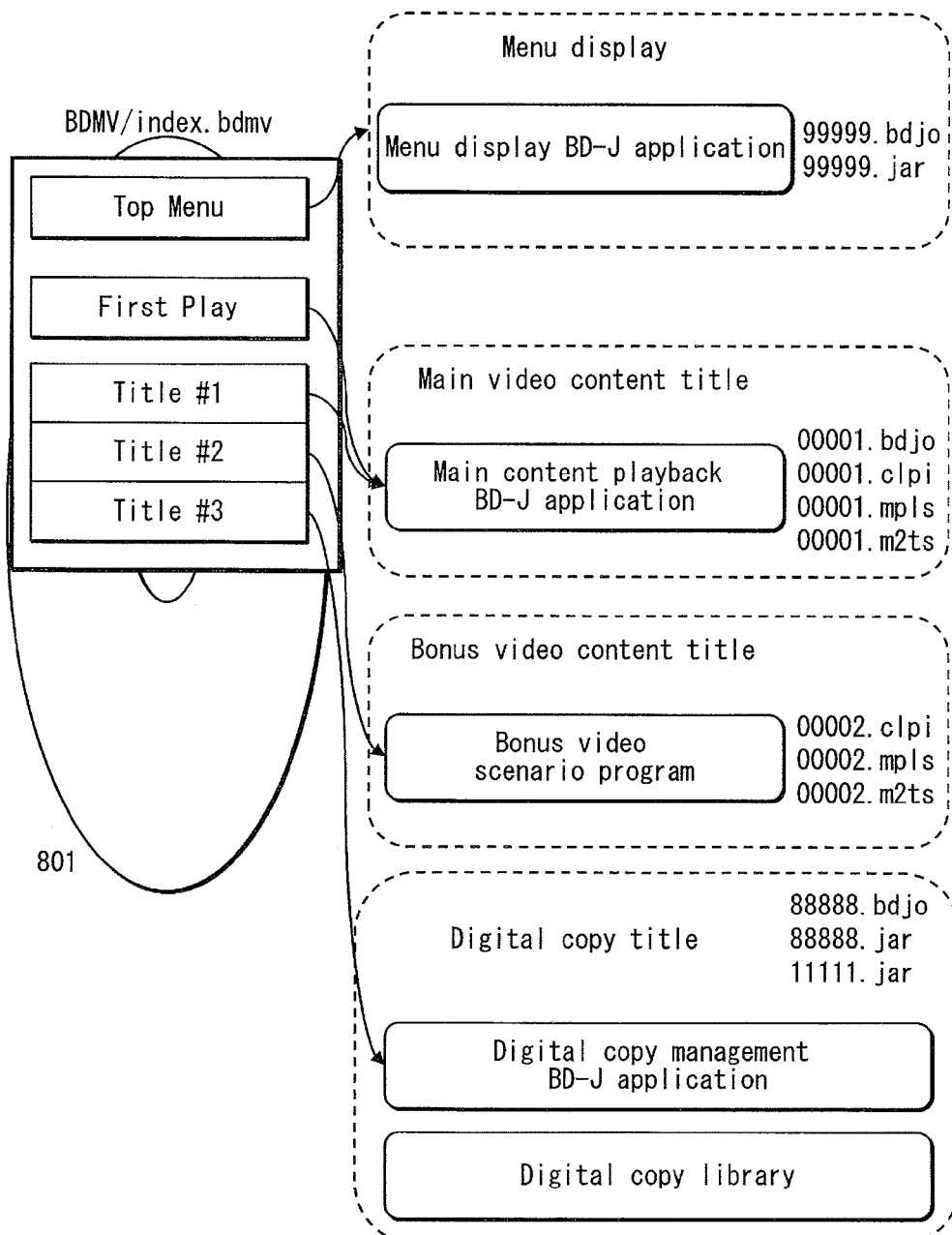
FIG. 8 illustrates a correlation between index.bdmv and a plurality of titles in embodiment 1 of the present invention.

FIG. 8 illustrates one example of the relationship between an index.bdmv file and titles. A title as referred to here is a playback unit, and is composed of a pair of an application and an AV stream. The index.bdmv file includes a description of a title structure on the disc. More specifically, the index.bdmv file manages the reference relationship between each of the titles on the disc and the respective application associated (when the title is a BD-J mode title, the application associated is a BD-J application, whereas, when the title is an HDMV mode title, the application associated is a scenario program).

In the example illustrated in FIG. 8, each of "Top Menu", "First Play", "Title#1", and "Title#3" is a BD-J mode title, while "Title#2" is an HDMV title.

"Title#1" is, for example, a title corresponding to a main video content, and when this title is selected, the playback device performs the playback of digital stream and the execution of an application indicated in the application management table. The playback of the digital stream is performed according to a PlayList available for playback as indicated in the application management table included in the BD-J object (00001.bdjo).

"Title#2" is, for example, a title corresponding to bonus video content, and when this title is selected, the playback device performs dynamic playback of a digital stream according to a scenario program included in the MovieObject.bdmv file.

"Title#3" is, for example, a title corresponding to digital copy content, and when this title is selected, the playback device performs a later-described digital copying by executing a BD-J application and a digital copy library indicated in an application management table included in the BD-J object (88888.bdjo).

The above-provided is merely one example. For instance, when a PlayList is not indicated in the application management table included in the BD-J object which is associated with "Title#1", the playback device does not perform playback of the digital stream. Also, by making a configuration such that the application management table included in the BD-J object associated with "Title#3" indicates a PlayList available for playback, the playback device may perform playback of a digital stream according to the PlayList available for playback indicated in the application management table, in addition to the execution of the BD-J application and the digital copy library indicated by the application management table.

In addition to such titles as described in the above, special titles exist, having the names "FirstPlay" and "Top Menu". The "FirstPlay" title is automatically played back when the BD is launched, and is mainly used for displaying the terms of use of the BD or the like. The "Top Menu" title is played back when the menu key on the remote controller is pressed or a playback of a title ends, and is mainly used to enable the user to make selections between titles or between different languages available for the subtitle/audio. In addition, digital copying is to be performed with respect to BD-J mode titles in the present embodiment. A digital copy title is composed of a BD-J application which performs management of a GUI for digital copying and the like, and a digital copy library which performs management of the transmission/reception of data between the BD-J application and the digital copy module. The BD-J application and the digital copy library are to be similarly recorded on the BD-ROM as JAR files. More specifically, two separate JAR files may be prepared each recording the BD-J application or the digital copy library, or the BD-J application and the digital copy library may be recorded together in one JAR file.

Figure 9:
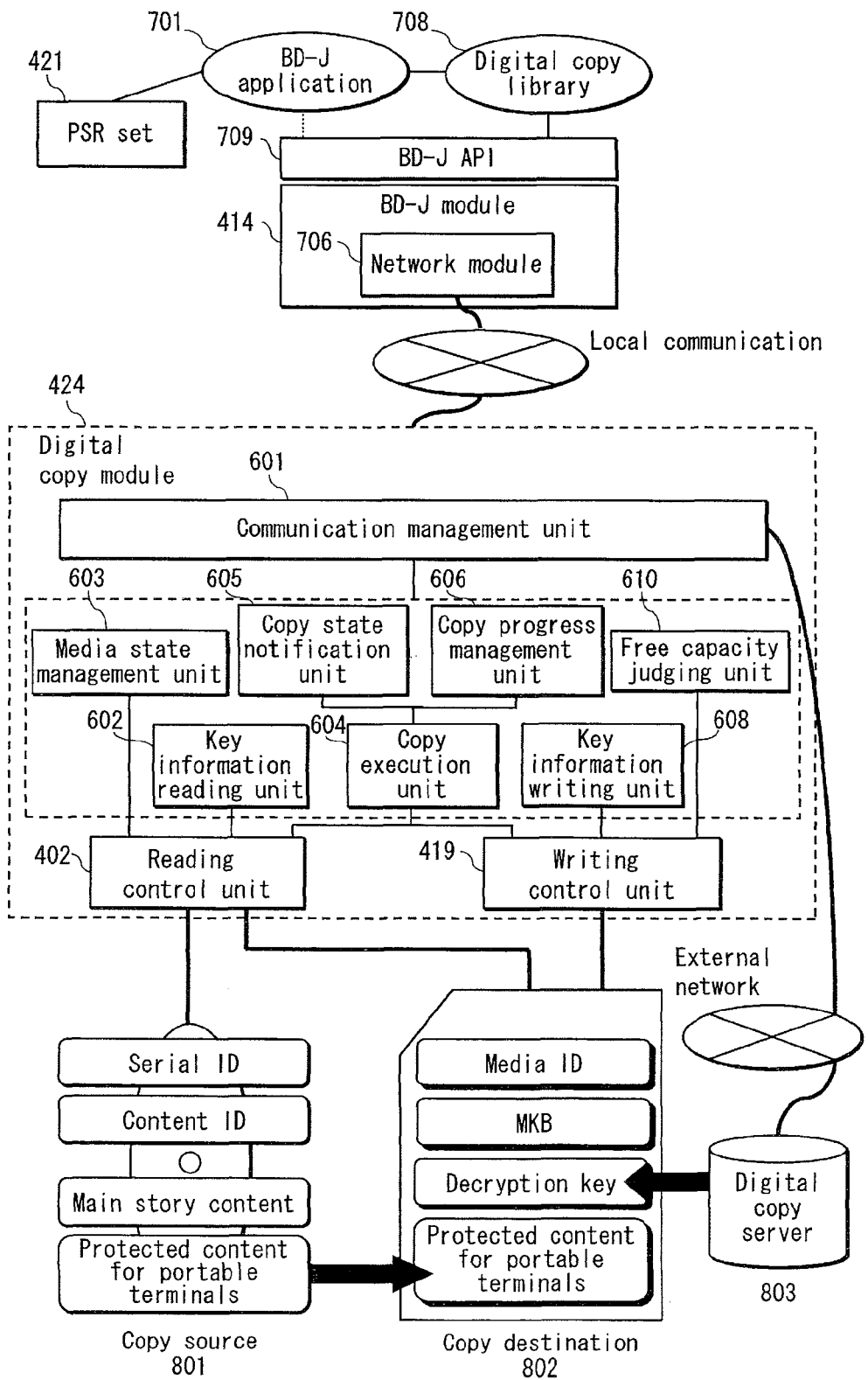
FIG. 9 illustrates an internal structure of a digital copy module in embodiment 1 of the present invention.

FIG. 9 illustrates the digital copy module 424 in detail. The digital copy module 424 includes: a communication management unit 601; a key information reading unit 602; a media state management unit 603; a copy execution unit 604; a copy state notification unit 605; a copy progress management unit 606; a key information writing unit 608; and a free capacity judging unit 610.

The communication management unit 601 allocates one of the communication ports of the playback device to digital copy control, and utilizes the communication port to perform protocol communication with the BD-J module. Specifically, the communication management unit 601 opens the digital copy communication port as a server socket, and waits for a request to be made from the BD-J module. When data is sent to the digital copy communication port, the communication management unit 601 analyzes the data, and carries out processing that corresponds to the data. Similarly, the communication management unit 601 sends back the result of the processing to the BD-J module via the digital copy communication port. In addition, the communication management unit 601 performs management of data communication of the digital copy server 803. More specifically, the communication management unit 601 performs communication processing that is necessary to obtain, from the digital copy server, a decryption key required to decrypt the encrypted digital AV stream for a portable terminal.

The key information reading unit 602 reads information required to generate a decryption key from a copy source 801 and a copy destination 802. In detail, from the copy source 801, the key information reading unit 602 reads a PMSN (Pre-recorded Media Serial Number) indicating a physical serial ID of the recording medium. The PMSN is recorded in a special area on the BD-ROM called the BCA (Burst Cutting Area). From the copy destination 802, the key information reading unit 602 reads media-specific information (Media ID) which is uniquely provided to each medium, and a Media Key Block (MKB) in which the key information necessary to generate a decryption key is recorded.

The media state management unit 603 performs management of a list of media types which can be currently used as the copy destination by the playback device. For example, if the playback device is equipped with an SD card slot and an USB memory slot, and currently only an SD card is inserted, the media state management unit 603 judges that the current copy destination is the SD card. If both an SD card and an USB memory (or a portable terminal connected via an USB) are inserted, the media state management unit 603 judges that both the SD card and the USB memory are currently available as the copy destination. Furthermore, the media state management unit 603 performs management of free capacity of the copy destination media.

The copy execution unit 604 executes the copying of protected contents for portable terminals on the BD-ROM to another medium as instructed by the BD-J application 701. The instruction from the BD-J application is provided via the digital copy library 702, and on the digital copy communication port. Note that the protected contents for portable terminals copied to another medium utilizing only the data copying performed by the copy execution unit 604 cannot be played back on the copy destination by itself. The playback of such contents is enabled only when a decryption key has been written to the copy destination by the decryption key writing unit 608 to be described later in detail.

The copy state notification unit 605 performs management of transition among states of copying, including copy start, normal termination, and abnormal termination. The transition among such states is notified to the BD-J application 701 which is in local communication connection with the digital copy module 424 via the digital copy communication port.

The copy progress management unit 606 performs management of the number of bytes remaining to be copied and the number of bytes that have been copied, and notifies the BD-J application of the current progress of the digital copy in response to requests made therefrom via the digital copy communication port.

The key information writing unit 608 writes a decryption key which is generated from the serial ID of the BD-ROM, the media ID of the copy destination medium, and the MKB, all of which are obtained by the key information reading unit 602. The generation of the decryption key is performed based on a secret key stored in the server. Hence, the digital copy module 424, after the key information reading unit 602 has obtained the serial ID of the BD-ROM, the media ID of the copy destination medium, and the MKB, transmits such values as well as the content ID of the copy target content to the digital copy server 803 via the communication management unit 601. The digital copy server 803 generates a decryption key from the values obtained and the secret key held by the server, and transmits the generated decryption key to the communication management unit 601. The decryption key generated is so encrypted that decryption thereof can be performed by using the MKB of the copy destination medium. When the communication management unit 601 receives the decryption key, the key information writing unit 608 writes the decryption key onto the protected area of the copy destination medium. The decryption key includes key information (title key), and is used for the decryption of protected contents for portable terminals whose key information is encrypted.

Without the decryption key which includes key information, the playback of protected contents for portable terminals is inhibited in a case where only the contents on the copy source is copied onto another medium without permission.

The free capacity judging unit 610 judges whether or not the copy destination medium has enough free capacity for the copying of the content. This judgment is made according to the free capacity of the copy destination medium and the size of the copy source content.

The digital copy module 424 has the above-mentioned structure, and all such operations thereof can be controlled from the BD-J application which is in local communication connection with the digital copy communication port. It should be noted that since the APIs necessary for directly manipulating such controls do not exist in the BD-J module, it is impossible to perform such controls from a BD-J application which is not connected to the digital copy communication port.

Figure 10:
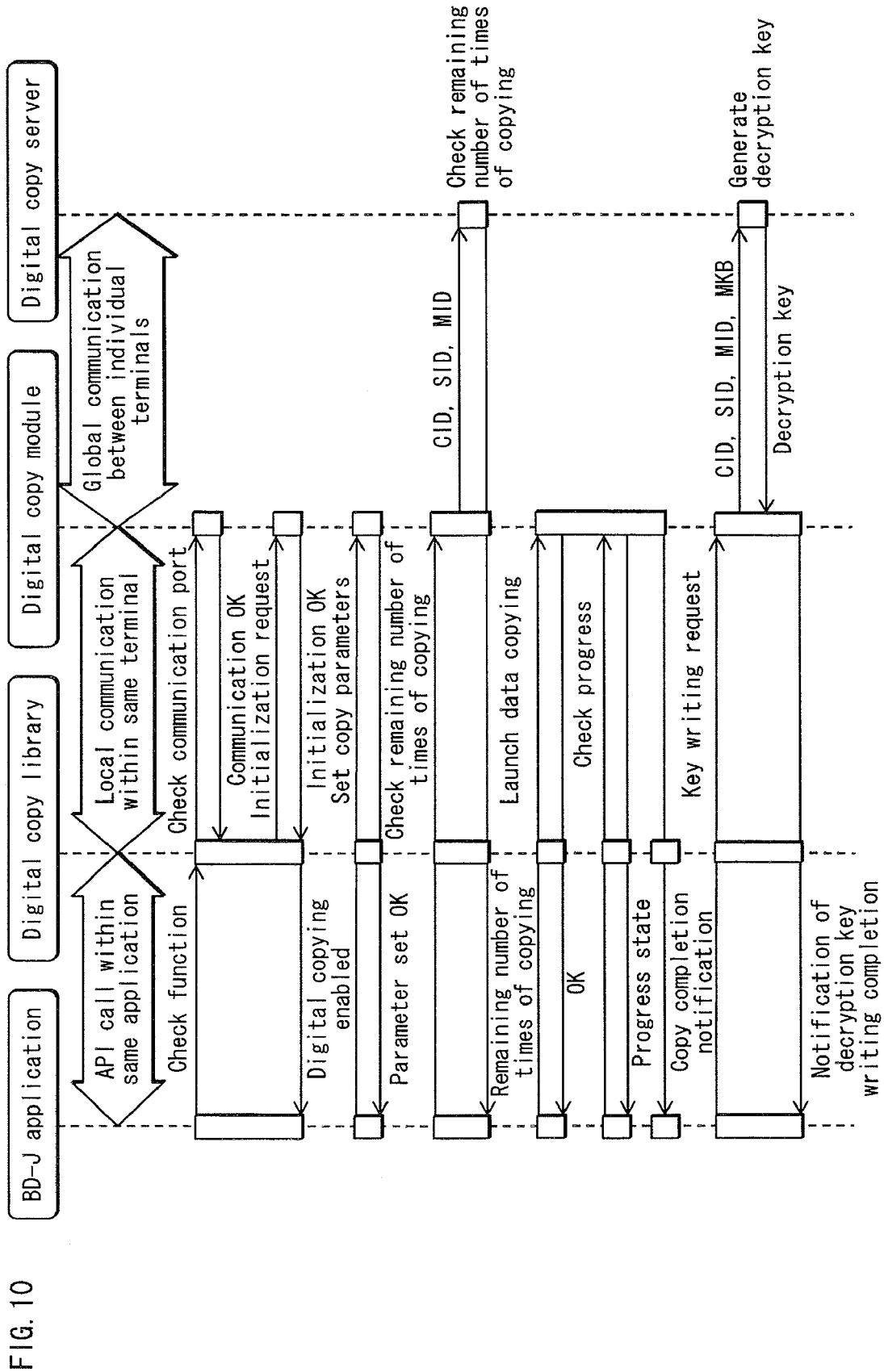
FIG. 10 illustrates transmission and reception of data between a BD-J application, a digital copy library, the digital copy module, and a digital copy server in embodiment 1 of the present invention.

FIG. 10 illustrates the sequence in which data is transmitted/received between the BD-J application, the digital copy library, the digital copy module, and the digital copy server.

The present embodiment is characterized in that two different communication paths are established, one between the digital copy module 424 and the BD-J application 701/the digital copy library 702, the other between the digital copy module 424 and the digital copy server 803. Specifically, a local communication within the same terminal is established between the BD-J application 701 and the digital copy module 424, while a global communication between individual terminals is established between the digital copy module 424 and the digital copy server 803. Note that no communication takes place between the BD-J application 701 and the digital copy library 702, and instead, a normal call of APIs, which is performed within the same application, takes place.

First, the BD-J application 701 judges whether or not the playback device supports digital copying. The judgment here of whether the playback device supports digital copying or not is performed according to the flowchart of FIG. 11. When the BD-J application 701 sends a request to the digital copy library 702 for judging whether or not the playback device supports digital copying, the digital copy library 702 checks whether there exists a system property ("digitalcopy.port") indicating a communication port allocated to digital copying (Step S101).

When the system property "digitalcopy.port" exists, the digital copy library 702 uses the communication port indicated by the system property for the transmission/reception of data with the digital copy module. In contrast, when the system property "digitalcopy.port" does not exist, the digital copy library 702 uses a predetermined communication port for the transmission/reception of data with the digital copy module. Note that, when using a predetermined communication port in the transmission/reception of data, it is preferable to utilize a private port as the predetermined communication port. This is since the digital copy module will exclusively occupy one communication port for digital copying, and there is a need to prevent conflict with a pre-existing network utilizing a communication port. More specifically, ports belonging in the range of 49152 to 65535 inclusive are recommended for use. In contrast, when there is a need of preventing conflict with a pre-existing network utilizing a communication port when using the system property "digitalcopy.port", or that is, when there is a possibility that the communication port used for digital copying may change every time, it may be conceived to use a "free port". A "free port" is a method of automatically allocating a port currently not in occupation by the playback device by selecting a port number 0. The use of the free port prevents port conflict, but however, the number of the port allocated to digital copying is due to change every time. Therefore, there is a need of notifying the digital copy library 702 of the number of the port to be used for digital copying. The system property "digitalcopy.port" is to be used in such notification of port number.

When the system property does not exist in Step S101, the digital copy library 702 establishes a connection with a predetermined fixed port (Step S102). In contrast, when the system property exists in Step S101, the digital copy library 702 establishes a connection with a port indicated by the system property (Step S103). Subsequently, the digital copy library 702 checks whether the establishment of the communication with the communication port has succeeded (Step S104). When the establishment of the communication with the communication port has failed, the digital copy library 702 judges that the present playback device does not support digital copying (Step S108).

When the establishment of the communication with the communication port has succeeded in Step S104, the digital copy library 702 requests for initialization of the digital copy module via the communication port (Step S105). Then, the digital copy library 702 receives a response to the request for initialization made in Step S105 from the digital copy module via the currently connected communication port (Step S106). When receiving a response indicating success of initialization in Step S106, the digital copy library 702 judges that digital copying can be executed on the present playback device (Step S107). When no response is received from the digital copy module, or a response indicating failure of initialization is received from the digital copy module, the digital copy library 702 judges that digital copying cannot be executed on the present playback device (Step S108).

The digital copy library 702 notifies the BD-J application of whether or not digital copying can be executed on the present playback device. When receiving a notification that digital copying can be executed, the BD-J application sets, to the digital copy module, parameters which are necessary in executing digital copying via the digital copy library. Such parameters include; a serial ID; a location of the copy source content; a URL of the digital copy server, a copy destination medium, and a resume playback point.

As the serial ID, the PMSN (Pre-recorded Media Serial Number) recorded in the BCA (Burst Cutting Area) may be used. Additionally, it is possible to use, as the serial ID, a value obtained by having the user manually input a coupon ID printed on a paper included in the package of the medium instead of the PMSN value. One advantage of utilizing the PMSN is that there is no need for having the user to manually input the value, and authentication is established automatically. On the other hand, if the PMSN is used, especially with respect to rental discs, only the first user will be given the privilege to execute the service, and it will be unfair for the second user and on because they will not be able to utilize the service. Therefore, in the case of rental discs, it is preferable that the coupon ID be manually input for authentication, whereas for retail discs, the use of PMSN is preferable.

The location of the copy source content is indicated by an absolute path up to the directory in which the content for a portable terminal is recorded. For instance, the absolute path may be "/mnt/bdrom/EMOVE/DATA01". In this case, "/mnt/bdrom" corresponds to the mount point of the BD-ROM medium.

The URL of the digital copy server is specified from among URLs indicating servers on the global network, and one example thereof is "http://xxx.yyy.zzz".

The copy destination medium is specified from among the list of copy destination media supported by the playback device. In detail, the BD-J application makes a request for a list of media supporting the present playback device to the digital copy module. In response, the digital copy module transmits, to the BD-J application, a list in the format of [<media type>_<number>]. For instance, supposing that the playback device is provided with one SD card slot and one USB memory slot, and therefore supports one SD card and one USB memory, the list will read [SD_1 USB_1]. When supposing that the playback device does not have an SD card slot but has 2 USB memory slots, the list will read [USB_1 USB_2]. When receiving the list of supported copy destinations, the BD-J application presents the list to the user. Further, the BD-J application receives a selection of a copy destination medium from among the media on the list, and determines the medium selected by the user as the copy destination medium.

The resume playback point is specified as the interval (ms) between the start point of the content for viewing on a portable terminal and the point (resume point) from which playback is to be resumed. The BD-J application, when the main content is a BD-J mode content, reads the playback time information set on the playback device from PSR(8) of the PSR set 421, and specifies the interval indicated by the playback time information as the resume playback point. In contrast, when the main content is an HDMV mode content, the BD-J application reads the playback time information set on the playback device from PSR(28), and specifies the interval indicated by the playback time information as the resume playback point. Here, since the playback time information obtained from either PSR(8) or PSR(28) is in units of a 45 kHz clock, the playback time information is converted to units of milliseconds before being specified as the resume playback point. For instance, when the contents has been viewed on the playback device for thirty minutes already, the value stored in either PSR(8) or PSR(28) is 81,000,000, and the resume playback point obtained as a result of the conversion is 1,800,000.

When specification of such parameters has been made by the BD-J application, the digital copy library transmits the specified parameters to the digital copy module via the currently connected communication port.

When the setting of such parameters has been completed, the BD-J application subsequently checks the remaining number of times of copying. The BD-J application performs the checking of the remaining number of times of copying in a similar way as applied in the setting of parameters. That is, the BD-J application sends a request to the digital copy module using the currently connected communication port and via the digital copy library. The remaining number of times copying can be performed is managed by the digital copy server. Therefore, when receiving a request for the checking of the remaining number of times of copying from the BD-J application, the digital copy module extracts, from the parameters currently being set, the content ID, the serial ID, and the media ID, and sends the three values so extracted to the digital copy server. Here, the content ID extracted is a value which is described in the EMOV_INF file of the protected contents for portable terminals which is the copy target, the serial ID extracted is a value which is specified by the BD-J application, and the media ID extracted is a value which is described in the system area of the copy destination medium. As mentioned in the above, a communication within the same terminal is established between the BD-J application 701, the digital copy library 702, and the digital copy module 424, and no external internet connection is necessary. On the other hand, a global internet connection is required for the connection between the digital copy module 424 and the digital copy server 803. The digital copy server 803 determines the remaining number of times of copying according to the three values received, and transmits a value indicating the remaining number of times of copying to the digital copy module 424. The digital copy module notifies the BD-J application of the remaining number of times of copying via the digital copy library.

The BD-J application checks the remaining number of times of copying, and when the remaining number of times of copying is "one or more", requests the digital copy module to launch digital copying. The copy launch request is sent to the digital copy module via the digital copy library and using the communication port, similar as in the above. When receiving the copy launch request, the digital copy module launches digital copying. During the execution of copying, the digital copy module notifies the BD-J application of copy progress state when requests are made therefor from the BD-J application. Note that, during the execution of the copying, the I/O processing is occupied by the copy execution unit 604, and thus, there is a possibility that contents on the BD-ROM may not be played back properly. Taking this into account, it is preferable that a notification be made to the user in advance that, for a certain period, (i) playback will be disabled, (ii) the disc should not be ejected, and (iii) power of the playback device should not be turned off. Be that as it may, there is still a high possibility of the user accidently ejecting the disc or turning off the power even when such a notification is made to the user. However, since the writing of the decryption key is not completed at this point and accordingly, the remaining number of times of copying has not decreased yet. Hence, even in a case where data copying results in failure for the above mentioned reasons, the remaining number of times of copying does not decrease. The remaining number of times of copying, which is managed by the digital copy server, decreases when a decryption key is downloaded from the digital copy server in the subsequent step.

When receiving a copy completion notification, the BD-J application requests for writing of a decryption key to the digital copy module. When receiving the decryption key writing request, the digital copy module extracts, from the parameters currently being set, the content ID, the serial ID, the media ID, and the MKB, and sends the four values so extracted to the digital copy server. The digital copy server generates a decryption key according to the received values, and sends the decryption key to the digital copy module. The digital copy module writes the decryption key received from the digital copy server to the copy destination medium. Upon completion of the writing of the decryption key, the digital copy module notifies the BD-J application of the completion of the writing of the decryption key via the digital copy library.

Subsequently, the digital copy module overwrites, to the MGR_DATA file which is the management file of the copy destination medium, a resume playback point specified by the BD-J application. When no specification is made of a resume playback point by the BD-J application, the digital copy module does not perform the overwriting of the MGR_DATA file.

Figure 12:
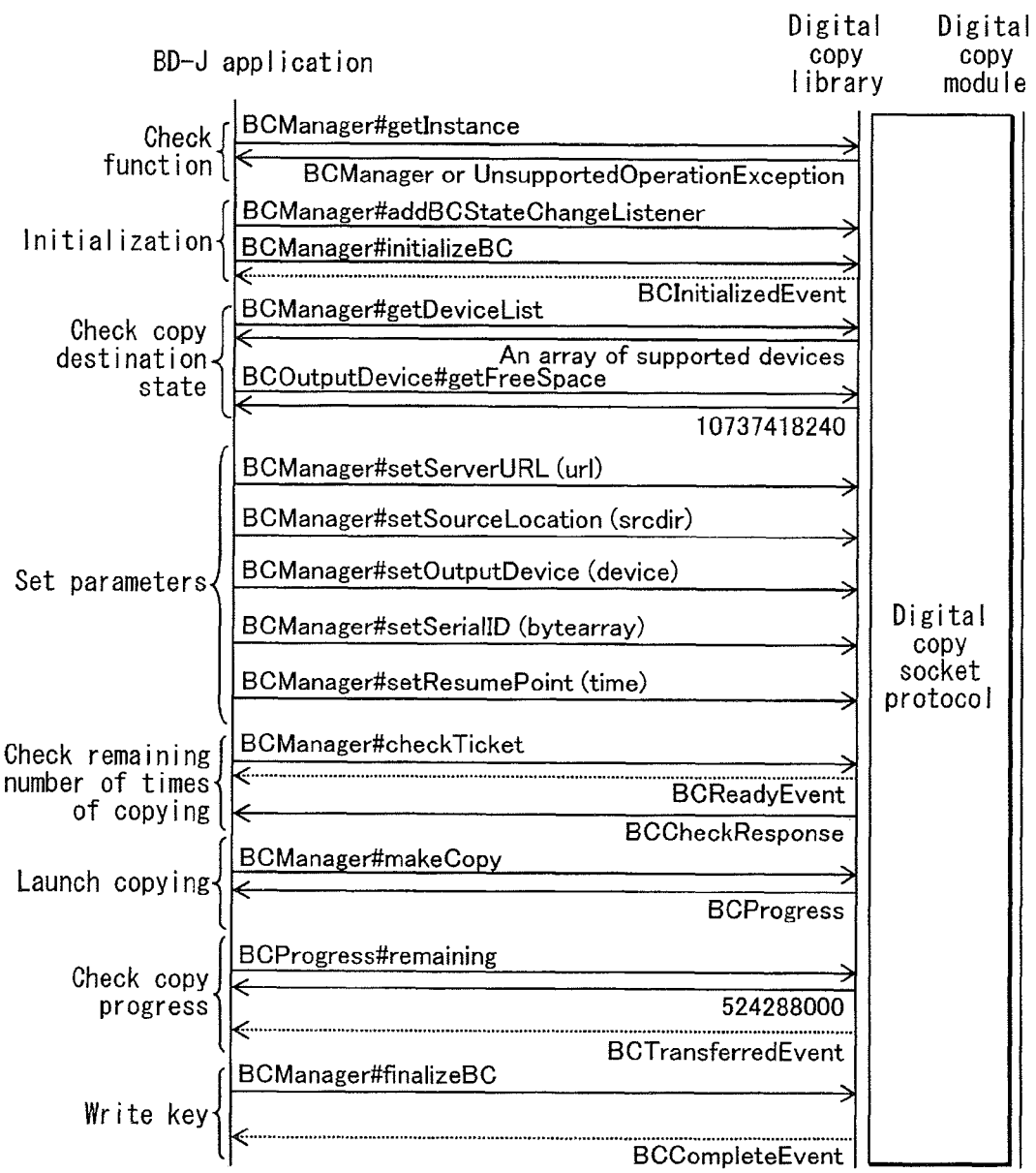
FIG. 12 is a sequential diagram illustrating digital copying performed by using digital copy library APIs in embodiment 1 of the present invention.

FIG. 12 illustrates a digital copying sequence where digital copy library APIs are used. The digital copy library provides the BD-J application with APIs which yield such effects as may be yielded if BD-J APIs were to be expanded. In fact, when the BD-J application issues a call using such APIs, the digital copy library converts the call into a digital copy socket protocol and performs transmission/reception of data with the digital copy module using the communication port for digital copying. In short, the digital copy library executes processing corresponding to the API called.

The following is a description of major APIs which are provided to the BD-J application by the digital copy library.

BCManager#getInstance( ): The BCManager#getInstance API obtains an instance of the BCManager class which has various types of methods for controlling the digital copy module. When the playback device does not support digital copying, the "UnsupportedOperationException" is thrown.

BCManager#addBCStatusChangeListener( ): The BCManager#addBCStatusChangeListener API is an API for monitoring the change in the state of the digital copy module. When a state change of the digital copy module is detected, the state after change is notified to the BD-J application.

BCManager#initializeBC( ): The BCManager#initializeBC API is an API for initializing the digital copy module. When this API is called, the digital copy library attempts to establish a connection with the digital copy module according to the flow of processing illustrated in FIG. 11. When the establishment of connection fails, the UnsupportedOperationException is thrown. When the initialization succeeds, the BCInitializedEvent is notified to the BD-J application.

BCManager#getDeviceList( ): The BCManager#getDeviceList API is an API for obtaining a list of media (SD card, USB memory) which are supported by the playback device as copy destinations. Each medium is represented as an instance of the BCOutputDevice class. The BCOutputDevice class has a method (BCOutputDevice#getName) for obtaining the type and number (SD_1, USB_1) of the medium indicated by the instance, a method (BCOutputDevice#getFreeSpace) for obtaining the amount of free space, and a method (BCOutputDevice#getTotalSpace) for obtaining the total space. In FIG. 12, in response to a call of the method (BCOutputDevice#getFreeSpace) for obtaining the amount of free space, "10737418240(byte)" is returned as one example of the amount of free space.

BCManager#setServerURL(URL): The BCManager#setServerURL API is an API for setting the URL of the digital copy server to the digital copy module.

BCManager#setSourceLocation(File srcdir): The BCManager#setSourceLocation API is an API for setting the location of the copy source to the digital copy module. The location of a content is indicated by an absolute path up to the directory in which a content for a portable terminal is recorded (e.g., "/mnt/bdrom/EMOVE/DATA01").

BCManager#setOutputDevice(device): The BCManager#setOutputDevice API is an API for setting the copy destination medium to the digital copy module. The copy destination medium is selected from the list of media obtained by the BCManager#getDeviceList( ) API.

BCManager#setSerialId(byte[ ]): The BCManager#setSerialId API is an API for setting the serial ID to the digital copy module.

BCManager#setResumePoint(time): The BCManager#setResumePoint API is an API for setting the resume playback point to the digital copy module. The BCManager#setResumePoint(time) API can be called except for when the digital copy module is in the later-described NOT_INIT state.

BCManager#checkTicket( ): The BCManager#checkTicket API is an API for requesting the digital copy module to check the remaining number of times of copying. Upon receiving the request for checking the remaining number of times of copying, the digital copy module makes an inquiry of the remaining number of times of copying to the digital copy server by using the currently set parameters. The obtained remaining number of times of copying is returned to the BD-J application as an instance of the BCCheckResponse class. The BD-J application can check the remaining number of times of copying by calling the BCCheckResponse#remainingTimesOfCopy( ). Also, when the remaining number of times of copying is "one or more", a BCReadyEvent is notified to the BD-J application.

BCManager#makeCopy( ): The BCManager#makeCopy API is an API for requesting the digital copy module to launch digital copying. After requesting the digital copy module to launch copying, the digital copy library returns the BCProgress instance, which indicates the progress state, to the BD-J application, and the copy processing is performed by the digital copy module asynchronously. The BD-J application can obtain the total number of copied bytes by calling a BCProgress#total( ) API, and obtain the number of bytes remaining to be copied by calling a BCProgress#remaining( ) API (in FIG. 12, as a response to a call of the BCProgress#remaining( ), "524288000(byte)" is returned as one example of the number of bytes that remains to be copied). When the copy processing has been completed, the BCTransferredEvent is notified to the BD-J application.

BCManager#finalizeBC( ): The BCManager#finalizeBC API is an API for requesting the digital copy module to write a decryption key. When the writing of the decryption key has been completed, the BCCompleteEvent is notified to the BD-J application.

BCManager#cancelCopy( ): The BCManager#cancelCopy API is an API for canceling the copy processing of the digital copy module. When the cancellation succeeds, the BCCancelEvent is notified to the BD-J application.

BCManager#close( ): The BCManager#close API is an API for releasing the resources assigned to the digital copy module to end the digital copy processing.

Figure 13:
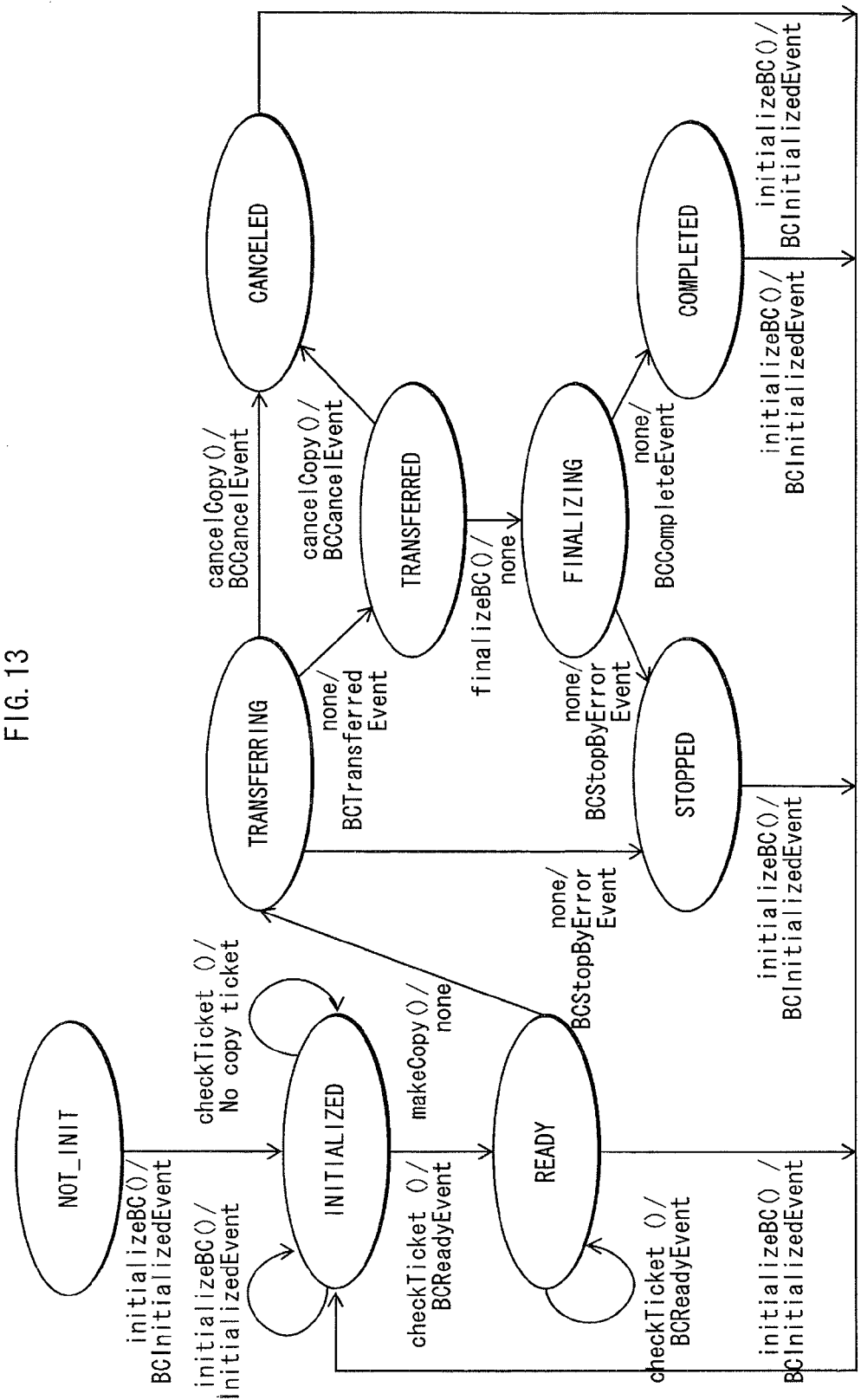
FIG. 13 illustrates the transition between states of the digital copy module in embodiment 1 of the present invention.

FIG. 13 illustrates transition between the states of the digital copy module. The digital copy module can transition among the nine states described in the following depending on the progress in the digital copy processing.

NOT_INIT: a state of the digital copy module indicating that the digital copy module has not been initialized yet. This state is the initial state of the digital copy module immediately after the loading of the BD-ROM. When the BD-J application calls BCManager#close in another state, and terminates the digital copy processing, the digital copy module returns to the NOT_INIT state. When BCManager#initializeBC is called while the digital copy module is in this state, the digital copy module transitions to the INITIALIZED state, and a BCInitializedEvent is notified to the BD-J application.

INITIALIZED: a state of the digital copy module indicating that the digital copy module has been initialized, and the function of the digital copy processing can be called from the BD-J application. When the BD-J application sets the necessary parameters (for example, the URL of the digital copy server that is set by calling BCManager#setServerURL (URL), the location of the copy source contents that is set by calling BCManager#setSourceLocation(File srcdir), the copy destination medium that is set by calling BCManager#setOutputDevice(device), and the serial ID that is set by calling BCManager#setSerialId(byte[ ])), calls BCManager#checkTicket( ) and finds that the remaining number of times of copying is "one or more" while the digital copy module is in this state, the digital copy module transitions to the READY state, and a BCReadyEvent is notified to the BD-J application. When it is found that the remaining number of times of copying is "zero", the digital copy module remains in the INITIALIZED state, not transferring to the READY state. After the digital copy processing is executed, and when the BD-J application calls BCManager#initializeBC( ) while the digital copy module is in the READY, CANCELED, STOPPED or COMPLETED state, the digital copy module transitions to the INITIALIZED state, and a BCInitializedEvent is notified to the BD-J application.

READY: a state of the digital copy module in which all parameters necessary for the digital copy processing have been set, all such parameters are valid, and thus the digital copy module is ready to perform copying. When BCManager#makeCopy( ) is called in this state, the digital copy module transitions to the TRANSFERRING state.

TRANSFERRING: a state of the digital copy module indicating that the copying of a protected content for portable terminals has been started. When the copying of a protected content for portable terminals has been completed, the digital copy module transitions to the TRANSFERRED state, and a BCTransferredEvent is notified to the BD-J application. Also, when a BCManager#cancelCopy is called before the data copying has been completed, the data copying is cancelled, the digital copy module transitions to the CANCELED state, and a BCCancelEvent is notified to the BD-J application. When an error occurs during a data copying due to the removal of the copy destination medium or the like, the digital copy module transitions to the STOPPED state, and a BCStopByErrorEvent is notified to the BD-J application.

TRANSFERRED: a state of the digital copy module in which copying of a protected content for portable terminals has been completed, and the digital copy module is ready to write the decryption key. When a BCManager#finalizeBC( ) is called in this state, the digital copy module transitions to the FINALIZING state. Also, when a BCManager#cancelCopy is called in this state, the digital copy module transitions to the CANCELED state, and a BCCancelEvent is notified to the BD-J application.

FINALIZING: a state of the digital copy module indicating that the decryption key is being obtained from the digital copy server and the obtained decryption key is being written onto the copy destination medium. Once the digital copy module enters this state, the BD-J application cannot cancel this state even when calling a BCManager#cancelCopy( ) and the cancellation request is rejected. When an error occurs during writing of the decryption key due to the removal of the copy destination medium or the like, the digital copy module transitions to the STOPPED state, and a BCStopByErrorEvent is notified to the BD-J application. When writing of the decryption key is completed, the digital copy module 35 transitions to the COMPLETED state, and a BCCompleteEvent is notified to the BD-J application.

COMPLETED: a state of the digital copy module indicating that a data copying of a protected content for portable terminals has been completed, writing of the decryption key has been completed, and the digital copy processing has succeeded. When transitioning to the COMPLETED state, the digital copy module overwrites the MGR_DATA file which is a management file of the copy destination medium with the resume playback point specified by the BD-J application. In addition, when a specification of a resume playback point is made from the BD-J application while in the COMPLETED state, the digital copy module immediately overwrites the MGR_DATA file which is a management file of the copy destination medium with the specified resume playback point. When BCManager#initializeBC( ) is called while the digital copy module is in the COMPLETED state, the digital copy module transitions to the INITIALIZED state once again, and a BCInitializedEvent is notified to the BD-J application.

CANCELED: a state of the digital copy module indicating that a data copying of a protected content for portable terminals has been cancelled in the midst of copying. A part of the data that has been copied preceding the cancelation is cleared when the digital copy module transitions to the CANCELED state.

STOPPED: a state of the digital copy module indicating that a data copying or writing of the decryption key has failed due to an occurrence of an error. Possible causes of errors include a shortage of free space, a writing failure due to write protection of the copy destination medium, a removal of the copy destination medium in the midst of the processing, and an occurrence of an I/O error due to a damage in the copy destination medium. Detailed information regarding the cause of a copy failure is recorded in the BCStopByError-Event instance that occurs when the digital copy module transitions to the STOPPED state. The BD-J application can refer to BCStopByErrorEvent to recognize a cause of an error. This concludes the explanation of the contents of the API calls transmitted between the BD-J application and the digital copy library when a digital copy is executed.

Figure 14:
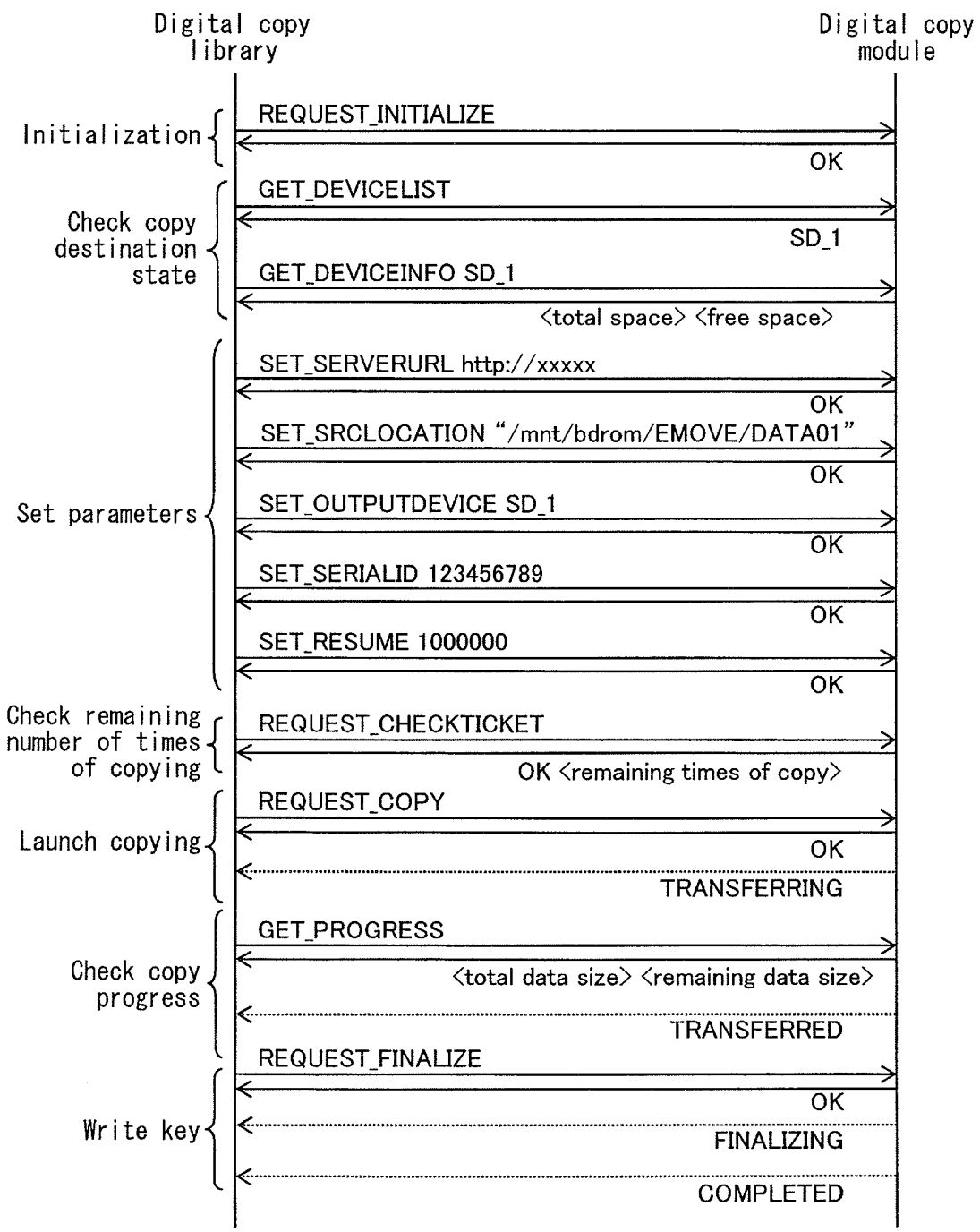
FIG. 14 illustrates digital copy socket protocols used in the exchange of information between the digital copy library and the digital copy module in embodiment 1 of the present invention.

FIG. 14 illustrates one example of a digital copy socket protocol for communication between the digital copy library and the digital copy module. The digital copy library converts a digital copy library API provided to the BD-J application to a corresponding digital copy socket command, and performs the transmission/reception of data with the digital copy module utilizing a socket communication.

The example illustrated in FIG. 14 is provided under the presumption that the playback device supports only the SD card slot.

Figure 11:
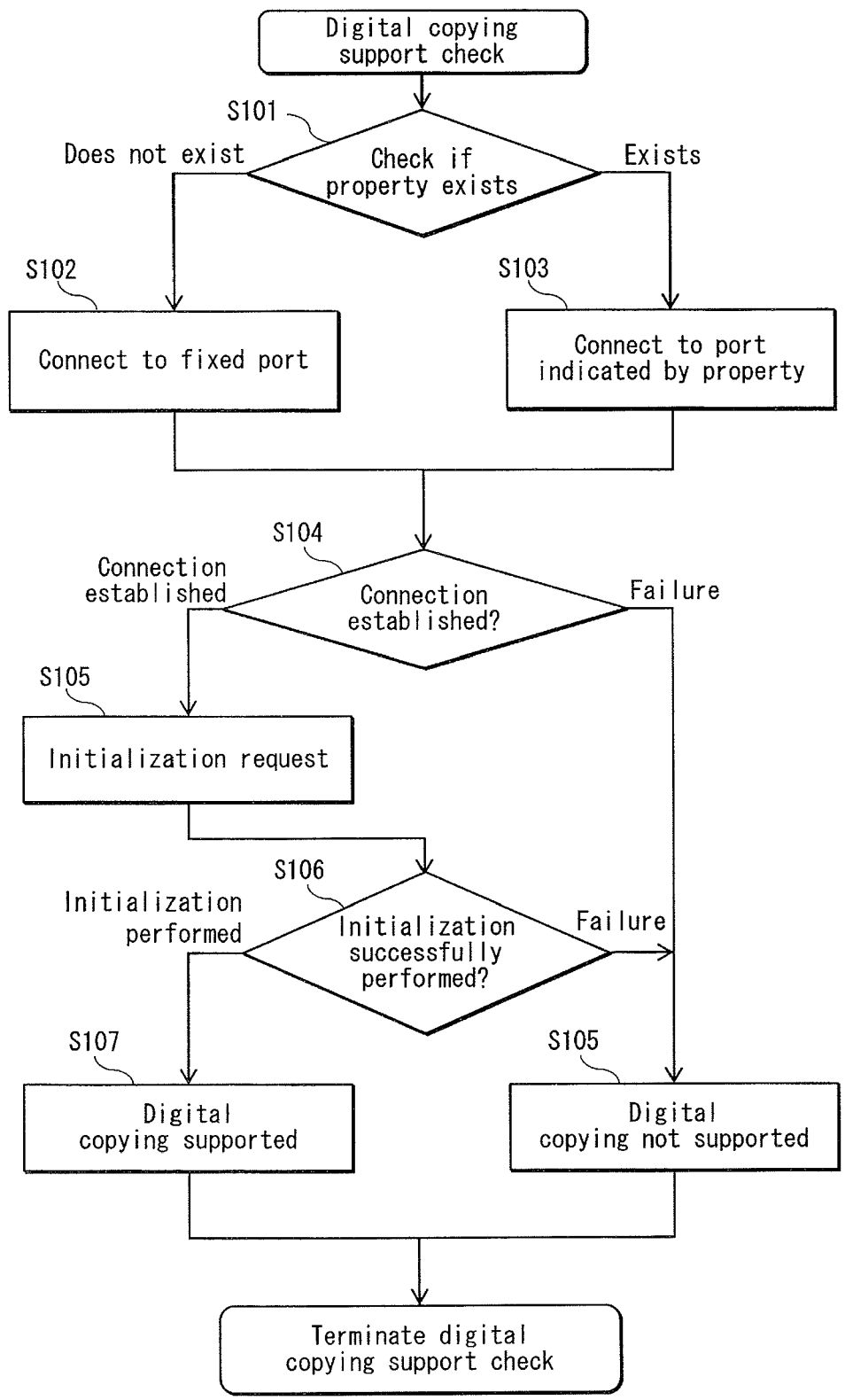
FIG. 11 is a flowchart illustrating a digital copy propriety judgment in embodiment 1 of the present invention.

When a BCManager#initializeBC is called from the BD-J application and thus, a request for initialization of the digital copy module is made, the digital copy library specifies a number of the port to be used in the communication with the digital copy module according to the flow of processing illustrated in FIG. 11. When the specification of a port is completed, the digital copy library transmits, to the specified port, a socket command which is constituted of a character sequence "REQUEST_INITIALIZE". When receiving a character sequence "REQUEST_INITIALIZE" via an open port, the digital copy module judges that an initialization request has been made, and newly opens a port for asynchronous event for clearing the parameters (for example, the URL of the digital copy server having been set previously, the location of the copy source contents, the copy destination medium, and the serial ID) and for notification of state transition. Further, the digital copy module transmits a character sequence "OK" via the port via which the socket command has been received to notify the digital copy library that the initialization has been completed. When receiving the character sequence "OK" via the port via which it has transmitted the socket command, the digital copy library determines that the initialization of the digital copy module has been completed.

When the initialization of the digital copy module has been completed, the digital copy library calls a GET_ASYN-CPORT command, and obtains the port number of the port having been opened for the asynchronous notification for notification of state transition. As could be seen from the above, the digital copy socket protocol is composed of two types of ports: (1) a port for the digital copy socket command (synchronous command); and (2) a port for state transition notification of the digital copy module (asynchronous event). In detail, the port for the digital copy socket command is utilized such that a command is issued from the digital copy library to the digital copy module; and the port for state transfer notification is used such that an event is notified unilaterally from the digital copy module to the digital copy library. When a BCManager#addBCStateChangeListner is called from the BD-J application, the digital copy library starts monitoring the port for state transition notification, converts a state transition notification sent from the digital copy module into an event of the digital copy library API, and thus notifies the BD-J application of the transition of state of the digital copy module.

Subsequently, when a BCManager#getDeviceList is called from the BD-J application and a request is made for the list of media supported by the playback device as the copy destination, the digital copy library calls a GET_DEVICELIST command, and a request is made to the digital copy module for the list of supported media. The digital copy module transmits, as the response to the GET_DEVICELIST command, the list of supported media via the port for the socket command. The list of supported media is returned in the form of <type of medium>_<number>, and when a plurality of media are supported, the multiple media are divided by blank characters in between (example: SD_1<sp>USB_1, where <sp> represents a blank character). FIG. 14 illustrates an example in which the playback supports only an SD card slot and thus SD_1 is returned as a response.

When BCOutputDevice#getTotalSpace or BCOutputDevice#getFreeSpace is called from the BD-J application and information of the total space or free space is requested for, the digital copy library transmits the GET_DEVICEINFO command to the digital copy module via the port for the socket command, and receives information of the total space or free space in response. The GET_DEVICEINFO command has an argument which specifies a type of medium, and a blank character is inserted between the command name and the argument. For example, when information of SD_1 (type: SD card, number: 1) is requested, a character sequence "GET_DEVICEINFO<sp>SD_1" is transmitted to the digital copy module via the port for the socket command.

In the following, description is made on the setting of parameters. The setting of parameters includes: (i) a transmission of the SET_SERVERURL command and a reception of a response (OK); (ii) a transmission of the SET_SRCLOCATION command and a reception of a response (OK); (iii) a transmission of the SET_OUTPUTDEVICE command and a reception of a response; (iv) a transmission of the SET_SERIALID command and a reception of a response (OK); and (v) a transmission of the SET_RESUME command and a reception of a response (OK). Here, it should be noted that the SET_RESUME command can be called at any point in time, except for when the digital copy module is in the NOT_INIT state.

Similarly, when parameters necessary for digital copying are to be set, the values are transmitted from the digital copy library to the digital copy module via the digital copy socket command, and the parameters are set to the digital copy module. In addition, when the above commands are completed in success in a case where the necessary parameters have been already set, a previously set parameter is overwritten with a new parameter. The command name and the argument are divided by a blank character. For example, when a command of "SET_RESUME 1000000" is transmitted to the digital copy module from the digital copy library, the command indicates that the resume playback point is a point on the content that is reached when 1000 s elapses from the start point of the content.

When necessary parameters have been set and BCManager#checkTicket( ) is called from the BD-J application, the digital copy library sends the REQUEST_CHECKTICKET to the digital copy module. Upon receiving the REQUEST_CHECKTICKET command, the digital copy module extracts values of the content ID, serial ID and media ID based on the parameters having been set, and checks the remaining number of times of copying by sending the three extracted values to the digital copy server. The remaining number of times of copying obtained from the digital copy server is sent to the digital copy library as a return value with respect to the REQUEST_CHECKTICKET command.

When BCManager#makeCopy is called from the BD-J application, the digital copy library transmits the REQUEST_COPY command to the digital copy module, requesting for the start of copying. When confirming that the remaining number of times of copying is "one or more", the digital copy module 35 launches data copying, and returns OK as a return value with respect to the REQUEST_COPY command. When BCProgress#remaining( ) or BCProgress#total( ) is called from the BD-J application during the execution of data copying, the digital copy library transmits the GET_PROGRESS command to the digital copy module, obtains the total number of bytes to be copied and the remaining number of bytes to be copied from the digital copy module, and returns the obtained values to the BD-J application. Upon completion of the data copying, the digital copy module transitions to the TRANSFERRED state, and notifies the digital copy library via the port for asynchronous event of the transition thereof to the TRANSFERRED state.

When BCManager#finalizeBC( ) is called from the BD-J application after the data copying is completed, the digital copy library sends the REQUEST_FINALIZE command to the digital copy module. Upon receiving the REQUEST_FINALIZE command, the digital copy module extracts values of the content ID, the serial ID, the media ID, and the MKB based on the parameters having been set, and sends the four extracted values to the digital copy server to obtain a decryption key. The digital copy module writes the obtained decryption key to the protected area of the copy destination medium, and upon completion of the writing, notifies the digital copy library via the port for asynchronous event of the transition to the COMPLETED state. Subsequently, the digital copy module overwrites, to the MGR_DATA file which is the management file of the copy destination medium, the resume playback point specified by the SET_RESUME command. When a specification of the resume playback location is made using the SET_RESUME command when in the COMPLETED state, the digital copy module immediately overwrites, to the MGR_DATA file which is the management file of the copy destination medium, the specified resume playback point.

This concludes the description on the digital copy socket protocol for communication between the digital copy library and the digital copy module. As described above, all transmission/reception of commands and event notifications between the digital copy library and the digital copy module are performed through the local communication (the socket communication using the ports) in the playback device. On the other hand, a global communication is utilized for communication between the digital copy module and the digital copy server in the obtaining of the remaining number of times of copying and the obtaining of the decryption key.

Figure 15:
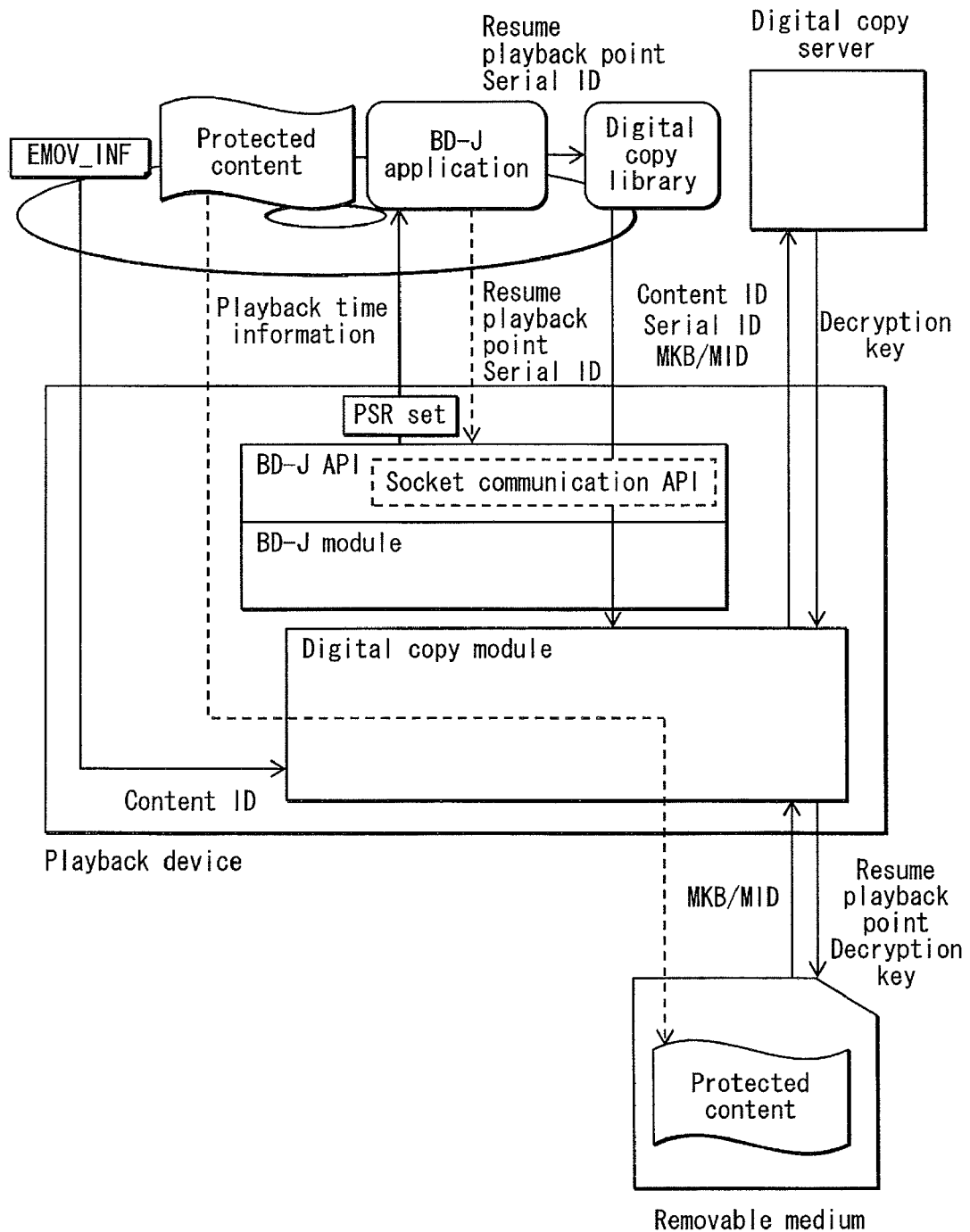
FIG. 15 illustrates the flow of data in digital copy processing in embodiment 1 of the present invention.

FIG. 15 illustrates the flow of data in the digital copy processing. The main forms of data involved in the digital copy processing include: the serial ID; the content ID; the media ID (MID); the MKB; the playback time information; the resume playback point; the protected content for portable terminals; and the decryption key. The serial ID is specified by the BD-J application. The serial ID so specified is passed on to the digital copy library, and further passed on to the digital copy module via the socket communication. A content ID is read from the EMOV_INF file existing below the protected contents storage directory (DATAxx directory) of the disc specified by the BD-J application. Each of the media ID and the MKB is read by the digital copy module from the system area of the copy destination removable medium specified by the BD-J application. The playback time information is read from either PSR(8) or PSR(28) of the PSR set by the BD-J application. The resume playback point is obtained by the BD-J application converting playback time information, which has a size based on a 45 kHz clock, into milliseconds. The resume playback point is passed on to the digital copy library, and further passed on to the digital copy module via the socket communication API.

The digital copy module transmits, to the digital copy server, the serial ID, the content ID, the media ID (MID), and the MKB, all of which is obtained based on the parameters having been set from the BD-J application. Further, the digital copy module obtains the decryption key from the digital copy server, and writes the decryption key obtained to the protected area of the copy destination medium. In addition, the digital copy module writes the resume playback point specified by the BD-J application via the socket communication API to the MGR_DATA file which is a management file of the copy destination medium. This concludes the description on the flow of data involved in the digital copy processing.

Furthermore, the decryption key written to the protected area of the copy destination medium includes key information (title key) for decrypting encrypted data included in the protected content for portable terminals which is copied to the user area of the copy destination medium as a result of digital copying. The decryption key is encrypted such that decryption thereof can be performed by using the MKB recorded in the system area of the copy destination medium.

Note that, when using, on a portable terminal, the above-described protected content for portable terminals which has been digital-copied onto the copy destination medium (here, "using" stands for the decryption and playback of the protected content for portable terminals), the portable terminal decrypts the encrypted decryption key written in the protected area of the copy destination medium by using the MKB recorded in the system area of the copy destination medium, extracts the key information (title key) from the decryption key, and decrypts encrypted data (digital streams) contained in the protected content for portable terminals by using the extracted key information as necessary.

Figure 16:
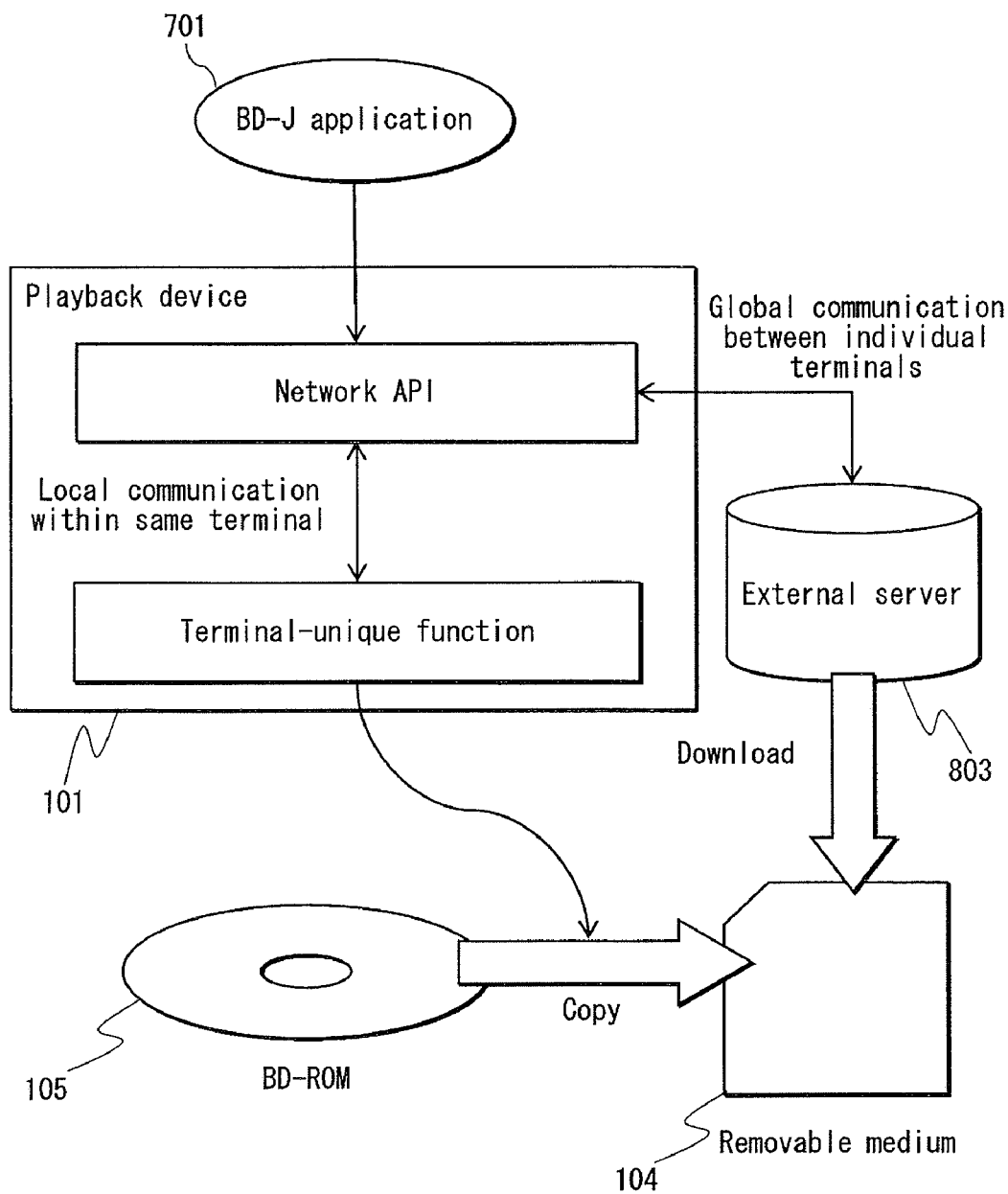
FIG. 16 illustrates communication paths extending from the BD-J application in embodiment 1 of the present invention.

FIG. 16 is a diagram showing the communication paths when communication is carried out by the BD-J application with the use of network APIs. As already described above, in the present embodiment, a socket communication API, which is a conventional network API, is directed internally within the terminal. Thus the calling of terminal-unique functions, which are not originally provided APIs of the BD-J module, is made possible. Conventionally, network APIs in BD-J applications on BD-ROMs have been used for the purpose of connecting to external servers and thus downloading such additional contents as bonus videos, and additional subtitles and applications. However, in the present embodiment, network APIs are not externally extended but instead utilized to establish a local communication within a single terminal. This results in, seen from the side of the BD-J application, the playback terminal currently in operation being accessible in a server-like manner. Thus, various functions which expand beyond the limits of provided APIs are called.

Figure 17:
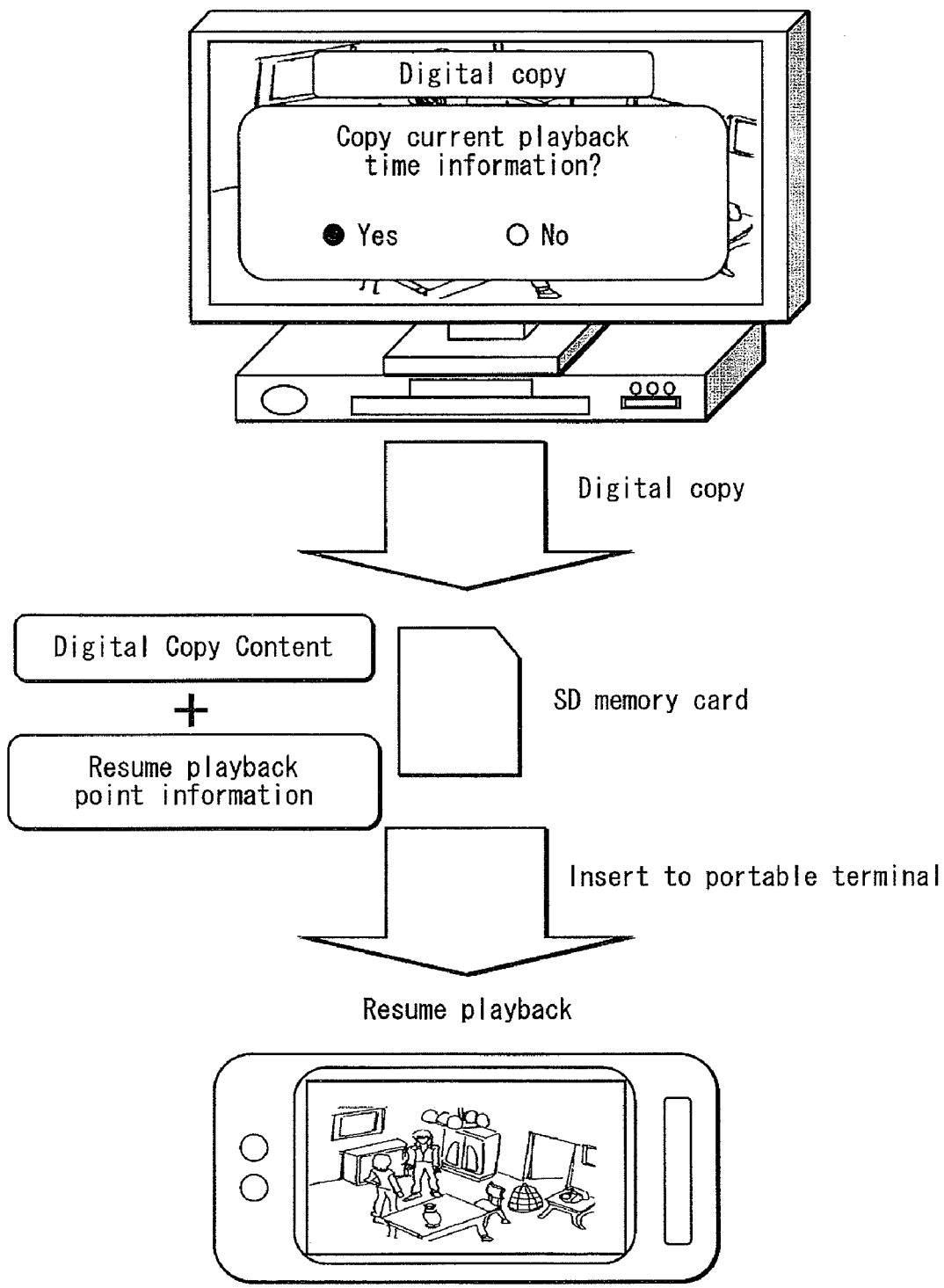
FIG. 17 illustrates how playback time information is copied in embodiment 1 of the present invention.

Subsequently, description is provided on the specification of a resume playback point by the BD-J application. FIG. 17 illustrates how playback time information is copied. As is illustrated in FIG. 17, when executing digital copying, the BD-J application asks the user whether or not to additionally copy playback time information. When the user chooses to copy playback time information, the BD-J application reads playback time information from the PSR set 421, and makes a specification of a resume playback point of the copy destination to the digital copy module according to the parameters read. Thus, the digital copy module performs digital copying with a specification of a resume playback point of the copy destination according to orders provided from the BD-J application. When the user does not choose to copy playback time information, the BD-J application does not make a specification of the resume playback point on the copy destination medium to the digital copy module. Thus, the digital copy module performs a digital copy according to orders provided from the BD-J application without making a specification of a resume playback point on the copy destination medium. In addition, configuration may be made such that digital copying is always performed with a specification of a resume playback point.

Figure 18:
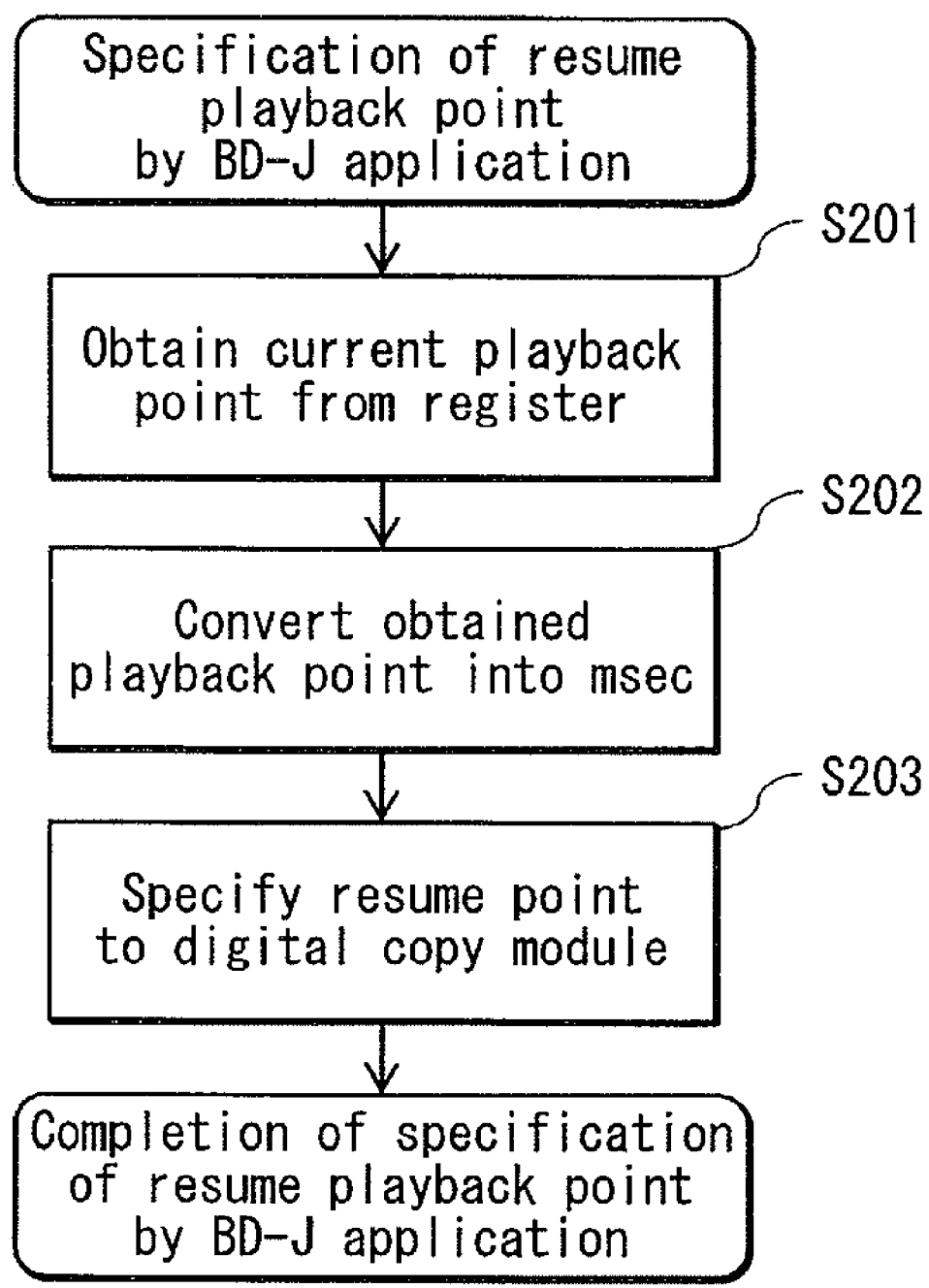
FIG. 18 is a flowchart illustrating resume playback point specification processing which is performed by the BD-J application with respect to the digital copy module in embodiment 1 of the present invention.

Subsequently, description is provided on specification processing of a resume playback point. FIG. 18 is a flowchart illustrating the specification processing of a resume playback point performed by the BD-J application with respect to the digital copy module. As is illustrated in FIG. 18, firstly, the BD-J application obtains current playback time information from the PSR(8) or the backup register PSR(28) of the PSR set 421 (Step S201). When the main content is an HDMV mode title, the backup register PSR(28) is used for storing the resume point. Thus, the BD-J application obtains the playback time information from PSR(28). On the other hand, when the main content is a BD-J mode title, the backup register is not utilized. Thus, the BD-J application obtains the current playback time information from PSR(8).

After having obtained the playback time information, the BD-J application converts the playback time information obtained from the PSR set 421 into milliseconds (Step S202). This unit conversion is required, since the playback time information obtained from PSR(8) or PSR(28) is based on a 45 kHz clock, while the resume playback point to be specified to the MGR_DATA file of the copy destination is to be in milliseconds.

Following the conversion of units, the BD-J application makes a specification of the resume playback point to the digital copy module (Step S203). The SET_RESUME command is utilized in making the specification of the resume playback point to the digital copy module. The resume playback point specified by the SET_RESUME command is recorded in the MGR_DATA file, which is a management file of the copy destination medium, as playback location information. Here, it should be noted that the SET_RESUME command can be called at any time point except for when the digital copy module is in the NOT_INIT state. However, the timing at which the specified resume playback point is applied as the playback location information of the MGR_DATA file of the copy destination SD memory card is after the writing of the decryption key has been completed, or in other words, when the digital copy module transitions to the COMPLETED state. When the digital copy module is already in the COMPLETED state when the SET_RESUME command is called, the resume playback point specified by the SET_RESUME command is immediately applied to the MGR_DATA file of the copy destination medium. This concludes the description on the specification processing of the resume playback point performed by the BD-J application with respect to the digital copy module. Subsequently, description is provided on digital copy processing using the resume playback point specified through the specification processing.

Figure 19:
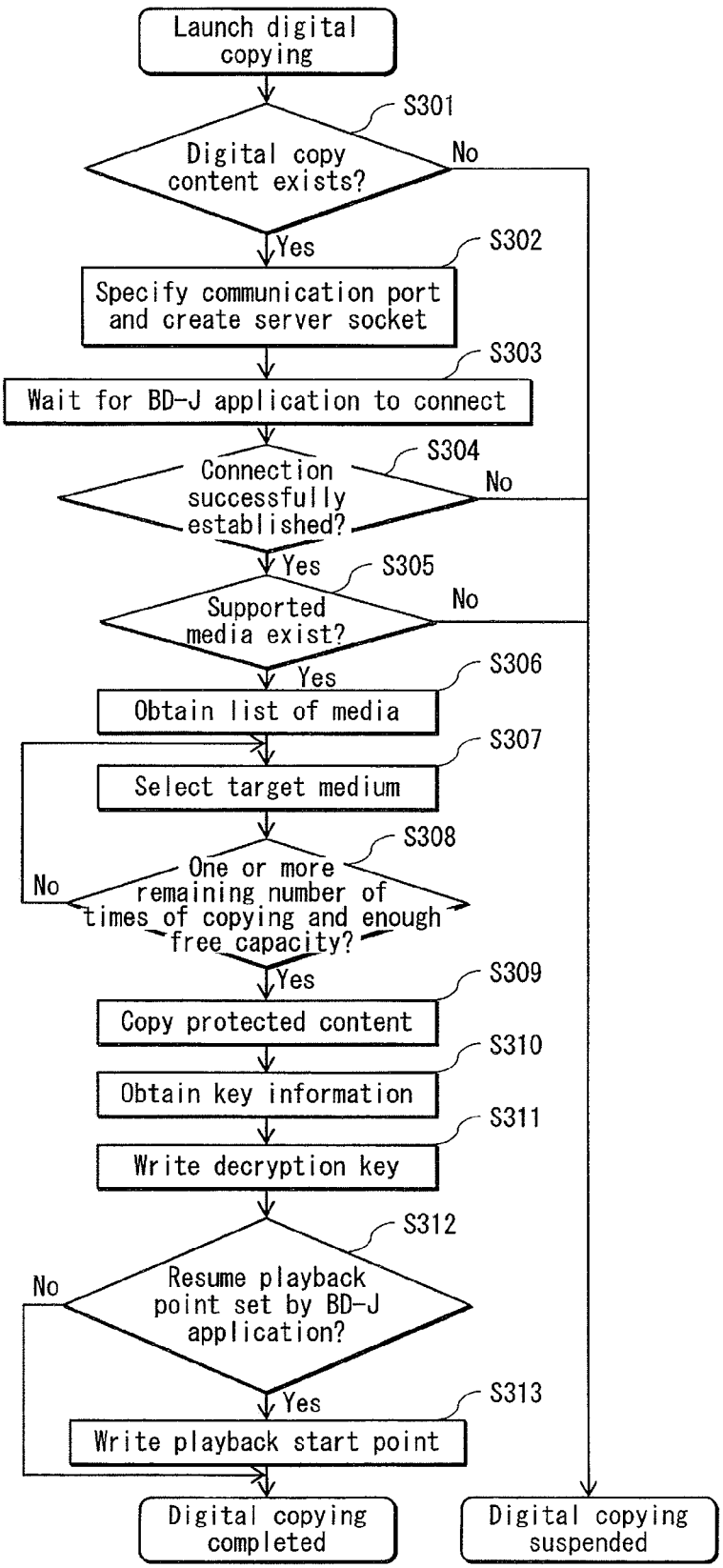
FIG. 19 is a flowchart illustrating digital copy processing performed by the digital copy module in embodiment 1 of the present invention.

FIG. 19 is a flowchart illustrating the digital copy processing performed by the digital copy control unit. First, as illustrated in FIG. 19, the digital copy module 424 checks whether or not a protected content for portable terminals exists on the disc inserted in the playback device (Step S301). A protected content for portable terminals is recorded under the EMOVE directory immediately below the root directory of the disc. The digital copy module 424 determines whether or not a protected content for portable terminals exists on the disc by checking whether this "EMOVE" directory exists. Note that the judgment of whether a protected content for portable terminals exists does not necessarily have to be made according to the existence of the "EMOVE" directory. The judgment may be made according to whether or not a predetermined file exists indicating the existence of a protected content for portable terminals on the disc.

When it is judged that a protected content for portable terminals does not exist (Step S301: NO), the digital copy processing is suspended. When it is judged that a protected content for portable terminals exists (Step S301: YES), the digital copy module 424 creates a server socket by specifying a communication port for digital copy socket commands (Step S302). The reason why a server socket is created on the condition that a protected content for portable terminals exists is since it is desirable to open the port during as short a period as possible. This is because resources may be unnecessarily consumed and attacks may be attempted by unauthorized applications if the server socket is always opened and the port is opened for a longer period of time than necessary. Thus, a server socket is created and a port is opened only when it is judged in Step S301 that protected contents for portable terminals exist. Other methods for minimizing the time period for which the port is opened include: creating a server pocket and opening a port only when the BD-J application is in operation (namely, only during playback of a BD-J title); and opening a port after receiving a port open instruction from the BD-J application. In the latter method, a port open instruction is issued by the BD-J application while the port is in closed state, and thus the port open instruction needs to be received by a method other than the port communication. One example of such method is the adding of APIs, but however, the adding of APIs would contradict with the aim of the present invention (the aim of the present invention is to completely exclude the adding of all additional APIs for the purpose of maintaining compatibility). Therefore, the instruction needs to be received without adding any additional APIs. One example of a means for conveying the port open instruction is, for example, using a general-purpose system property API in the following way: when a value is set to a predetermined property by the BD-J application, or when a predetermined value is set to one of the general-purpose registers, it is recognized that a port open request has been made. When using a system property API, a port can be opened by, for example, preparing a property name "digital-copy.portstatus" in advance and setting "OPEN" to a value indicated by the property name.

When a server socket has been created and a communication port for digital copy socket command is opened in Step S302, the digital copy module 424 waits for a BD-J application (including a digital copy library) to connect to the port (Step S303). The connection request from the BD-J application, as already explained referring to FIG. 14, is completed by (i) the digital copy module and the BD-J application (digital copy library) mutually exchanging a predetermined command character sequence (or binary data), and (ii) the two parties mutually confirming that the data received from the other party matches an expected value. As a matter of course, when the data received from the other party does not match the expected value, a judgment is made that the other party is unauthorized, and thus the processing is suspended at this point (Step S304: NO).

When judging in Step S304 that the connection with the BD-J application has been successfully established (Step S304: YES), the digital copy module waits for a request of a list of copy destinations (a list of copy destination media supported by the playback device) of the digital copy to be made by the BD-J application. When receiving the request via the communication port, the digital copy module checks the media supported by the playback device as the copy destination of the protected content for portable terminals (Step S305). When there is no medium supported as the copy destination of the protected content for portable terminals (Step S305: NO), the digital copy is suspended. When there is at least one medium supported as the copy destination (Step S305: YES), the digital copy module transmits a list of the at least one medium to the BD-J application via the communication port (Step S306). Although the digital copy module is able to determine whether the at least one medium does not have enough free space, the list of the at least one medium returned to the BD-J application in Step S306 is to include media which do not have a sufficient amount of free space and media which have not yet been inserted to the playback device. This is since, if media having an insufficient amount of free space is excluded from the list returned to the BD-J application, it cannot be judged whether the media have been excluded from the list for not being supported by the playback device or for not having a sufficient amount of free space. That is, in a case where a certain medium is supported by the playback device but does not have a sufficient amount of free space, the user may be provided with a choice of securing a sufficient amount of free space by deleting unnecessary files from the medium, for example. Thus, it is desirable that the list returned in Step S306 include media not having a sufficient amount of free space. For the same reason, by not excluding media which have not been inserted in the playback device from the list, a notification can be made to the user that the insertion of a medium has been forgotten. In addition, it may be further conceived to provide marks (or flags) on the list to indicate media which have been judged, in advance, not to have a sufficient amount of free space or to be not inserted to the playback device.

Subsequently, the BD-J application presents the list of copy destinations so obtained to the user. When a copy destination medium has been selected by the user, the BD-J application notifies the digital copy module of the medium selected by the user (Step S307). Following this, the digital copy module checks whether the selected medium has a sufficient amount of free space, and whether the remaining number of times of copying of the selected medium is "one or more" (Step S308). When it is judged that the selected medium does not have a sufficient amount of free space or that the remaining number of times of copying of the selected medium is "0" (Step S308; NO), the digital copy module notifies the BD-J application that the selected medium does not have a sufficient amount of free space or that the remaining number of times of copying of the selected medium is "0" In order to check the remaining number of times of copying of a certain medium, the digital copy module needs to make a query to the digital copy server. When receiving a notification, from the digital copy module, that the selected medium does not have a sufficient amount of free space, the BD-J application returns to Step S307, and either (i) has the user select another medium on the list, (ii) urges the user to delete unnecessary files on the selected medium, or (iii) displays a message suggesting the user to replace the current medium with a medium of the same type having a larger capacity. Note that the checking of the free space in Step S308 should be performed not only with respect to the user area of the copy destination medium but also with respect to the protected area of the copy destination medium. Even when there exists free space in the user area of the selected medium, if a decryption key corresponding to another content is already written in the protected area and there is no space for additionally writing a new decryption key, the BD-J application needs to be notified that the selected medium does not have a sufficient amount of free space. In the event that the checking of the amount of free space in the protected area is not performed, the digital copy processing will result in failure in the last step thereof, which is the writing of the decryption key. Hence, such a problem will not only subject the user to a waste of time but also may result in an unnecessary loss of copy right in the worst case, for the downloading of the decryption key from the digital copy server would have already been completed in such a case. Hence, it is necessary that the checking of free space in Step S308 be performed with respect to the protected area of the selected medium as well as with respect to the user area of the selected medium.

When it is judged in Step S308 that the remaining number of times of copying of the selected medium is "one or more" and that the copy destination medium has a sufficient amount of free space (Step S308: YES), the digital copy module copies the protected content for portable terminals onto the specified medium (Step S309). While the digital copying is being performed, the BD-J application is able to keep track of the current progress of the digital copying and is able to display the copy progress state to the user by making queries to the digital copy module concerning the progress.

When the data copying of the protected contents for portable terminals is completed, the digital copy module obtains a decryption key for decrypting the protected contents for portable terminals from the digital copy server (Step S310). To obtain the decryption key, the digital copy module transmits four data pieces, namely, the serial ID, the content ID, the media ID, and the MKB to the digital copy server via the network I/F. The digital copy server creates a decryption key for decrypting the protected contents for portable terminals on the copy destination medium based on a secret key held thereby. The digital copy module receives the decryption key created by the digital copy server, and writes the decryption key to the protected area of the copy destination medium (Step S311). As the URL used for connecting to the digital copy server, a fixed URL held by the playback device may be used, or a URL specified by the BD-J application may be used. It should be noted that the digital copy server may differ for each of the contents providers and in different regions. Thus, it is desirable that connection be made to the digital copy server using a URL specified by the BD-J application and via the communication port.

Following the completion of the writing of the decryption key, the digital copy module uses the SET_RESUME command to check whether or not a resume playback point has been specified from the BD-J application (Step S312). When a specification of a resume playback location is made from the BD-J application (Step S312: YES), the digital copy module overwrites the MGR_DATA file which is the management file of the copy destination medium with the resume playback point specified by the BD-J application (Step S313). When no specification of a resume playback point is made by the BD-J application (Step S312: NO), the digital copy module does not overwrite the MGR_DATA file, and the digital copy processing terminates.

Here, it should be noted that the SET_RESUME command can be called at any time point except for when the digital copy module is in the NOT_INIT state. However, the timing at which the resume playback point specified by the SET_RESUME command is applied to the copy destination medium is when the digital copy module transitions to the COMPLETED state following the completion of the writing of the decryption key. Further, when the digital copy module is already in the COMPLETED state when the SET_RESUME command is called, the resume playback point specified by the SET_RESUME command is immediately applied to the MGR_DATA file of the copy destination medium.

As description has been made in the above, in the present embodiment of the present invention, a BD-J application on the disc reads playback time information from the PSR set, establishes socket connection utilizing a communication programming interface supported as an existing API, makes a specification of a playback location according to the resume information read, and performs control of copying of a digital stream for portable terminals via the socket connection. Thus, the BD-J application is able to perform control of a special function of copying contents for portable terminals while preserving the playback suspension points set on a playback device without the addition of any additional APIs.

Embodiment 2

In embodiment 1, description is made on a structure where a BD-J application performs control of a special function of copying contents for portable terminals while preserving the playback suspension points set on a playback device and without the addition of any additional APIs. However, when an application on the disc is able to control a wide range of functions as such, security risks are to arise. Hence, in embodiment 2 of the present invention, description is provided on a modified example provided with an enhanced level of security as one embodiment of the present invention, in order as to cope with such security risks. Note that in embodiment 2, description of aspects similar to embodiment 1 is omitted, and therefore only aspects which differ from embodiment 1 are described hereinafter. Accordingly, aspects not particularly described in embodiment 2 should be considered to be similar to those in embodiment 1.

Figure 20:
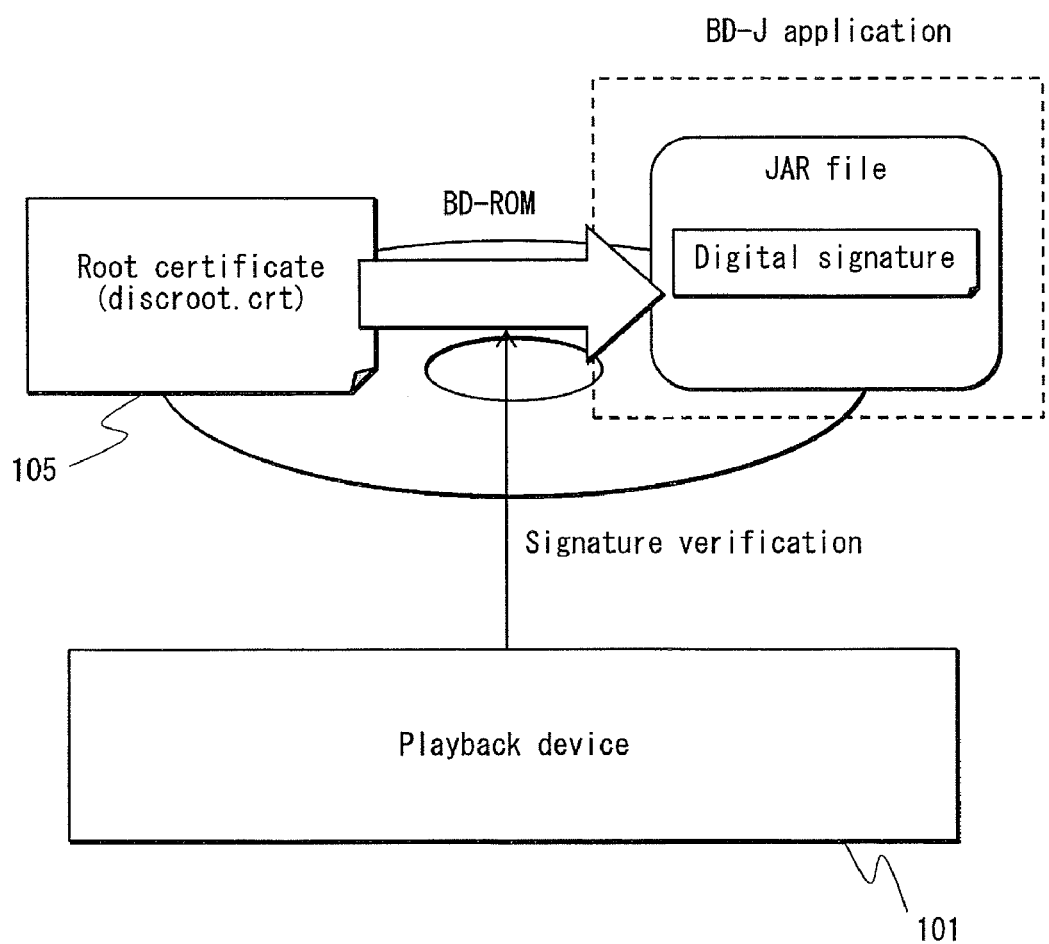
FIG. 20 illustrates conventional application signature verification.

FIG. 20 illustrates conventional signature verification of an application. Here, the validity of the BD-J application 701 is determined by carrying out signature verification based on a digital signature recorded in a JAR file composing the BD-J application and the root certificate (discroot.crt) stored onto the disc. In detail, a comparison is made between a hash value obtained by decrypting the digital signature in the JAR file according to the root certificate and the hash values of the individual class files composing the JAR file. When the hash values match, the JAR file is considered to be valid, whereas when the hash files do not match, it is considered that some malicious act has been carried out. However, according to this verification method, an application is considered to be valid under the condition that the root certificate and the digital signature in the JAR file form a counterpart. This is problematic in that, in such a case as where a contents provider possessing a valid root certificate creates a JAR file maliciously, there is no means by which such an act may be detected. Therefore, once the unique functions of a playback device are made available as mentioned in embodiment 1, all contents providers possessing the valid root certificate will have free access to the unique functions of the playback device.

Figure 21:
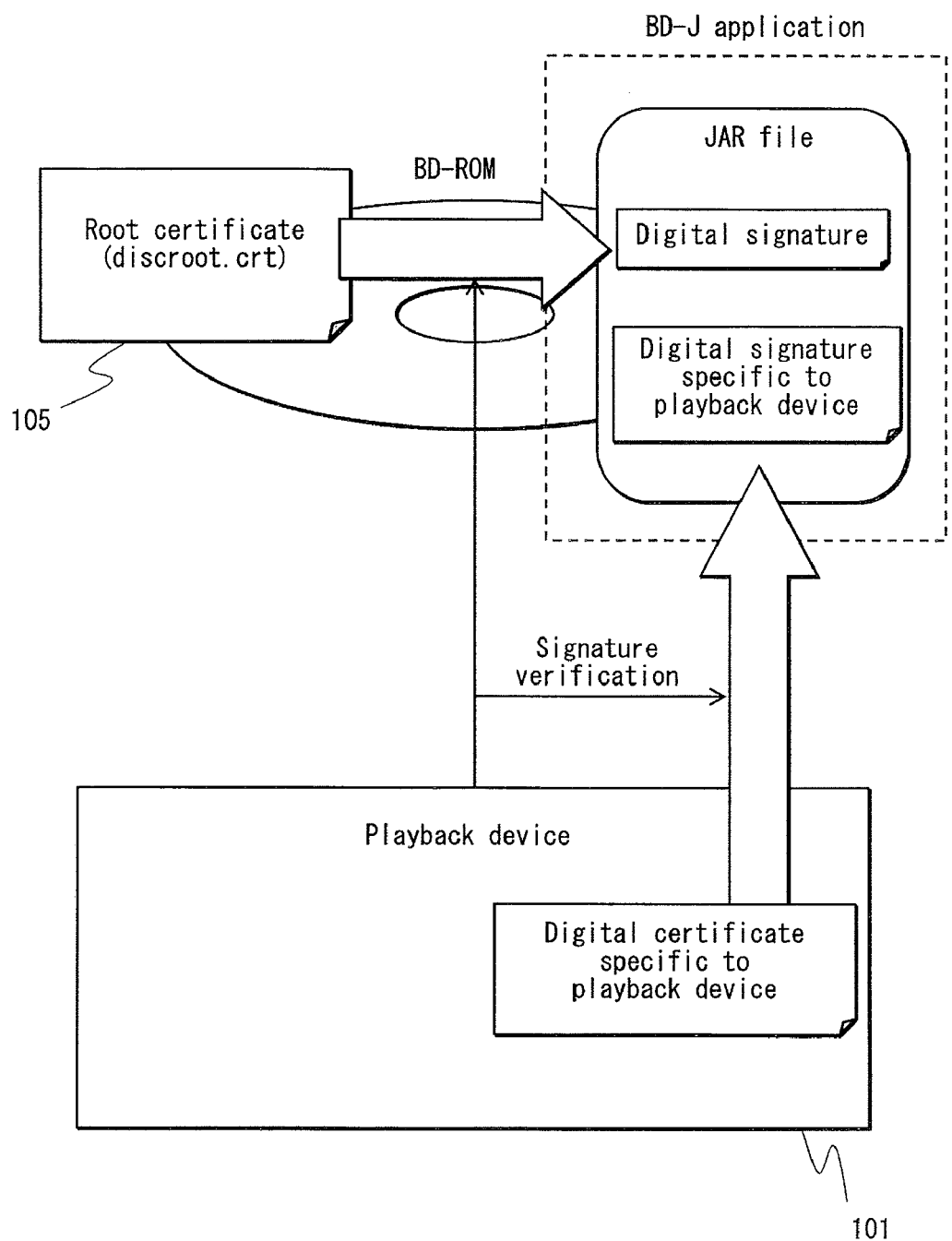
FIG. 21 illustrates signature verification performed based on a digital certificate in embodiment 2 of the present invention.

FIG. 21 illustrates signature verification performed according to a digital certificate held by the playback device. Here, a digital signature based on a digital certificate uniquely held by the playback device is provided to the JAR file composing the BD-J application, in addition to the digital signature based on the root certificate on the disc. In detail, a value obtained by encrypting a hash value of a manifest file (MANIFEST.MF) by using a secret key corresponding to the digital certificate unique to the playback device is recorded in the JAR file as the digital signature unique to the playback device. The manifest file is a list of hash values of each of the class files stored in the JAR file. Thus, the playback device performs signature verification based on the certificate provided uniquely to the playback device in addition to conventional signature verification based on a root certificate.

Figure 22:
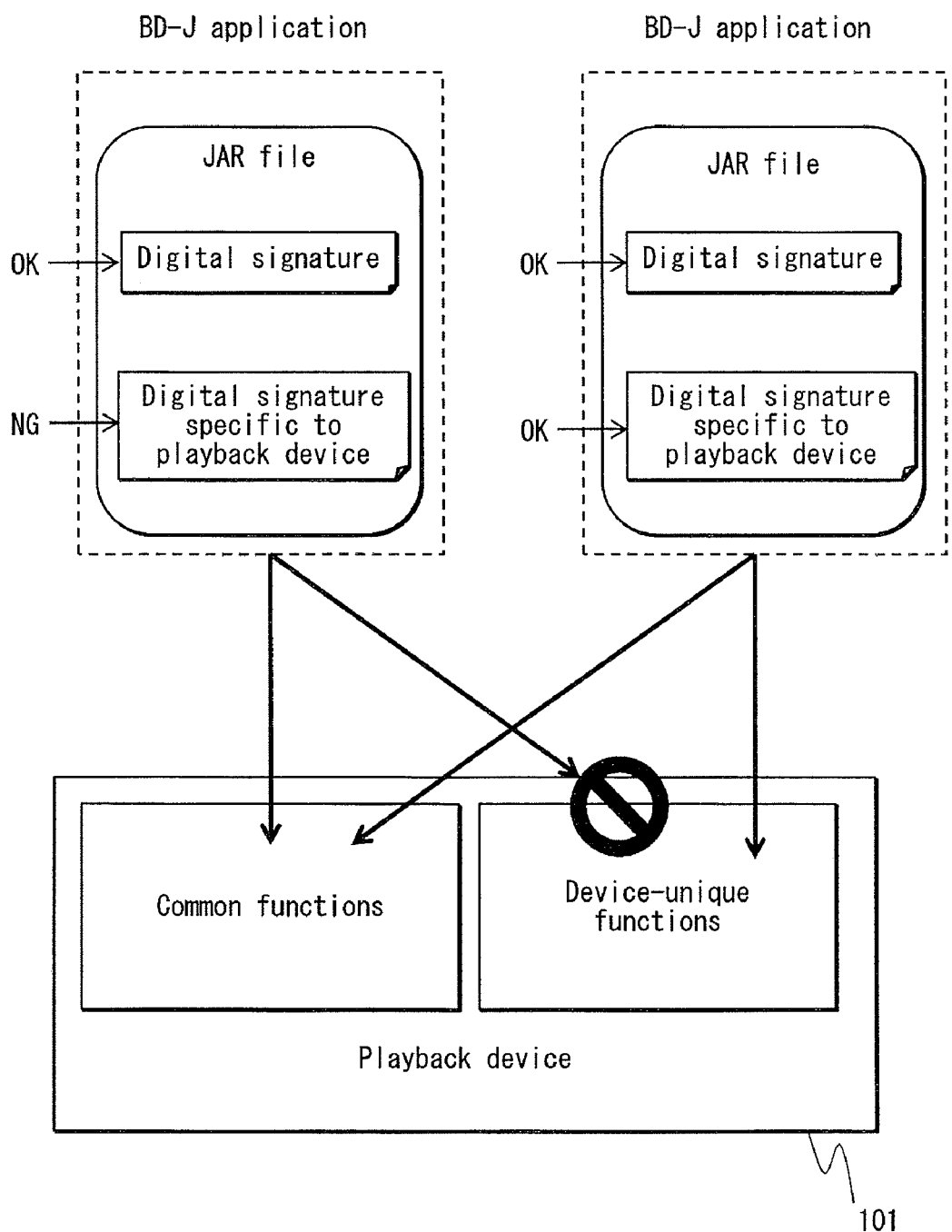
FIG. 22 illustrates a restriction of functions imposed according to results of the signature verification in embodiment 2 of the present invention.

FIG. 22 illustrates functional restrictions imposed according to results of the signature verification. Here, in order to call the unique functions provided to the playback device from the BD-J application, not only the conventional digital signature based on the root certificate is necessary but also a digital signature unique to the playback device needs to be prepared. The digital signature unique to the playback device can only be created by using a secret key corresponding to the certificate unique to the playback device. Therefore, abuse of the functions uniquely provided to the playback device by a third party maliciously preparing a digital signature unique to the playback device is prevented. Furthermore, even in a case where a failure occurs in the signature verification of the digital signature unique to the playback device, the calling of conventional common functions of the playback device remains uninfluenced. Thus, it is possible to maintain compatibility with respect to the common functions of the playback device.

Figure 23:
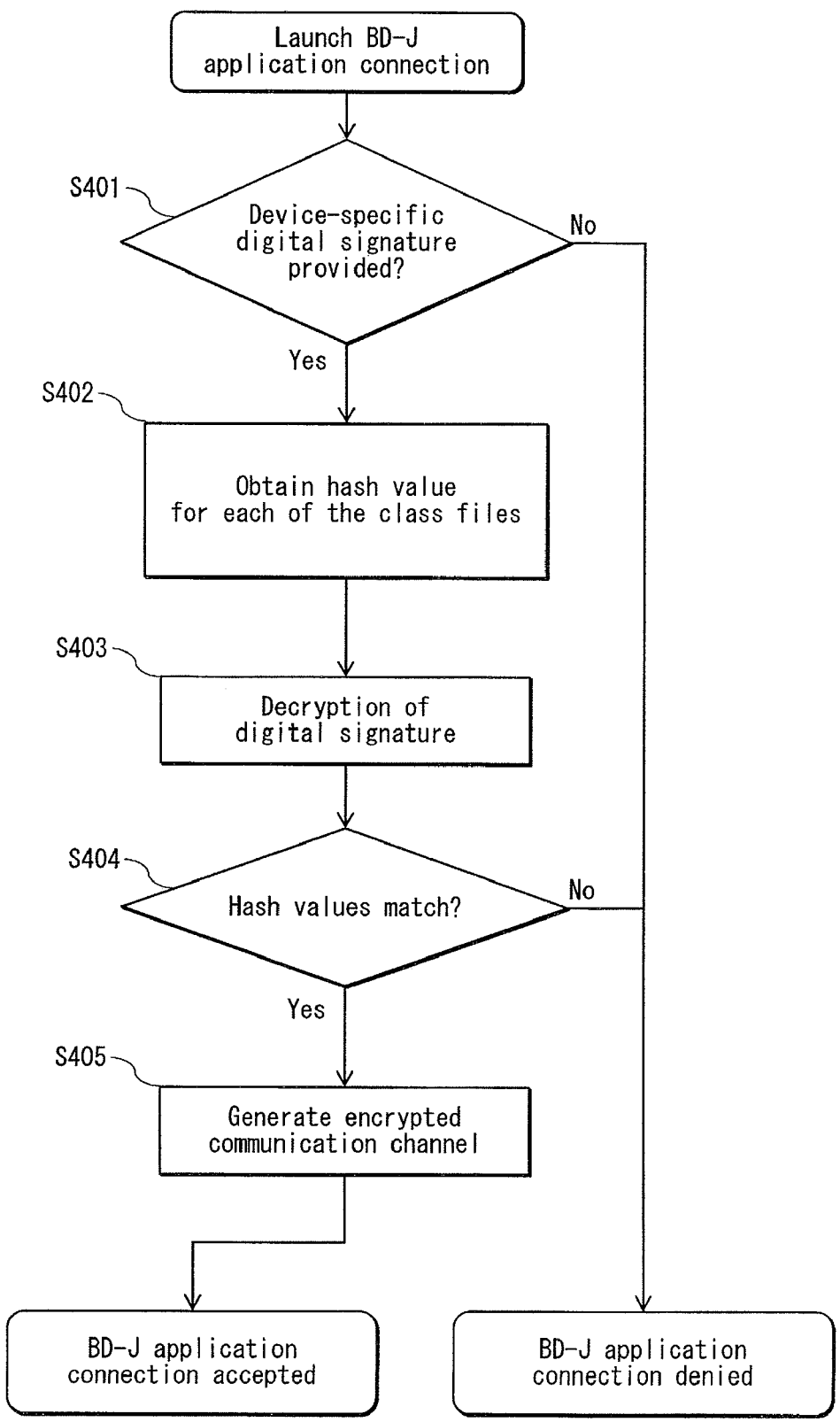
FIG. 23 is a flowchart illustrating processing taking place when a connection request is made for use of device-unique functions in embodiment 2 of the present invention.

FIG. 23 is a flowchart illustrating processing taking place when a connection request is made for use of device-unique functions of the playback device. The flowchart of FIG. 23 corresponds to Step S303 in embodiment 1, but differs in that the security of the connection is strengthened. First, the digital copy module judges whether the BD-J application which is requesting for connection is provided with a device-specific digital signature (Step S401). When a device-specific digital signature is not provided, the digital copy module rejects the connection request and the playback device does not respond to any further requests made via the communication port. Alternatively, the playback device may also reject all communications by closing the communication port.

When it is judged in Step S401 that the BD-J application is provided with a device-specific digital signature, the playback device obtains the hash values for each of the class files (Step S402). Alternatively, since description of the hash values of each of the class files are included in the manifest file of the Jar file, calculation may be performed of the hash value of the manifest file in which the hash values of each of the class files are enlisted.

Subsequently, decryption of the device-specific digital signature provided to the BD-J application is performed using a digital certificate uniquely held by the playback device, and thus a hash value, description of which is made in the digital signature, is calculated (Step S403). When the two hash values each obtained through Step S402 and Step S403 match, it is judged that the digital signature is properly provided to the BD-J application, while when the two hash values differ, it is judged that the digital signature is invalid (Step S404). When judgment is made that the digital signature provided to the BD-J application is invalid, the playback device does not respond to any further requests made via the communication port for the device-unique functions of the playback device, similar to when it is judged that the device-specific digital signature is not provided in Step S401.

When it is judged that the digital signature is properly provided, or in other words, valid, generation of an encrypted communication channel is performed (Step S405). In specific, the playback device sends the digital signature held thereby to the BD-J application, and the BD-J application creates an encrypted communication socket (SSL) by using the digital signature. In communication utilizing an SSL socket, data is encrypted using the digital signature sent from the playback device, and encrypted data is exchanged. On the other hand, when utilizing an ordinary socket (for instance, in a socket commend and response), data is exchanged in an unencrypted state. That is, when an SSL socket is used, all data exchanged between the playback device and the BD-J application via the communication port is encrypted along the communication channel. Here, it should be noted that the digital certificate (server certificate) sent from the playback device to the BD-J application for the creation of the SSL socket may be prepared separately from the digital signature used for utilizing the device-unique functions of the playback device. Hence, in such a case, two types of digital certificates are to be prepared by the playback device, one for establishing encrypted communication and the other for utilizing the device-unique functions of the playback device.

In addition, the verification of the validity of the server certificate sent from the playback device may be performed by the BD-J application, so as to avoid compromising of playback devices. It is desirable that such verification of validity of the playback device be performed by the BD-J application, since, for instance, there is a risk of playback devices capable of producing unlimited copies spreading in the market. In such a case, verification is performed of the server certificate sent from the playback device, and when the server certificate is found to be on a blacklist, the execution of digital copying and the like using the playback device having the server certificate can be inhibited by the BD-J application.

As description is provided in the above, this embodiment of the present invention blocks invalid BD-J applications and playback devices, and further prevents data along the communication channel from being obtained and utilized in an unauthorized manner by hackers attempting attacks. This is made possible by the playback device verifying the digital signature provided to the BD-J application, the BD-J application verifying the server certificate sent from the playback device, and the encryption of the data exchanged via the communication port by utilizing an SSL.

Embodiment 3

In embodiments 1 and 2, description has been provided on structures for performing digital copying in a case where the copy source recording medium and the copy destination recording medium differ. In contrast, in embodiment 3, description is provided on an embodiment for performing digital copying in a case where the copy source and the copy destination exist on the same recording medium. Note that in embodiment 3, description of aspects similar to embodiments 1 and 2 is omitted, and therefore only aspects which differ from embodiments 1 and 2 are described hereinafter. Accordingly, aspects not particularly described in embodiment 3 should be considered to be similar to those in embodiments 1 and 2.

Figure 24:
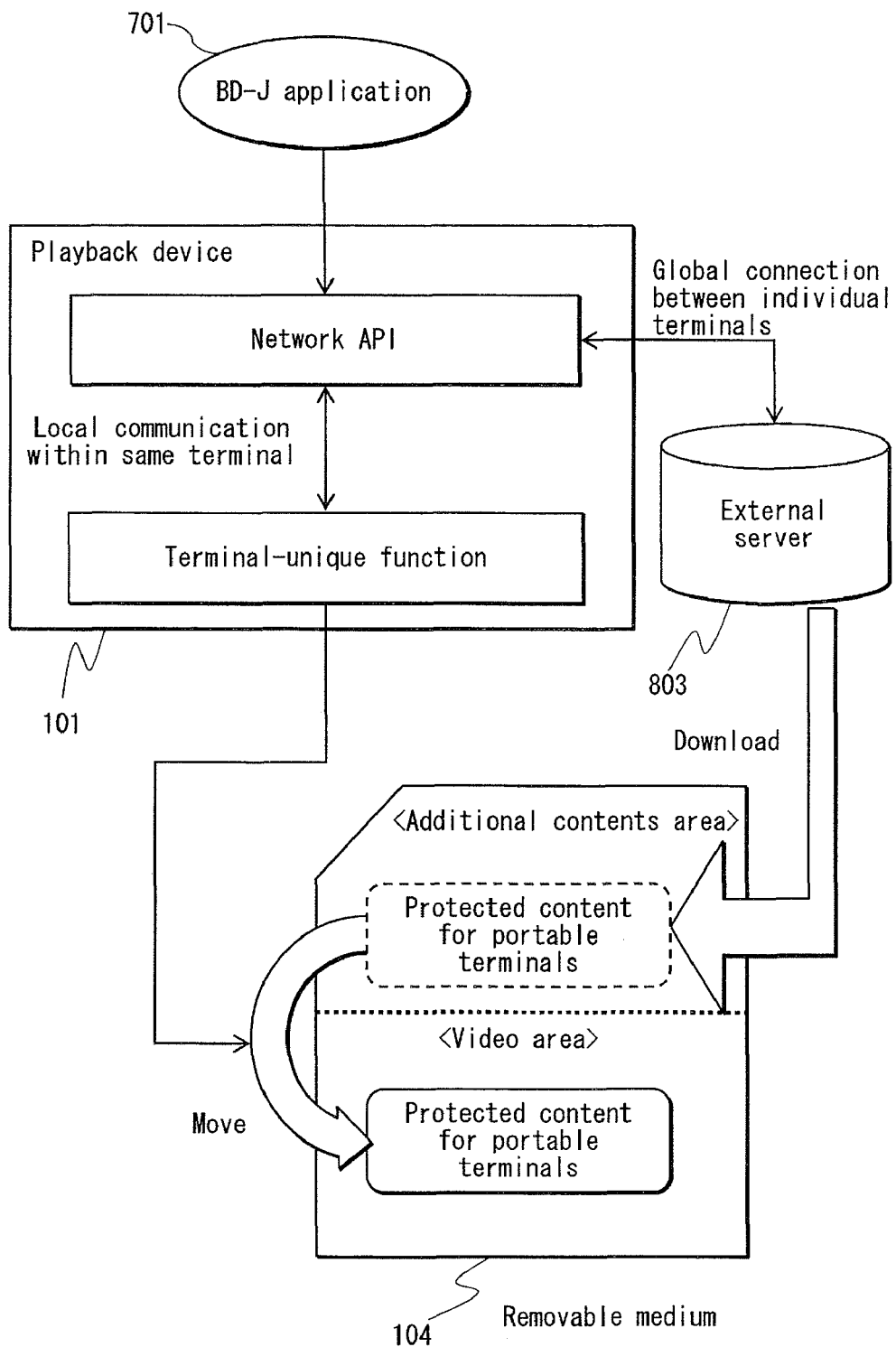
FIG. 24 illustrates digital copying in a case where a copy source and a copy destination are located on a same recording medium in embodiment 3 of the present invention.

FIG. 24 illustrates digital copying in a case where the copy source and the copy destination exist on the same recording medium. As one example of a case where the copy source and the copy destination are the same, the following case is considered: a protected content for portable terminals which is the target of copying is not present on the BD-ROM, and the BD-J application downloads the protected content for portable terminals from the server via an external network. However, as shown in FIG. 6, since the additional content area is separated from the video content area, the BD-J application cannot download data directly to the video content area. The areas to which the BD-J application has free access are limited to the areas below the same "Organization" directory as the "Organization" directory to which the BD-J application belongs. The access range of the BD-J application is determined as such in order to prevent contents from being moved or deleted in an unauthorized manner from areas allocated to another "Organization". Accordingly, when additionally downloading a protected content for portable terminals, first, the BD-J application temporarily stores the downloaded content into an area included in or below the "Organization"

directory. Subsequently, the BD-J application calls a terminal unique function via the local communication within a single terminal, and moves the downloaded content to the video content area.

Figure 25:
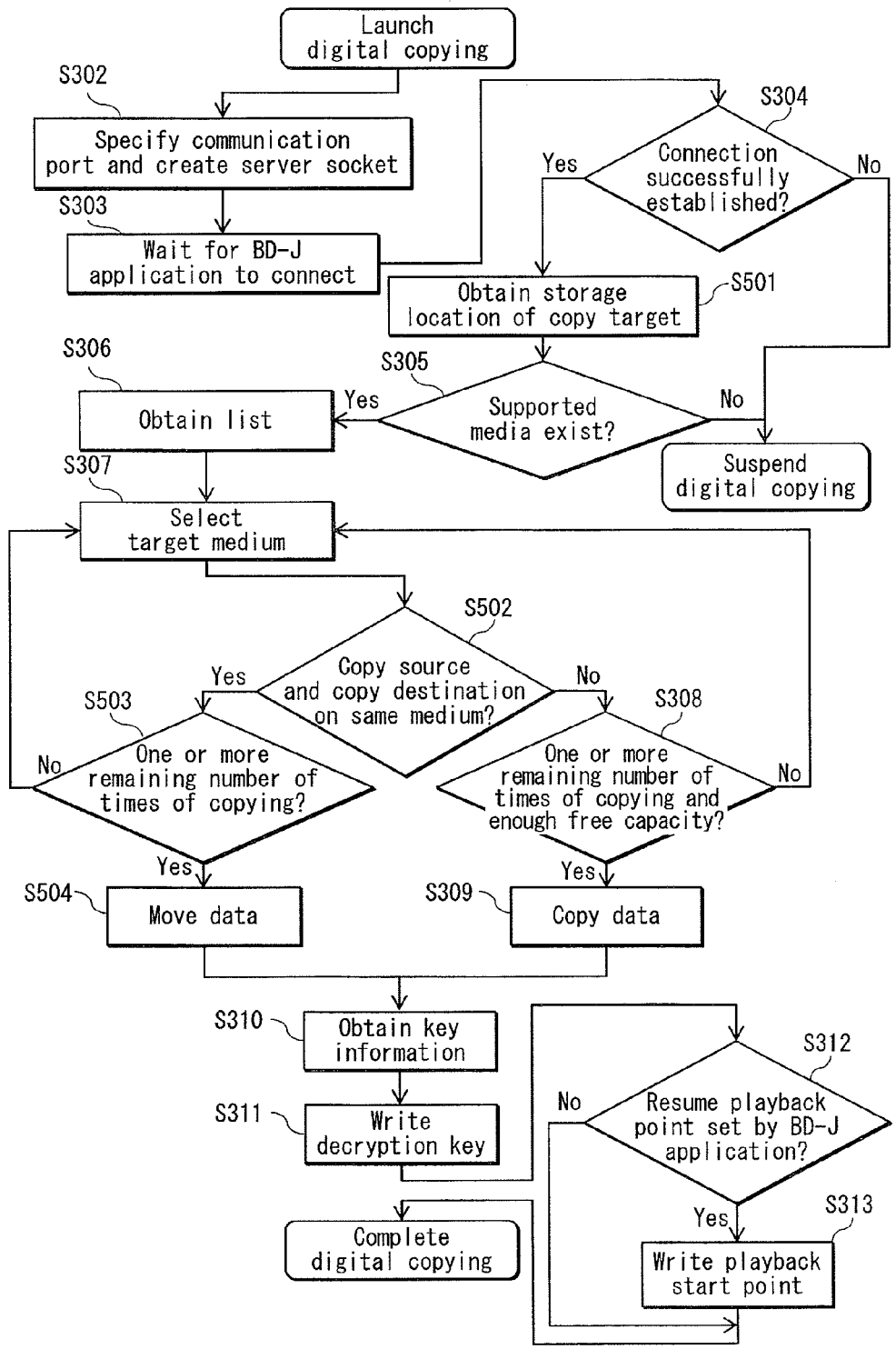
FIG. 25 is a flowchart corresponding to digital copying in the case where the copy source and the copy destination are located on the same recording medium in embodiment 3 of the present invention.

FIG. 25 is a flowchart corresponding to digital copying in a case where the copy source and the copy destination exist on the same recording medium. In digital copying where the copy source and the copy destination belong to the same recording medium, the checking performed in Step S301 in the above is unnecessary. That is, the checking of whether or not a protected content for portable terminals exists on the disc having been inserted in the playback device is unnecessary. This is since, even if a protected content for portable terminals does not exist on the disc, there is a possibility that a protected content for portable terminals is recorded on the local storage. Further, when minimizing the port open time in the present embodiment, a port is opened not according to whether or not a protected content for mobile terminal is present. In fact, as described in embodiment 1, a port is opened only in such cases as when a BD-J application is running (that is, only when a BD-J title is being played back), or after a port open instruction is received from a BD-J application.

When, in Step S304, a connection with the BD-J application has been successfully established, the digital copy module waits for a storage location of a protected content for portable terminals which is the copy target to be specified by the BD-J application (Step S501). The storage location of the protected content for portable terminals, which is the copy target, is indicated by an absolute path that contains the type of medium. For instance, when the protected content for portable terminals is stored on the BD-ROM, the absolute path is specified as "/mnt/bdrom/EMOVE/DATA01", and when the protected content for is stored on the local storage (the SD memory card or the like), the absolute path is specified as: "/mnt/sdcard/BUDA/081A24ED/12345ABC/EMOVE/DATA01". In this case, "/mnt/bdrom" corresponds to the mount point of the BD-ROM medium, and "/mnt/sdcard" corresponds to the mount point of the SD memory card. That is to say, by including the mount point of the medium in the file path information specified by the BD-J application, the digital copy module can determine on which medium the protected content for portable terminals which is the copy target is present.

The storage location of the copy target obtained in Step S501 and the type of medium which can be determined from the storage location are used in the comparison with the type of the medium selected in Step S307 (Step S502). When it is judged that the medium specified in Step S501 (namely, the copy source medium) is not the same medium as specified in Step S307 (namely, the copy destination medium), the control proceeds to Step S308, where it is checked whether or not there is a sufficient amount of free space to perform the copying and whether or not there is a remaining number of times of copying. On the other hand, when it is judged that the two media are the same, the checking of the free space is skipped, and only the remaining number of times of copying is checked (Step S503). When it is judged in Step S503 that there is a remaining number of times of copying, the digital copy module moves the copy target specified in Step S501 to the video area in the same medium (Step S504). When data is moved within the same medium, actual copying of data is not necessary, and only the management information of the file is rewritten. Thus, the moving of data is completed in a short amount of time. Accordingly, the displaying, to the user, of the progress by the BD-J application may be skipped.

Note that in the present embodiment, description has been made based on the moving of data in view of the advantages which can be yielded thereby in performing digital copying within the same medium. Such advantages include the small amount of media capacity consumed, and the small amount of time required in performing digital copying. However, in cases where there is sufficient free space on the medium and where the size of the copy target content is small, copying of the file may be carried out while preserving the original version of the file.

According to the above structure of the present embodiment, digital copying can be performed even in a case where a protected content for portable terminals is not recorded on the BD-ROM in advance, by additionally downloading a protected content for portable terminals and moving the content in the digital copy processing. Also, when the download destination and the digital copy destination belong to the same medium, free space of the medium is not wastefully consumed and the copy itself can be performed at a high speed.

Embodiment 4

In the present embodiment, description is made on a modification of the present invention where further improvement is made especially in terms of continuous viewing (i.e. resume playback), description of which has been made in embodiment 1. Note that in embodiment 4, description of aspects similar to embodiments 1 through 3 is omitted, and therefore only aspects which differ from embodiments 1 through 3 are described hereinafter. Accordingly, aspects not particularly described in embodiment 4 should be considered to be similar to those in embodiments 1 through 3.

Figure 26:
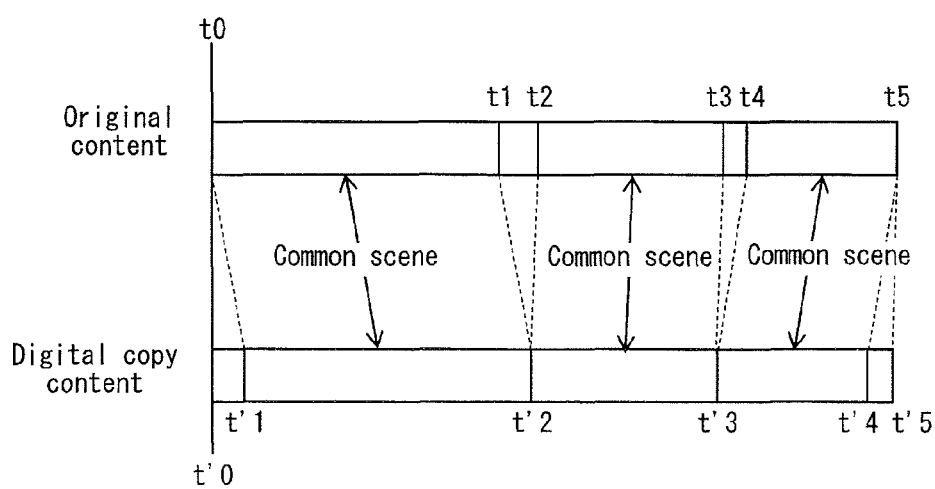
FIG. 26 illustrates playback time axes of an original content and a digital copy content in embodiment 4 of the present invention.

FIG. 26 is a diagram illustrating playback time axes of each of an original main story content and a digital copy content. The digital copy content illustrated in FIG. 26 differs from the original main story content in that certain scenes which are included in the original main story content have been deleted (deleted scenes #1 and #2), and several scenes which are not included in the original main story content have been added (additional scenes #1 and #2). As can be seen in this case, a content to be actually digital-copied is not always identical to the original contents. For instance, an introduction of new films recorded in the beginning may differ in the original content and the digital copy content, and the director's cut scenes which are present in the original content may be deleted in the digital copy content. In view of such a case, embodiment 4 provides a description on a structure which makes possible resume playback of content even when the original content and digital copy content differ.

Figure 27:
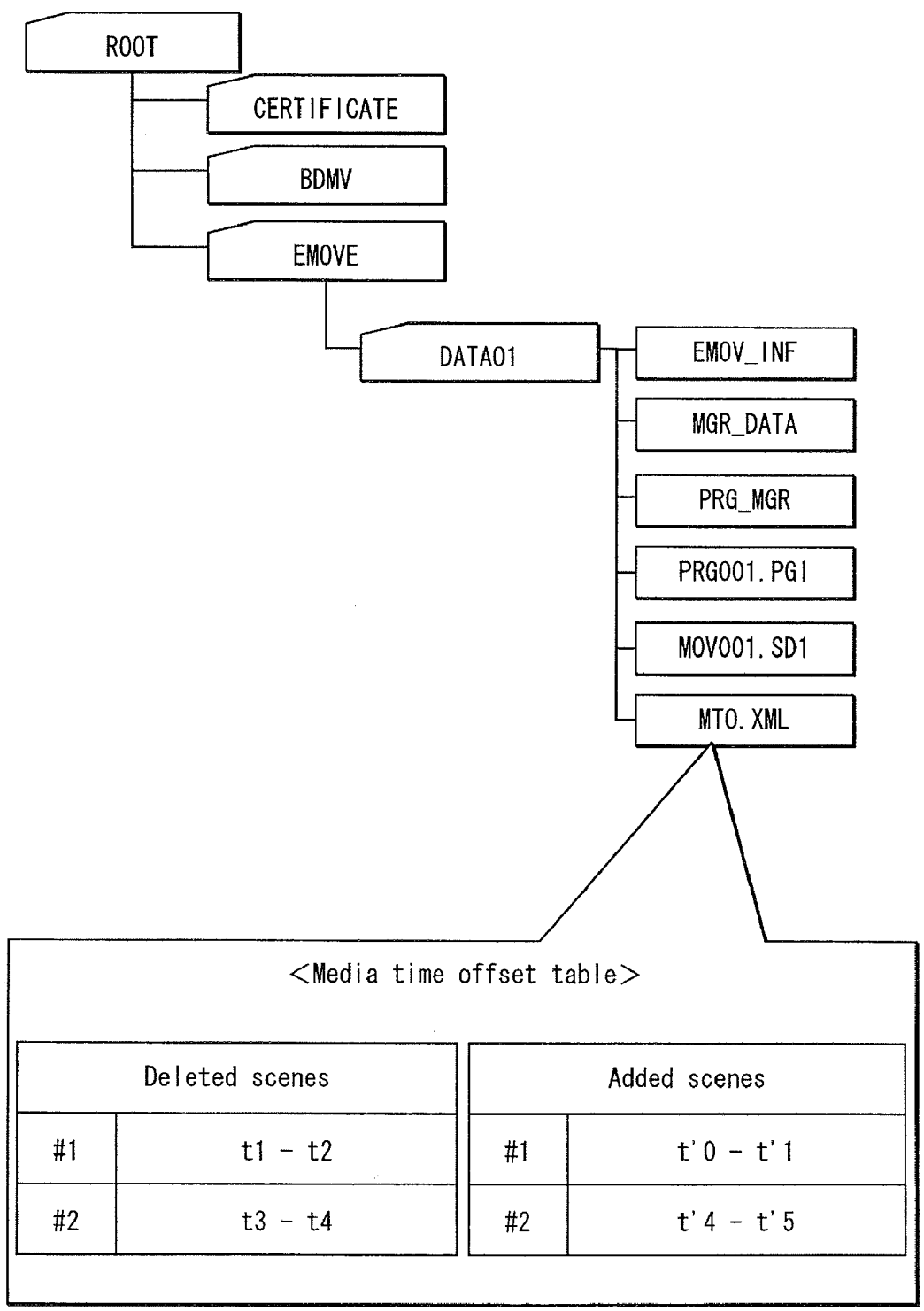
FIG. 27 illustrates a directory file structure of the BD-ROM in embodiment 4 of the present invention.

FIG. 27 illustrates a directory file structure of the BD-ROM pertaining to embodiment 4. The directory file structure pertaining to the present embodiment differs from the above-described structure of FIG. 2 in that a media time offset table (MTO.XML) is newly added. The media time offset table exists below the DATAxx directory ("xx" denoting a two digit variable") which belongs below the EMOVE directory. The media time offset table includes description of: a list of scenes that have been deleted from the original content and deleted time sections corresponding thereto, and a list of scenes that have been newly added to the digital copy content and additional time sections corresponding thereto. The deleted time sections are time points on the time axis of the original content, while the additional time sections are time points on the time axis of the digital copy content. In the example illustrated in FIG. 27, time t1 to t2 (deleted scene #1) and time t3 to t4 (deleted scene #2) of the original content have been deleted in the digital copy content, while time t'0 to t'1 (additional scene #1) and time t'4 to t'5 (additional scene #2) have been newly added in the digital copy content.

Figure 28:
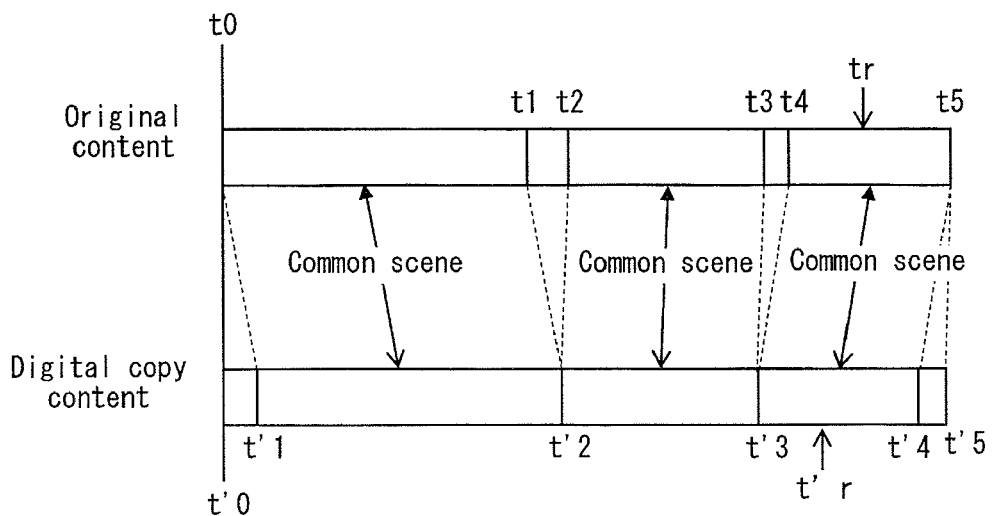
FIG. 28 illustrates conversion of a resume playback point on a time axis of the original content to a resume playback point on a time axis of the digital copy content in embodiment 4 of the present invention.

FIG. 28 illustrates processing taking place in converting resume playback points set on the time axis of the original content to points on the time axis of the digital copy content. When supposing that "tr" on the time axis of the original content indicates a resume playback point, the resume playback position of the digital copy content is indicated by "t'r" on the time axis of the digital copy content, which can be obtained by adding/subtracting the deleted scene sections and the added scene sections written in the above-described media time offset table. More specifically, the "t'r" is obtained by subtracting the total time of the deleted scenes existing before "tr" from "tr", and adding the total time of the added scenes existing before the subtracted "tr" to the subtracted "tr".

Figure 29:
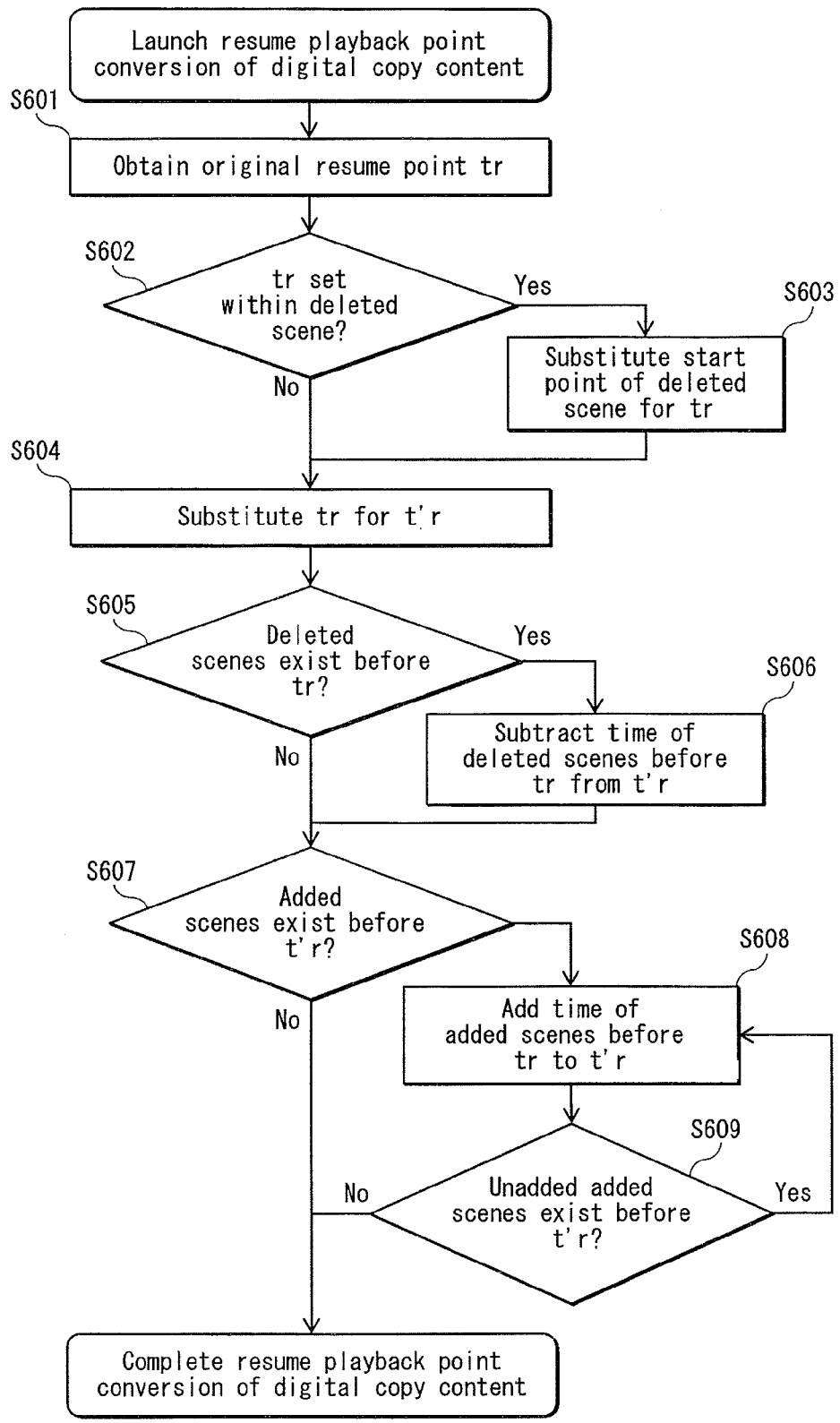
FIG. 29 is a flowchart illustrating resume playback point conversion processing in embodiment 4 of the present invention.

FIG. 29 is a flowchart illustrating resume playback point conversion processing. First, the resume playback point "tr" of the original content is obtained from the register of the playback device which is allocated to resume playback (Step S601). In a case where a specification has been made beforehand of a resume playback point on the original content by the BD-J application, the value obtained from the register need not be used. Instead, in such a case, the value received from the BD-J application is set to "tr".

Subsequently, a judgment is made of whether the resume playback point "tr" on the original content is located within a deleted scene (Step S602), and when "tr" is located within a deleted scene, the start point of the deleted scene is substituted for "tr" (Step S603). For instance, when "tr" obtained in Step S601 is 2000 s, and a deleted scene with a deleted time section of 1900 s-2100 s is included in the deleted scenes listed in the media time offset table, the point (2000 s) which is set to "tr" is located within the deleted time section of 1900 s-2100 s. Therefore, in Step S603, "tr" is reset to 1900 s, which is the start point of the deleted time section. The value "tr" is reset to a value not belonging within the deleted section in such a manner since, when the resume playback point is located within a deleted time section, the resume playback point will not exist on the digital copy content, and accordingly, the conversion processing following this point cannot be performed. One other way of solving this problem is performing playback of the content back from the beginning of the content without performing resume playback when carrying out viewing of the content on a portable terminal, particularly in cases where the resume playback point is located within a deleted time section. In such a case, a judgment is made that the resume playback being requested for is invalid. However, the flowchart of FIG. 29 illustrates processing where resume playback is performed in as many cases as possible, and in a case where the resume playback point is located within the deleted time section, the value of "tr" is reset to a value located within a valid range of the digital copy content in Step S603.

Following this step, the "tr" obtained in Step S601 or the "tr" which has been reset in Step S603 is substituted for "t'r" which indicates a candidate resume playback point after conversion (Step S604). Note that, at this point, the resume playback point "t'r" after conversion remains yet unfixed. Following the completion of Step S604, it is determined whether a deleted scene exists before "t'r" (Step S605). For example, when the value of "tr" is 1900 s and there exist two deleted sections before "tr", which are 0 s-100 s and 1000 s-1200 s, the sum of the two sections calculated as (100−0)+(1200−1000)=300 s is subtracted from the value "t'r" (Step S606).

Since the value "tr" has been substituted for "t'r" in Step S604, when the value "t'r" before subtraction is 1900 s, which is equal to the value "tr", the "t'r" value after subtraction is 1600 s.

Next, it is checked whether an added scene exists before "t'r" (Step S607). Here, if the value "t'r" is located within the time range of an added scene X, it is considered that added scene X exists before "t'r". For instance, when the value "t'r" is 1600 s and there exist two sections of additional scenes before "t'r", which are 0 s-200 s and 1500 s-1700 s, it is regarded that both added scenes exist before "t'r".

When it is determined that added scenes exist before "t'r" in Step S607, the sum of the time sections of the added scenes is added to the value "t'r" (Step S608). Similar as in the aforementioned example, when there are two sections of added scenes existing before "t'r", the added sections being from 0 s-200 s and 1500 s-1700 s, the sum of the two sections, which is calculated as (200−0)+(1700−1500)=400 s, is added to the value "t'r". Therefore, the value "t'r" yielded as a result of the addition is 2000 s.

When Step S608 has been completed, a comparison is once again performed between the obtained "t'r" and the added scenes, and it is checked whether there are other added scenes which have not yet been added before "t'r" (Step S609). For example, here it is supposed that 3 added scenes exist before "t'r", the added scenes indicated by the time sections: 0 s-200 s, 1500 s-1700 s, and 1900 s-2100 s. Also in Step S609, when "t'r" is located within a certain added scene X as in Step S607, the added scene X is considered to exist before "t'r". This means that the time section of 1900 s-2100 s is considered to exist before "t'r" which, here, is set to 2000 s. Since, among the 3 time sections of 0 s-200 s, 1500 s-1700 s, and 1900 s-2100 s mentioned above, the two time sections 0 s-200 s and 1500 s-1700 s have already been added, only the added scene indicated by the time section 1900 s-2100 s is added here. As such, the adding of Step S608 is performed once again, and the value of "t'r" is calculated as 2000+(2100−1900)=2200 s.

The processing of Steps S608 and S609 are performed repeatedly, up until when it is judged that all of the added scenes existing before "t'r" have been added. At the point where such a judgment is made, the value "t'r" is adopted as the resume playback point after conversion.

Figure 30A:
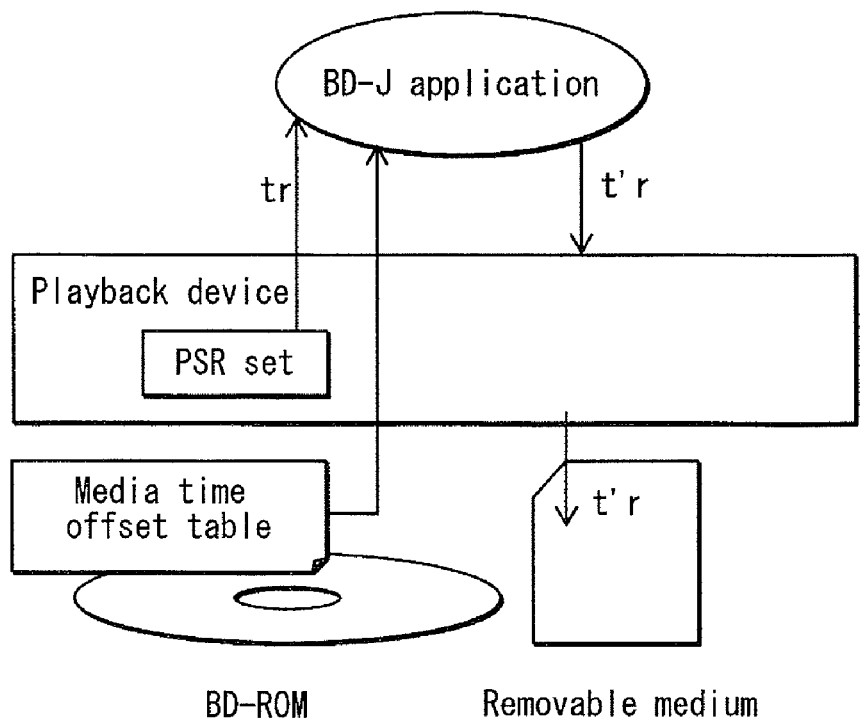
FIG. 30 is a flowchart illustrating how the resume playback point conversion processing is performed in embodiment 4 of the present invention.
Figure 30B:
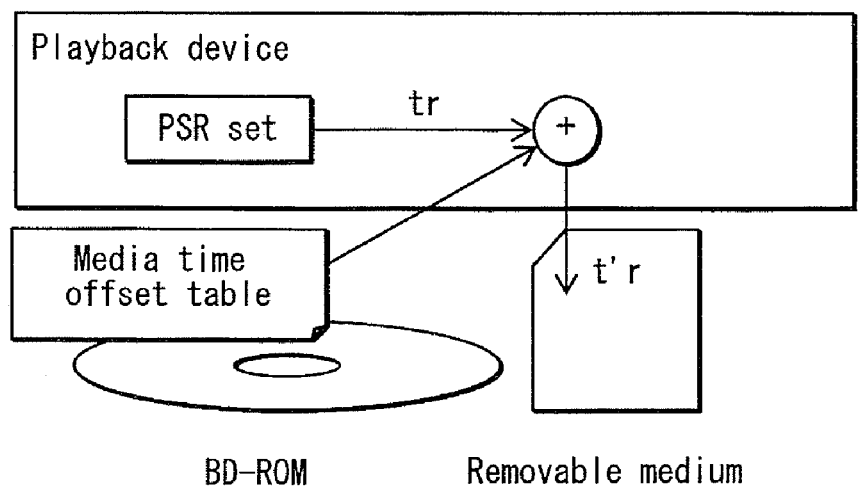

FIGS. 30A and 30B illustrate how the resume playback point conversion processing is performed. The resume playback point conversion processing can be performed in two patterns: pattern (a) as depicted in FIG. 30A where the conversion processing is performed in the BD-J application, and pattern (b) as depicted in FIG. 30B where the conversion processing is performed in the playback device. In either pattern, the resume playback point "tr" is calculated from the value stored in the PSR set of the playback device, and the resume playback point "t'r" after conversion can be calculated by following the procedures depicted in the flowchart in FIG. 29.

Figure 31:
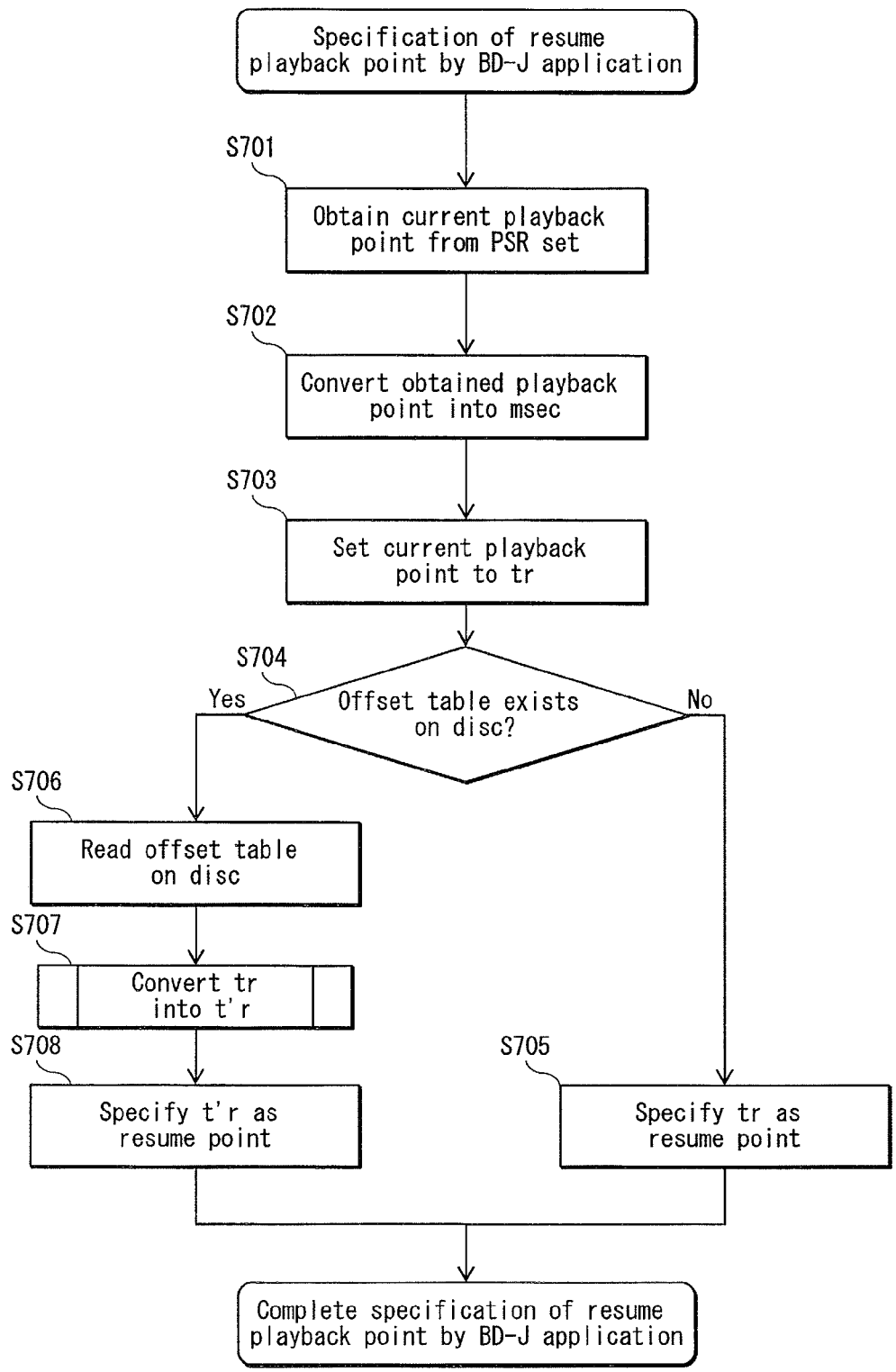
FIG. 31 is a flowchart illustrating the resume playback point conversion processing performed by the BD-J application in embodiment 4 of the present invention.

First, description is provided on a case where the resume playback point conversion processing is performed in the BD-J application. FIG. 31 is a flowchart illustrating the resume playback point conversion processing performed in the BD-J application. As is illustrated in FIG. 31, firstly, the BD-J application obtains the current playback time information from PSR(8) or from the backup register PSR(28) of the PSR set 421, respectively (Step S701). When the main content is an HDMV mode title, the resume point is set to PSR (28) which is a backup register. Thus, the BD-J application obtains the playback time information from PSR(28). On the other hand, when the main content is a BD-J mode title, the backup register is not utilized. Thus, the BD-J application obtains the current playback time information stored in PSR (8).

After having obtained the playback time information, the BD-J application converts the playback time information obtained from the PSR set 421 into milliseconds (Step S702). This unit conversion is required, since the playback time information obtained from PSR(8) or PSR(28) is based on a 45 kHz clock, while the resume playback point to be specified to the MGR_DATA file of the copy destination is to be in milliseconds.

The BD-J application specifies the time obtained in Step S702 as the resume playback point on the original content, and sets the value to the variable "tr" (Step S703).

Subsequently, the BD-J application checks whether a media time offset table exists on the disc by utilizing the file I/O module 705 (Step S704).

When a media time offset table does not exist (Step S704: NO), the BD-J application specifies the resume playback point "tr" of the original content as the resume playback point of the digital copy content at its original state (Step S705). The BD-J application utilizes the socket command SET_RESUME in the specification of the resume playback point.

When it is determined that a media time offset table exists (Step S704: YES), the BD-J application reads the media time offset table (Step S706).

Then, the BD-J application converts the resume playback point "tr" of the original content to a resume playback point "t'r" of the digital copy content according to the media time offset table read (Step S707). In Step S707, the conversion processing of the resume playback point is performed according to the flowchart in FIG. 29, and hence, the resume playback point "t'r" of the digital copy content is calculated. Subsequently, the BD-J application specifies the resume playback point "t'r" calculated in Step S707 as the resume playback point of the digital copy contents b using the SET_RESUME command (Step S708).

Note that, in the specification of a resume playback point, a parameter indicating on which time axis a specified playback time exists may be prepared. By preparing such a parameter, the determination by the playback device of whether the specified time exists on the time axis of the original content or the time axis of the digital copy content on which resume playback point conversion has been performed is made possible.

In such a case, a protocol to be used between the digital copy library and the digital copy module is to be determined in advance so that the selection of whether the time axis is that of the original content or that of the digital copy content is possible, at the same time as the specification of the time. The following is an example of the protocol which can be used for this purpose.

SET_RESUME<sp><resumepoint><sp><timebase>
<resumepoint>::=resume playback time(msec)
<timebase>::=ORIGINAL|DIGITAL COPY According to the above protocol, the command "SET_RESUME 1000000 ORIGINAL" sent from the digital copy library to the digital copy module indicates that the resume playback time is a point on the time axis of the original content which is 1000 s from the start point of the content. Similarly, the command "SET_RESUME 1000000 DIGITALCOPY" sent from the digital copy library to the digital copy module indicates that the resume playback time is a point on the time axis of the digital copy content which is 1000 s from the start point of the content. In short, the playback device is able to judge whether a specified time is on the time axis of the original content or the time axis of the digital copy content by referring to the value of the <timebase> parameter which is specified along with the time. This concludes the description on a case where the conversion processing of the resume playback point is performed in the BD-J application. In the following, description is provided on a case where the conversion processing of the resume playback point is performed in the digital copy module.

Figure 32:
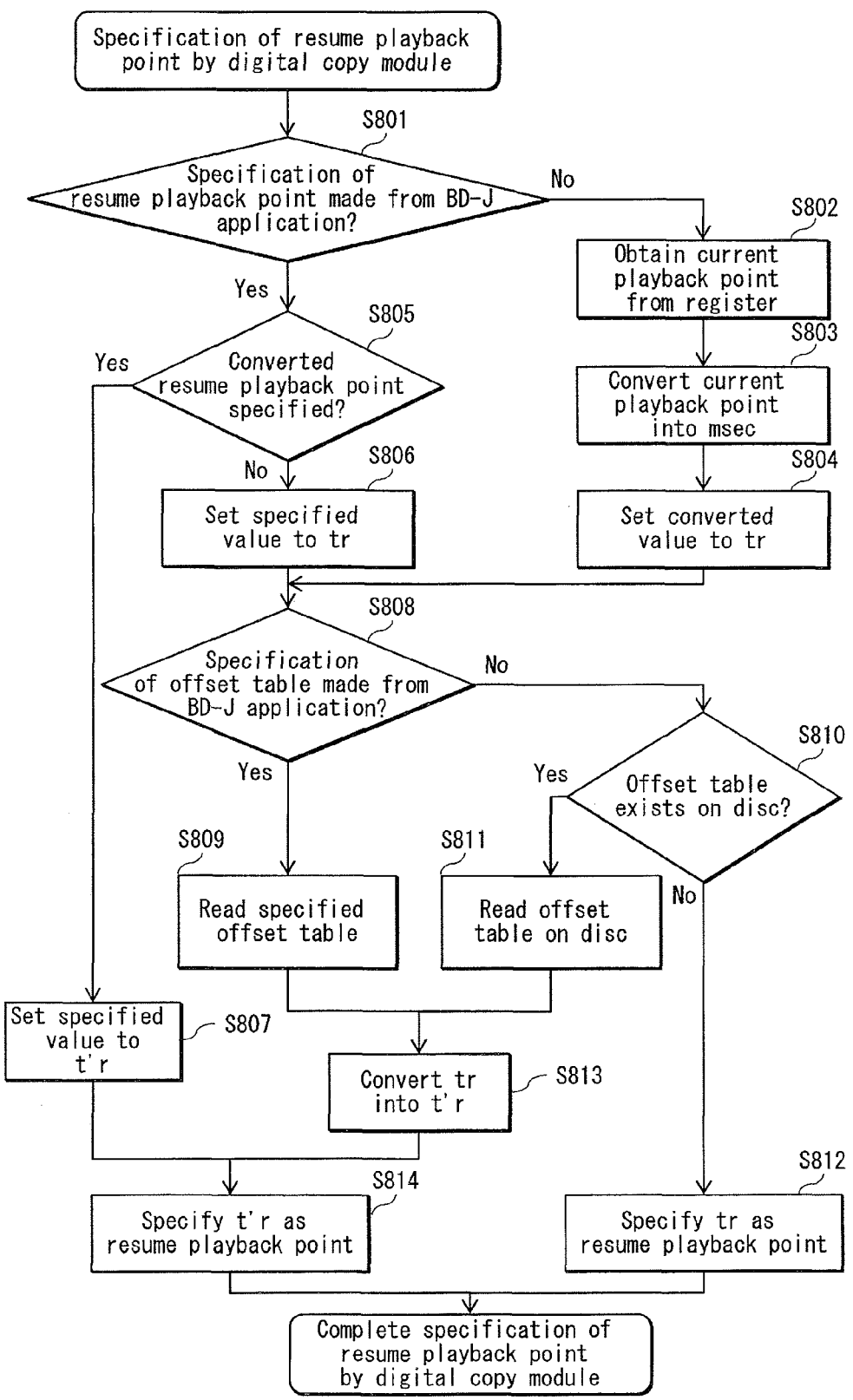
FIG. 32 is a flowchart illustrating the resume playback point conversion processing performed by the digital copy module in embodiment 4 of the present invention.

FIG. 32 is a flowchart illustrating the conversion processing of the resume playback point performed in the digital copy module. As is illustrated in FIG. 32, the digital copy module firstly judges whether a specification has been made of a resume playback point from the BD-J application (Step S801). The SET_RESUME command is used in the specification of the resume playback point by the BD-J application.

When no specification of a resume playback point has been made from the BD-J application (Step S801: NO), the digital copy module obtains the current playback time information or the playback time information from PSR(8) or PSR(28), which is a backup register, of the PSR set, respectively (Step S802). After having obtained the playback time information, the digital copy module converts the playback time information obtained from the PSR set 421 into milliseconds (Step S803). Subsequently, the digital copy module specifies the time obtained in Step S803 as the resume playback point of the original content, and sets the value to the variable "tr" (Step S804). Note that the processing performed in Steps S803 and S804 respectively differ from the processing performed in Steps S702 and S703 in that the processing is performed by the digital copy module.

When a specification of a resume playback point has been made from the BD-J application (Step S801: YES), a judgment is performed of whether the specified resume playback point is a time according to the time axis of the original content or the time axis of the digital copy content (Step S805). The command "SET_RESUME <resumepoint> ORIGINAL" sent from the digital copy library to the digital copy module indicates that the resume playback point has been specified according to the time axis of the original contents. On the other hand, the command "SET_RESUME <resumepoint> DIGITALCOPY" sent from the digital copy library to the digital copy module indicates that the resume playback point has been specified according to the time axis of the digital copy content.

When the resume playback point which has been specified exists on the time axis of the original content (Step S805: NO), the specified resume playback point is set to the variable "tr" indicating a resume playback point on the original content (Step S806). On the other hand, when the specified resume playback point exists on the time axis of the digital copy content (Step S805: YES), the specified resume playback point is set to the variable "t'r" indicating a resume playback point of the digital copy content (Step S807).

After a resume playback point on the original content is set to "tr" in either Step S804 or Step S806, the digital copy module determines whether or not a specification of a media time offset table is made from the BD-J application (Step S808).

For instance, when a specification of a media time offset table has been made in advance by the BD-J application via the digital copy communication port utilizing commands such as: SET_OFFSETTABLE "/SD_ROOT/BUDA/081a24ed/12345abc/MyMTO.xml", the digital copy module reads the specified media time offset table. The media time offset table to be specified may be located either on the disc, on the local storage, or in the JAR file.

When a specification of a media time offset table is made from the BD-J application (Step S808: YES), the digital copy module reads the specified media time offset table (Step S809).

When no specification of a media time offset table is made from the BD-J application (Step S808: NO), the digital copy module checks whether a media time offset table which is to be the target exists on the disc or not (Step S810). More specifically, the digital copy module checks whether a media time offset table exists in a directory which has been specified by the BD-J application as the copy source. For instance, when the copy source has been specified from the BD-J application as a location indicated by "EMOVE/DATA01" which exists directly below the root directory of the BD-ROM using the command: SET_SRCLOCATION "/mnt/bdrom/EMOVE/DATA01", for instance, the digital copy module checks whether a media time offset table "MTO.XML" exists in or below the directory "EMOVE/DATA01". When a media time offset table exists in or below the specified directory (Step S810: YES), the digital copy module reads the media time offset table (Step S811).

When a media time offset table which is to be the target does not exist on the disc (Step S810: NO), the digital copy module judges that no changes need to be made to the resume playback point, and specifies the resume playback point "tr" of the original content as the resume playback point of the digital copy content at its original state (Step S812).

After reading the media time offset table in either Step S809 or Step S813, the digital copy module converts the resume playback point "tr" on the original content to a resume playback point "t'r" on the digital copy content by using the media time offset table read (Step S813). In Step S813, the conversion processing of the resume playback point is performed according to the flowchart in FIG. 29, and hence, the resume playback point "t'r" of the digital copy content is calculated.

After "t'r" is calculated in either Step S807 or Step S813, the digital copy module specifies "t'r" as the resume playback point (Step S814). This concludes the description on the conversion processing of the resume playback point performed by the digital copy module.

According to the above structure of the present embodiment of the present invention, resume playback of a content on a portable terminal after the execution of digital copying can be performed from a point of the content equivalent to a point at which playback on a stationary playback device had been suspended, even in a case where a scene has been deleted and/or added from the original content in the digital copy content. This is made possible by performing resume playback point conversion processing.

Embodiment 5

The present embodiment is a modification of the continuous viewing (resume playback) which is described in embodiments 1 and 4. In embodiments 1 and 4 of the present invention, description is made of resume playback in a case where a content is viewed on a portable terminal after the same content has been viewed on a stationary playback device. In the present embodiment, description is provided on resume playback in a case where a content is viewed on a stationary playback device after the same content has been viewed on a portable terminal. Note that in embodiment 5, description of aspects similar to embodiments 1 through 4 is omitted, and therefore only aspects which differ from embodiments 1 through 4 are described hereinafter. Accordingly, aspects not particularly described in embodiment 6 should be considered to be similar to those in embodiments 1 through 4.

FIG. 33 illustrates how resume playback is performed when viewing of a content on a stationary playback device is performed after the same content has been viewed on a portable terminal. In the present embodiment, description will be made on an embodiment which realizes a case of use where a content is taken outside of the house for viewing on a portable terminal by digital copying, and afterwards, the same content is viewed on a stationary playback device inside the house from a point thereof up to which viewing has been performed on the portable terminal.

Figure 34:
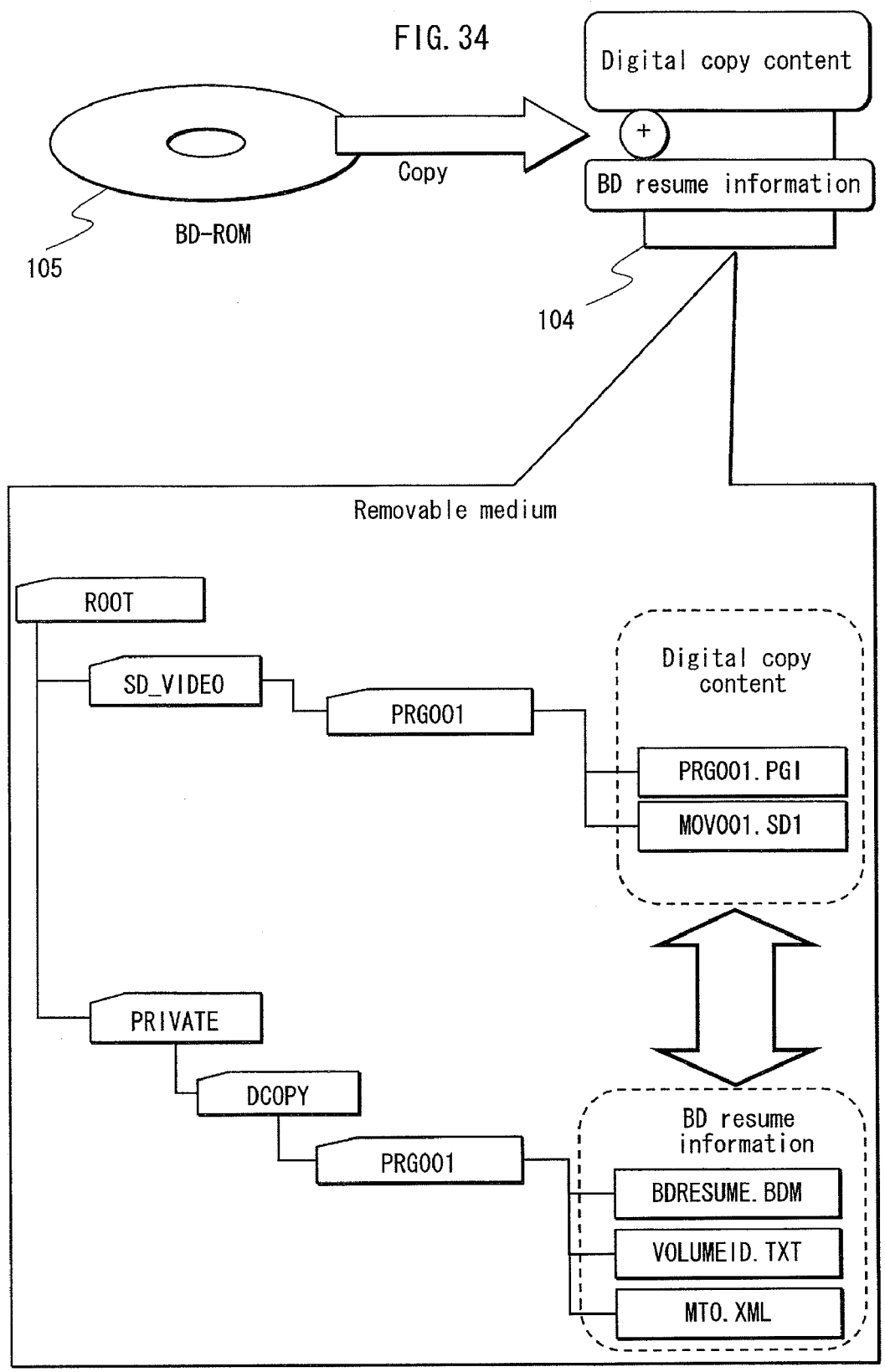
FIG. 34 illustrates a file structure of a removable medium in embodiment 5 of the present invention.

FIG. 34 illustrates a file structure of a removable medium of embodiment 5 of the present invention. In the present embodiment, BD resume information is written in addition to the content, when performing copying of digital copy content to the removable medium. The BD resume information is constituted of 3 types of files: a resume state storage file (BDRESUME.BDM) which includes description of the values of the backup registers (PSRs (20) to (32)) and the mode of the title which is the target of resume playback; a volume ID storage file (VOLUMEID.TXT) which records a volume ID that is recorded in the BCA of the BD-ROM along with the PMSN; and a media time offset table (MTO.XML) which has been used in performing viewing of the content on a portable terminal by executing digital copying on a stationary playback device.

The PMSN indicates a physical serial number provided to a recording medium, while the volume ID is a logical serial number. More specifically, a different, unique PMSN value is provided to each BD-ROM, even when BD-ROMs have the same contents recorded thereon. On the other hand, recording media having the same contents recorded thereon are given the same volume ID, even if the recording media differ in a physical sense.

Concerning the resume state storage file, the resume state storage file need not store exactly the same value as stored in the backup registers. In a case where the BD-J application performs management of resume status while the playback status is in the BD-J mode, for instance, the playback device receives a value corresponding to the parameter of the backup registers from the BD-J application, and thus creates a resume state storage file. FIG. 35 illustrates a list of parameters stored in the resume status storage file and examples of each of the parameters. The resume status storage file stores, in addition to the parameters of the backup registers (PSRs (20) to (32)), a description of the mode of a resume target title. When the resume target title is an HDMV mode title, the contents of the backup registers are stored at their original state, whereas when the resume target title is a BD-J mode title, the values to be stored in the resume status storage files are obtained from the BD-J application.

Regarding the media time offset table, the same media time offset table as used in the digital copying of the content on a stationary playback device for carrying out viewing thereof on a portable terminal is to be recorded. When a media time offset table has not been used in performing digital copying, the file MTO.XML is not created.

When data copying is executed, the resume status storage file, the volume ID storage file, and the media time offset table are written, as the BD resume information, to a directory location which constitutes a pair with the directory in which the digital copy content is to be stored. More specifically, the BD resume information is written under a directory location having the same program directory name. For instance, when the digital copy content is to be stored at a location "/SD_ROOT/SD_VIDEO/PRG001", the program directory name here is "PRG001". Thus, the same program directory name "PRG001" is created under a directory except the SD_VIDEO directory ("/SD_ROOT/PRIVATE/DCOPY", for example), and the BD resume information is stored under the newly created directory.

Figure 36:
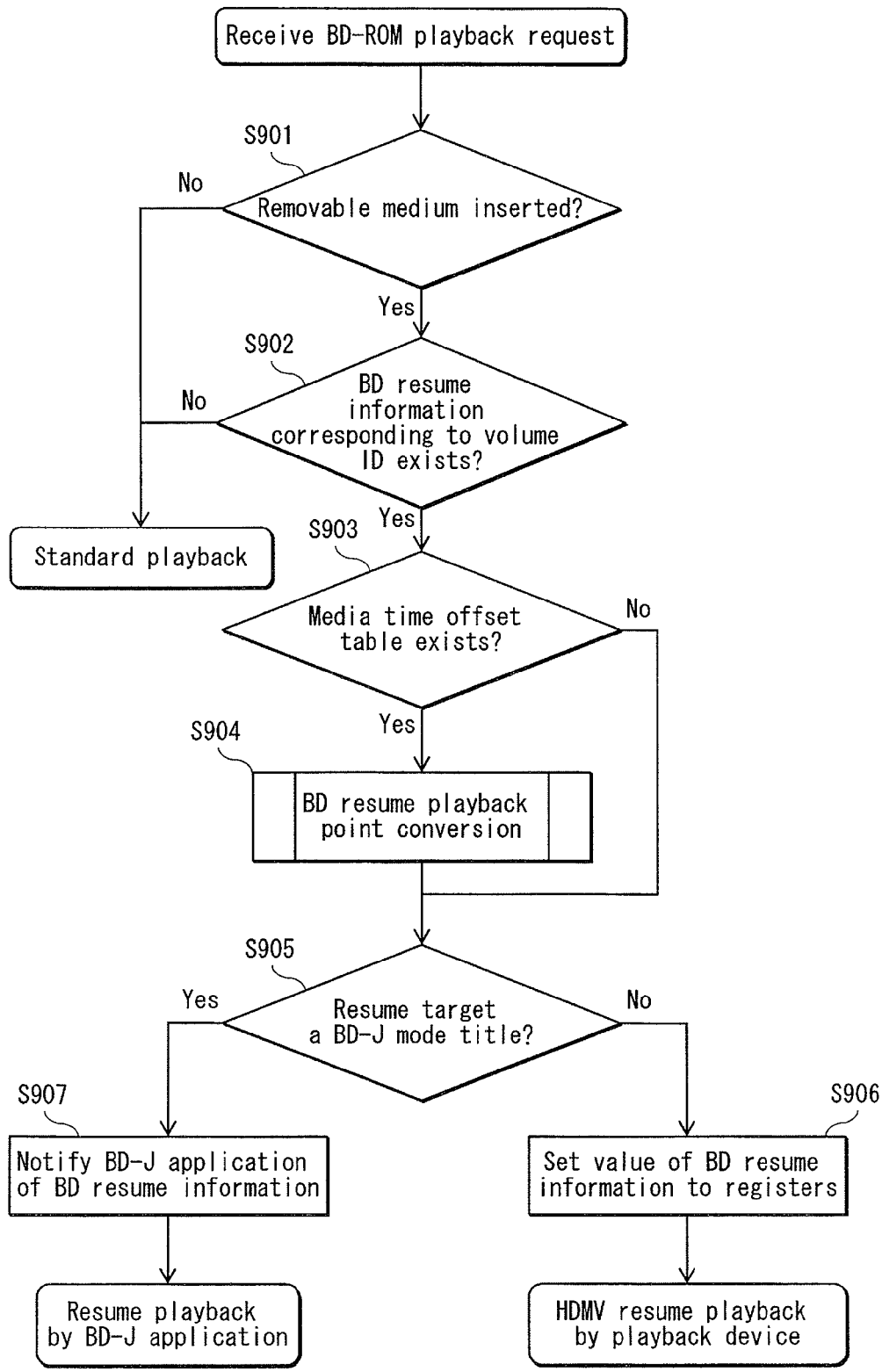
FIG. 36 is a flowchart illustrating the procedures taking place from when a BD-ROM playback request has been received to when playback is launched according to an AV playback library in embodiment 5 of the present invention.

FIG. 36 is a flowchart illustrating processing taking place from a point where a BD-ROM playback request is made to a point where playback is launched by the AV playback library. First, when a BD-ROM playback request is received, the playback device checks whether or not a removable medium has been inserted (Step S901). When a removable medium is not inserted, the playback device launches standard playback.

When it is confirmed in Step S901 that a removable medium has been inserted, the playback device then checks whether BD resume information corresponding to a BD-ROM currently inserted exists on the removable medium (Step S902). More specifically, the playback device conducts a search on the removable medium for BD resume information including a description of the same volume ID as the volume ID of the BD-ROM currently being inserted. When, as a result of the search, no BD resume information is found including a description of the same volume ID as the BD-ROM, the playback device launches standard playback.

When it is judged in Step S902 that BD resume information including a description of the same volume ID as the BD-ROM currently inserted exists, the playback device further checks whether a media time offset table is included in the BD resume information (Step S903).

When it is judged in Step S903 that a media time offset table is included in the BD resume information, the playback device executes BD resume playback point conversion processing (Step S904).

Following the execution of the BD resume playback point conversion processing in Step S904, or following the judgment that no media time offset table is included in the BD resume information in Step S903, the playback device checks the description of the mode of the title included in the resume state storage file of the BD resume information, and further judges whether the resume target title is an HDMV mode title or a BD-J mode title (Step S905).

When it is judged in Step S905 that the resume target title is an HDMV mode title, the playback device sets the contents of the resume state storage file included in the BD resume information to the registers (PSR (0) to PSR (12)). Further, when the resume playback point conversion processing has been executed in Step S904, the converted resume playback point is set to PSR(8) (Step S906). When values have been set to the registers, the playback device launches resume playback of the HDMV title.

When it is judged in Step S905 that the resume target title is a BD-J mode title, the playback device notifies the BD-J application of the contents of the resume state storage file included in the BD resume information. In addition, when the resume playback point conversion processing has been executed in Step S904, the playback device notifies the BD-J application of the converted resume playback point as well. Subsequently, the BD-J application launches resume playback of the BD-J title according to the resume information received from the playback device (Step S907).

Figure 37:
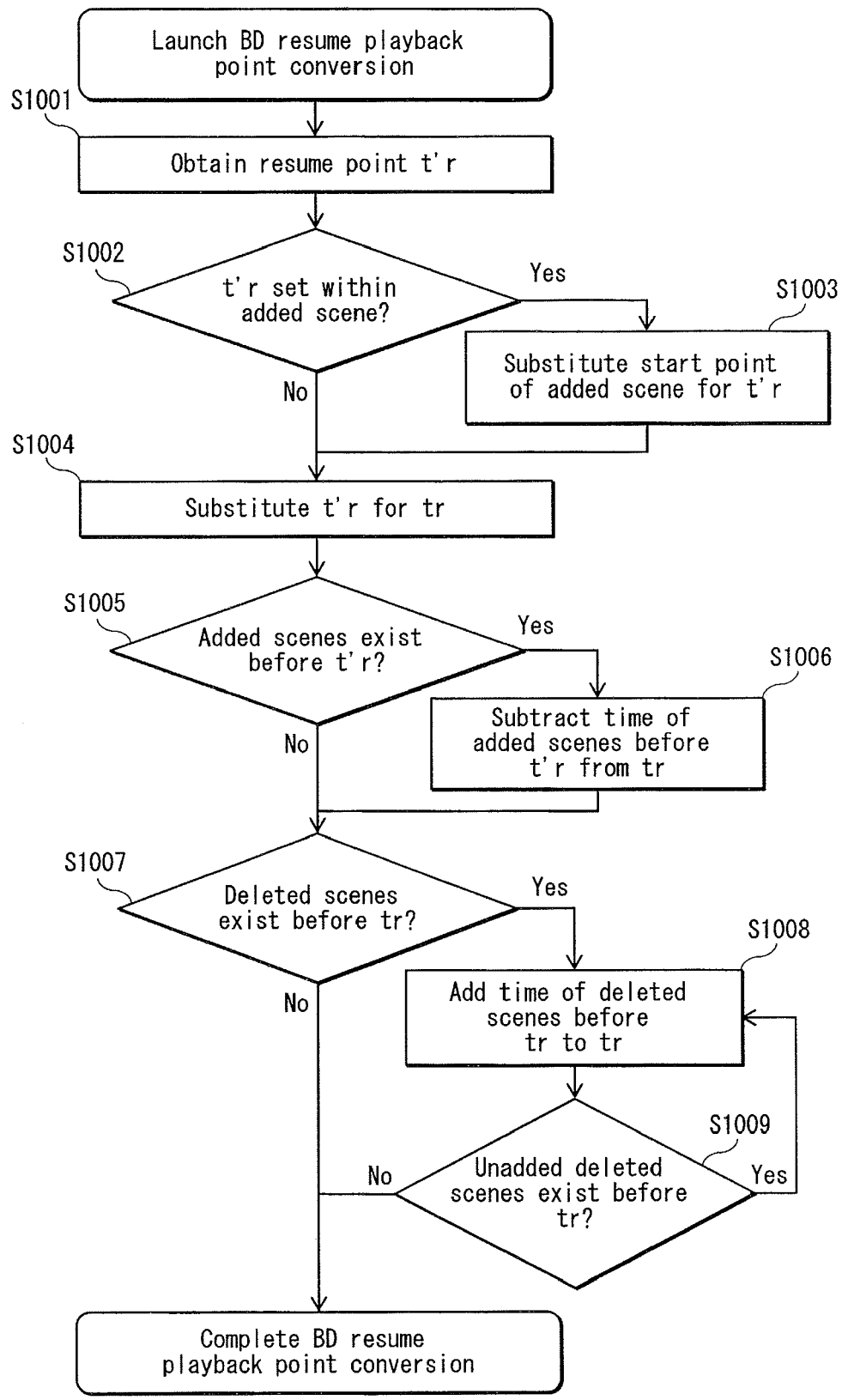
FIG. 37 is a flowchart illustrating a BD resume playback point conversion processing in embodiment 5 of the present invention.

FIG. 37 is a flowchart illustrating processing included in the BD resume playback point conversion processing of Step S904. Description of Step S904 has been made in the above with reference to the flowchart of FIG. 36. Generally, the resume playback point "tr" of the original content is calculated according to the resume playback point "t'r" of the digital copy content by performing processing which is a reverse of the resume playback point conversion processing described in the above with reference to FIG. 29.

First, the playback device specifies a digital copy content which corresponds to the BD resume information which includes the description of the same volume ID as that of the BD-ROM currently inserted. Further, the playback device obtains a resume playback point "t'r" on the digital copy content from the scenario file of the specified digital copy contents (Step S1001). The specification of the digital copy content is performed by searching for a digital copy content having the same program directory name as the name of the directory in which the BD resume information is stored. For instance, when the BD resume information is stored in a directory "mnt/sdcard/PRIVATE/DCOPY/PRG001", the digital copy content "mnt/sdcard/SD_VIDEO/PRG001" having the same program directory name "PRG001" is the corresponding digital copy content.

Subsequently, the playback device judges whether the resume playback point "t'r" of the digital copy content is set within the added scenes listed in the media time offset table (Step S1002). If the "t'r" is located within an added scene, the start point of the added scene is substituted for "t'r" (Step S1003). For instance, if the value "t'r" obtained in Step S1001 is 2000 s, and an added scene with an added section of 1900 s-2100 s is included in the media time offset table, the point (2000 s) set to the value "t'r" is located within the added section of 1900 s-2100 s. Thus, in step 1003, the value of "t'r" is reset to the value 1900 s which indicates the start point of the added section. The value "t'r" is reset to a value not belonging within the added section in such a manner since, when the resume playback point is located within an added time section, the resume playback point will not exist on the original content, and accordingly, the conversion processing following this point cannot be performed. One way of solving this problem is performing playback of the content back from the beginning of the content without performing resume playback when returning to viewing on a stationary playback from viewing on a portable terminal in cases where the resume playback point is located within an added time section. In such a case, a judgment is made that the resume playback being requested is invalid. However, the flowchart of FIG. 37 illustrates processing where resume playback is performed in as many cases as possible, and in a case where the resume playback point is located within an added time section, the value of "t'r" is reset to a value located within a valid range on the original content in Step S1003.

Subsequently, the playback device substitutes the "t'r" obtained in Step S1001 or the value "t'r" reset in Step S1003 for the value 'tr" of the candidate resume playback point after conversion (Step S1004). Note that, at this point, the resume playback point "tr" after conversion remains yet unfixed.

When Step S1004 has been completed, the playback device checks whether an added scene exists before "t'r" (Step S1005). For instance, when the value of "t'r" is 1900 s, and there exist two added sections before the point "t'r", which are 0 s-100 s and 1000 s-1200 s, the sum of the two sections calculated as (100−0)+(1200−1000)=300 s is subtracted from the value "tr" (Step S1006). Since the value "t'r" has been substituted for "tr" in Step S1004, when the value "tr" before subtraction is 1900 s, which is equal to the value "t'r", the value "tr" after subtraction is 1600 s.

Subsequently, the playback device checks whether a deleted scene exists before "tr" (Step S1007). When "tr" is located in a range corresponding to a deleted scene X, it is determined that the deleted scene X is located before "tr". For instance, when the value of "tr" is 1600 s, and there exist two sections of deleted scenes before "tr", which are 0 s-200 s and 1500 s-1700 s, it is determined that both deleted scenes exist before "tr".

When it is judged in Step S1007 that one or more deleted scenes exist before "tr", the sum of the one or more deleted scenes is added to "tr" (Step S1008). Similar to the aforementioned example, when there are two sections of deleted scenes existing before "tr", the deleted sections being from 0 s-200 s and 1500 s-1700 s, the sum of the two sections, which is calculated as (200−0)+(1700−1500)=400 s, is added to the value "tr". Therefore, the "tr" value after performing the addition is 2000 s.

When Step S1008 is completed, a comparison is once again performed between the obtained "tr" and the deleted scenes, and the playback device checks whether or not other deleted scenes, which have not yet been added, exist before "tr" (Step S1009). For instance, here it is supposed that 3 deleted scenes exist before "tr" (2000 s), the deleted scenes indicated by the time sections: 0 s-200 s, 1500 s-1700 s, and 1900 s-2100 s. Note that in Step 1009, when "tr" is located within a range corresponding to a deleted scene X as in Step S1007, the playback device determines that the deleted scene X is located before "tr". That is, it is judged that the time section 1900 s-2100 s exists before "tr", which is set to 2000 s in this example. In the above example, the deleted scenes of 0 s-200 s and 1500 s-1700 s among the three time sections 0 s-200 s, 1500 s-1700 s, and 1900 s-2100 s have already been added. As such, it is determined that the deleted scene to be added here is the deleted scene of 1900 s-2100 s, and the adding of Step S1008 is performed once again. As a result, the value of "tr" is calculated as 2000+(2100−1900)=2200 s.

The processing in Steps S1008 and S1009 is performed repeatedly, up until when it is judged that all of the deleted scenes existing before "tr" have been added. At the point where such a judgment is made, the value "tr" at the point is adopted as the resume playback point after conversion.

The above structure enables continuous viewing (resume playback) not only in cases where viewing shifts from viewing on a stationary playback device to viewing on a portable terminal, but also in cases where viewing returns to viewing on a stationary playback device from viewing on a portable terminal.

Embodiment 6

In the present embodiment, description will be made on an embodiment of the present invention regarding multi-language compatible digital copying. Note that in embodiment 6, description of aspects similar to embodiments 1 through 5 is omitted, and therefore only aspects which differ from embodiments 1 through 5 are described hereinafter. Accordingly, aspects not particularly described in embodiment 6 should be considered to be similar to those in embodiments 1 through 5.

Figure 38:
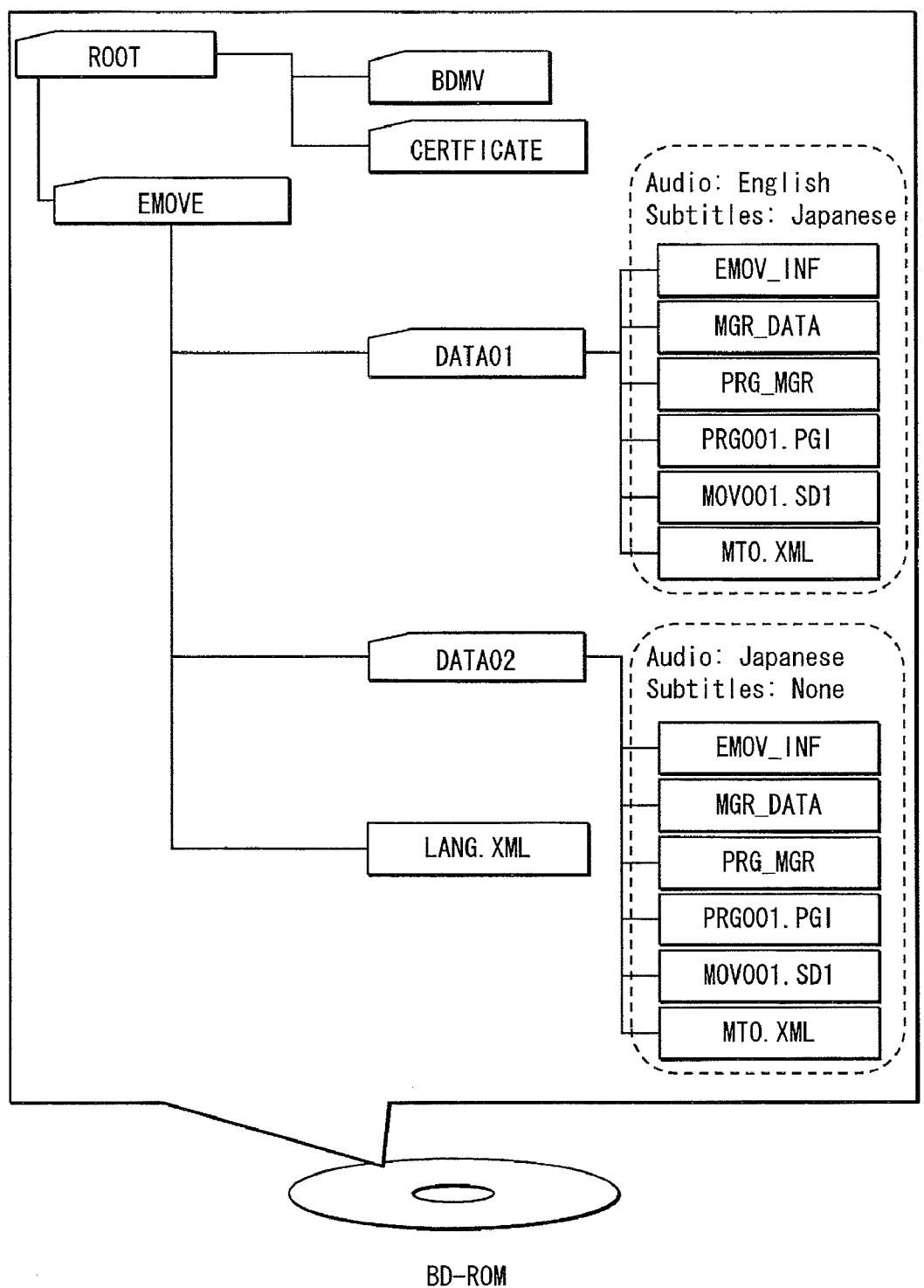
FIG. 38 illustrates a file structure of a BD-ROM in embodiment 6 of the present invention.

FIG. 38 illustrates a file structure of the BD-ROM of embodiment 6 of the present invention. In the DATA01 directory, a digital copy content with English audio and Japanese subtitles is stored, and in the DATA02 directory, a digital copy content with Japanese audio and no subtitles is stored. The LANG.XML file located directly below the EMOVE directory is a file in which a language table is recorded. The language table indicates which language each digital copy content corresponds to.

FIG. 39 illustrates one example of the language table. The language table includes a description of the storage location of each digital copy content and a description of a language which each digital copy content corresponds to. The storage location may indicate directories on the local storage as well as directories on the BD-ROM. When indicating a directory on the BD-ROM, a description of a relative path from the root directory of the BD-ROM is provided, whereas when indicating a directory on the local storage, a description of a relative path from the CertID directory is provided. So as to make it possible to judge whether the description of the relative path is that on a BD-ROM or that on a local storage, a description of the type of storage (BD or LS) is provided in addition to each of the relative paths. The language information includes a description of the audio language and subtitle language included in each digital copy content.

Figure 40:
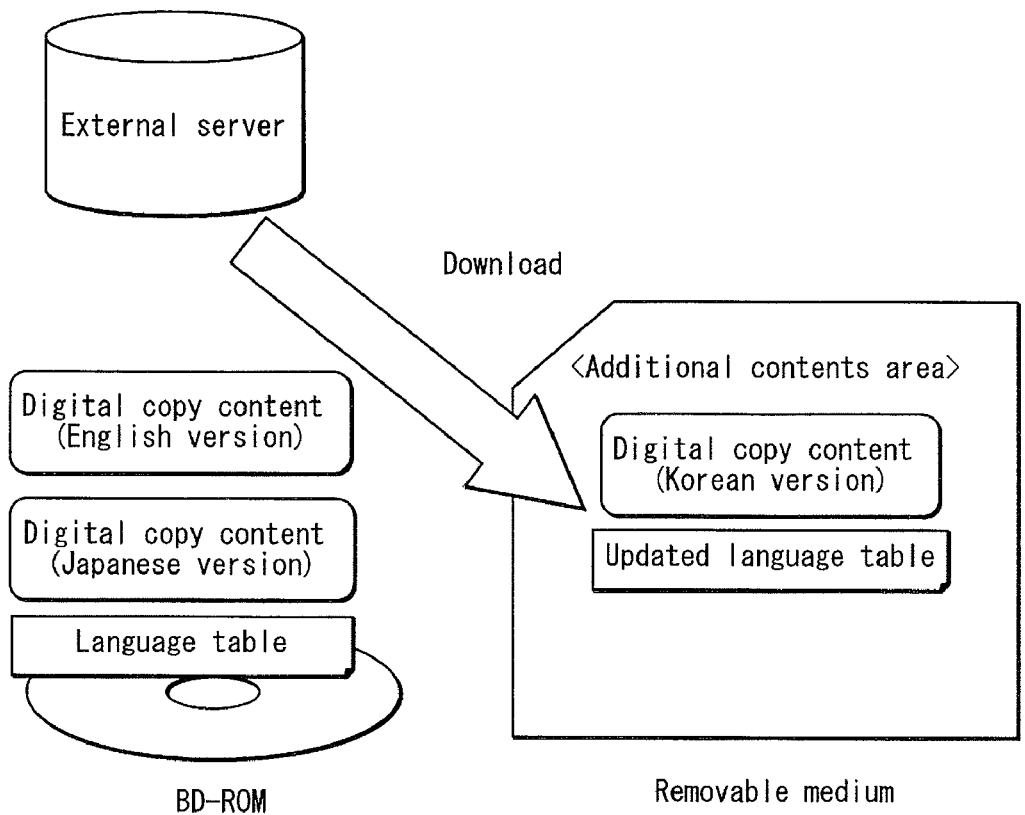
FIG. 40 illustrates how digital contents of additional languages are downloaded to a local storage in embodiment 6 of the present invention.

FIG. 40 illustrates how digital copy content of an additional language is downloaded to the local storage. Here, it is undesirable that a large number of digital copy contents is stored onto the BD-ROM from the start. In such a case, a large proportion of the capacity of the BD-ROM will be occupied by the digital copy contents, and thus, the proportion left for storing original contents would be limited to a small amount. When the capacity remaining on the BD-ROM for original contents is limited to a small proportion as in such a case, there is a risk that the quality of the original contents is reduced. Such reduction of content quality is brought about by, for instance, the reduction of the bit rate of a digital stream. In consideration of such problems, it is preferable that digital contents corresponding to a minimal number of languages are stored on the BD-ROM, and additional digital copy contents are downloaded as necessary.

Here, when downloading additional digital copy contents, an updated version of the language table is to be downloaded in addition. For instance, when digital copy contents of an English version and a Japanese version exist on the BD-ROM, and when a digital copy content of a Korean version is additionally downloaded to the local storage, an updated language table including the Korean version is to be downloaded as well as the content itself.

Figure 41:
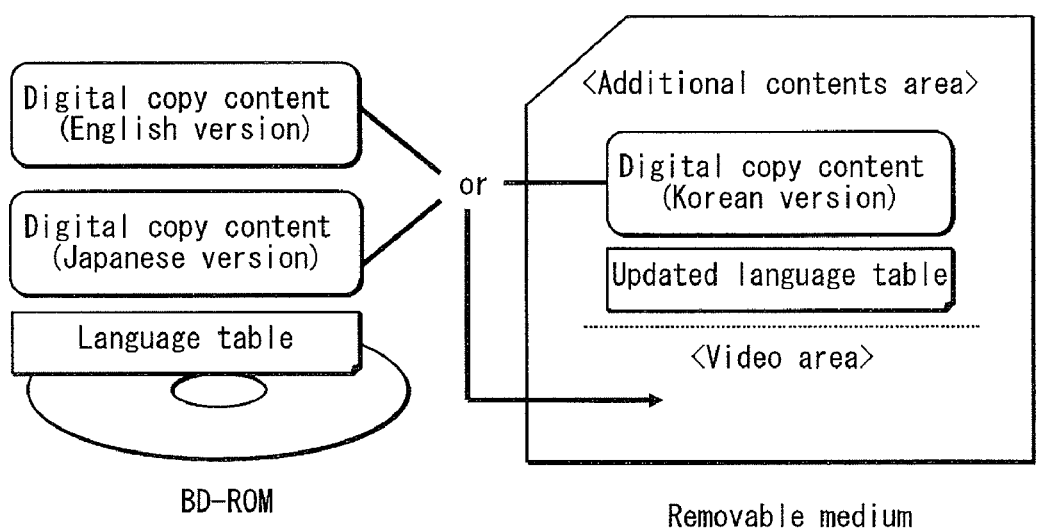
FIG. 41 illustrates how multi-language compatible digital copying is performed.

FIG. 41 illustrates how multi-language compatible digital copying of the present embodiment is performed. As is illustrated in FIG. 41, the digital copy module copies digital copy contents either stored on the BD-ROM or the additional contents area of the removable medium to the video area of the removable medium.

The content in a copy target language is selected by the BD-J application or the digital copy module, according to the system parameters indicating playback status stored in the PSR set 421 and the language table. More specifically, the BD-J application and the digital copy module read: PSR(16) which indicates an audio stream language code; PSR(17) which indicates a subtitle stream language code; and PSR(18) which indicates a menu language code, and select a content of a language corresponding to each of the language codes further referring to the language table.

Figure 42A:
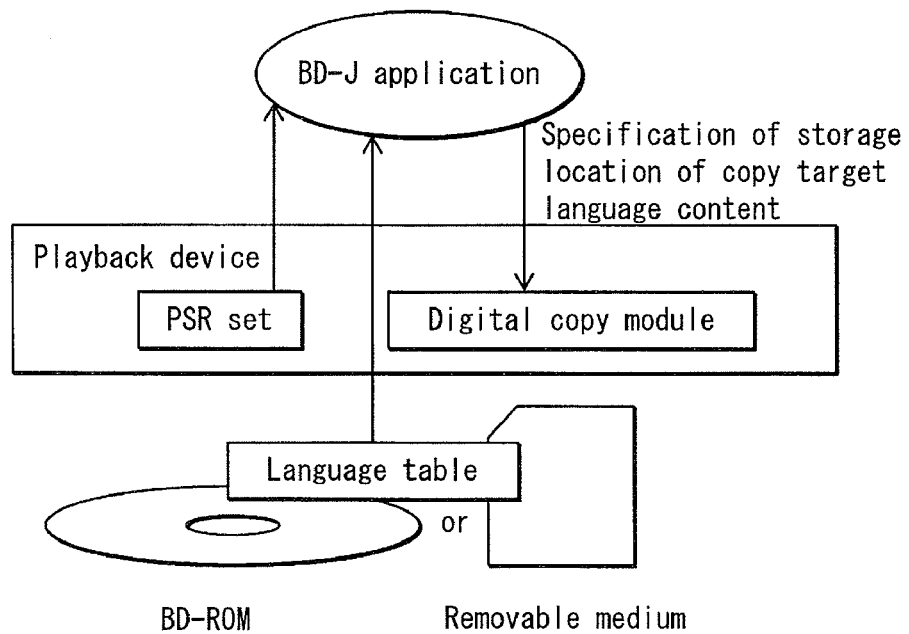
FIG. 42 illustrates how a copy target content is selected in embodiment 6 of the present invention.
Figure 42B:
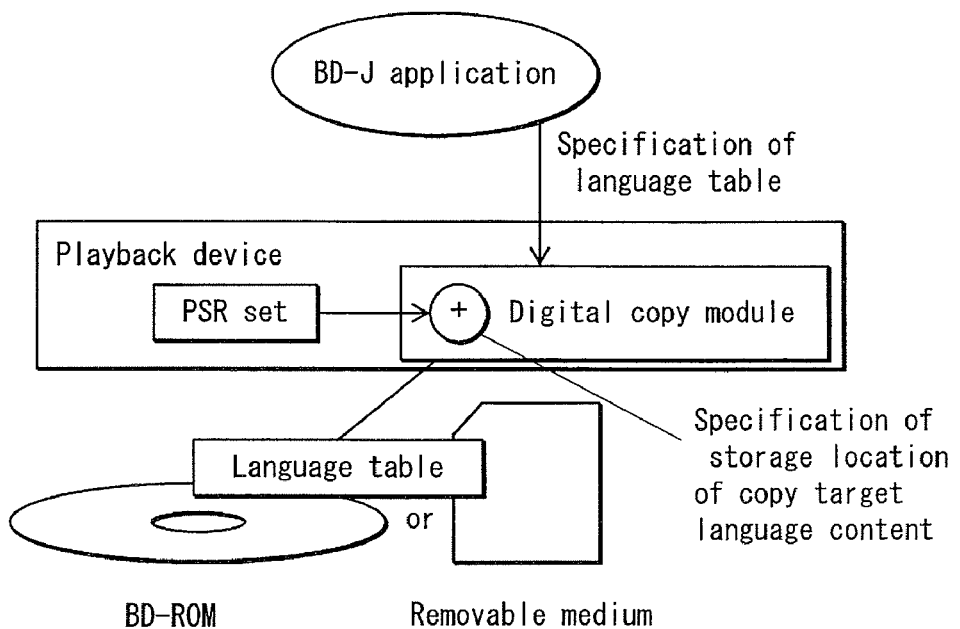

FIGS. 42A and 42B illustrate how a selection of copy target content is performed in embodiment 6. There are two patterns as to how the selection of copy target content is performed. The first pattern of the selection of the copy target content is illustrated in FIG. 42A. In the first pattern, the BD-J application refers to the language table and the PSR set 421, determines the storage location of a content corresponding to the desired language, and specifies, to the digital copy module, the storage location of the content by using the SET_SRCLOCATION command. The second pattern of the selection of copy target contents is illustrated in FIG. 42B. In the second pattern, the BD-J application makes a specification of the language table to be used in the digital copying to the digital copy module, and the digital copy module refers to the specified language table and the PSR set 421 to specify the storage location of the content corresponding to the desired language. In the second pattern, digital copying is performed in such a manner.

In the specification of the language table by the BD-J application to the digital copy module, the following command or the like is used:
SET_LANGTABLE
"/mnt/sdcard/BUDA/081A24ED/12345ABC/DIGITAL-COPY/NEW_LANG.XML".
The above command is an instruction requesting for execution of digital copying using the language table recorded in a location on the SD card indicated by: "BUDA/081A24ED/12345ABC/DIGITALCOPY/NEW_LANG.XML". The digital copy module conducts a comparison between the specified language table and the language preferences stored in the PSR set 421 to determine the digital copy content to be copied. For instance, when the language preferences stored in the PSR set 421 indicate English, an English version content is copied, and when the language preferences indicates Japanese, a Japanese version content is copied as the target of the digital copy.

Figure 43:
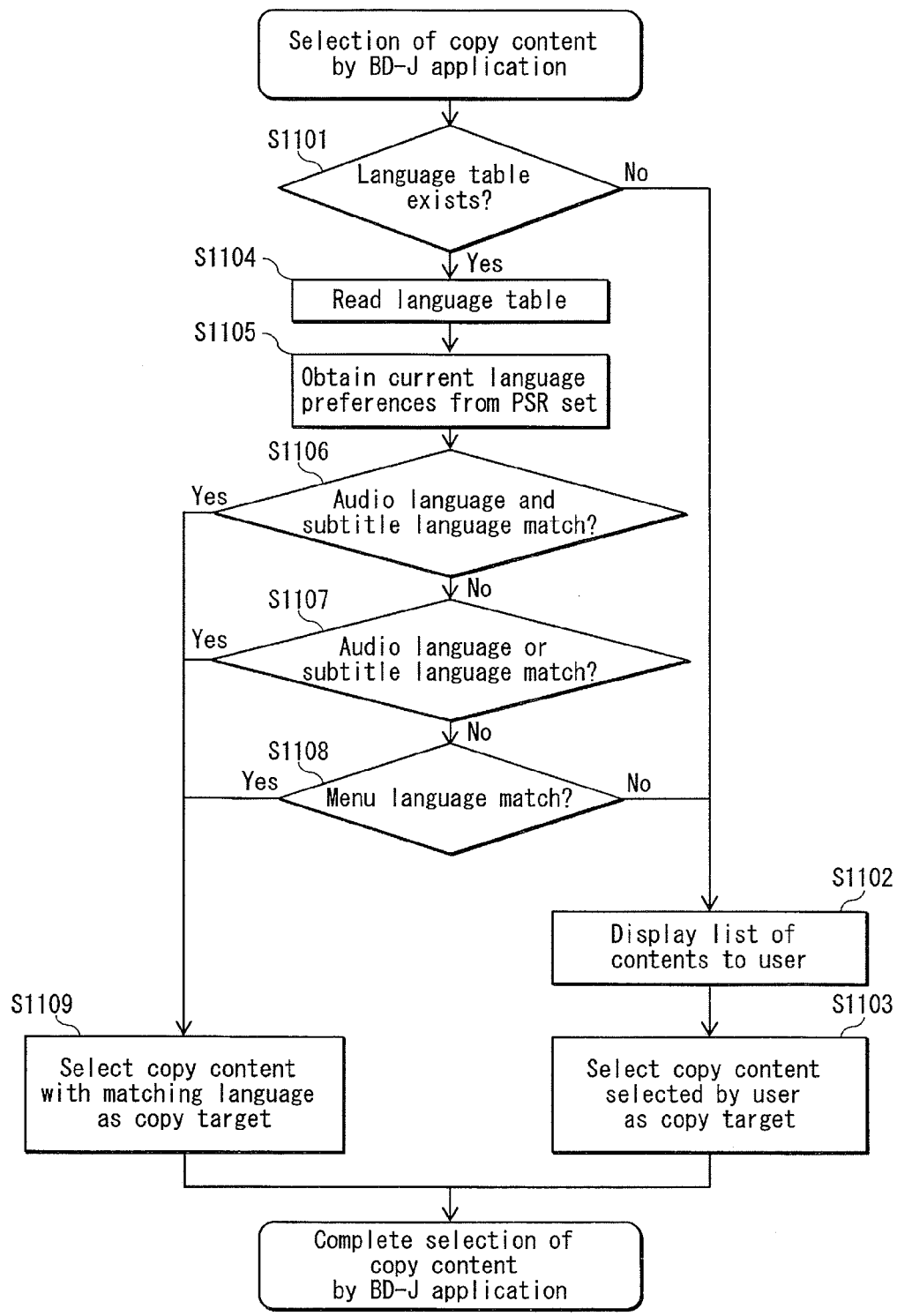
FIG. 43 is a flowchart illustrating the selection of a copy target content performed by the BD-J application in embodiment 6 of the present invention.

First, description is provided on the first pattern of multi-language compatible digital copying which is illustrated in FIG. 42A. FIG. 43 is a flowchart illustrating the selection of the copy target content performed by the BD-J application. In the selection of the digital copy content to be copied, the BD-J application, firstly, checks whether a language table exists by utilizing the file I/O module 705 (Step S1101). A search of the language table is conducted with respect to either the BD-ROM or the removable medium. When a digital copy content has been additionally downloaded to the removable medium, a search is conducted with respect to the updated language table existing in the removable medium. When, as a result of the search, no language table exists, mapping between the digital copy content and the language corresponding thereto cannot be performed. Thus, the BD-J application presents a list of digital copy contents which can be copied to the user, and waits for a selection to be made by the user (Step S1102). When a selection is made by the user, the BD-J application specifies the digital copy content having been selected by the user as the copy target (Step S1103).

When it is judged in Step S1101 that a language table exists, the BD-J application reads the language table using the file I/O module 705 (Step S1104). Subsequently, the BD-J application obtains the language information set to the playback device by the user from the PSR set 421 (Step S1105). Note that, an audio stream language code can be obtained from PSR(16), a subtitle stream language code can be obtained from PSR(17), and a menu language code can be obtained from PSR(18).

Next, the BD-J application performs a comparison between the language table read in Step S1104 and the language preferences stored in the PSR set 421. In detail, first, the BD-J application checks whether the audio stream language code stored in PSR (16) and the audio language included in the language table match, and whether the subtitle stream language code stored in PSR (17) and the subtitle language included in the language table match, and searches for a digital copy content having a matching audio language and a matching subtitle language (Step S1106). When there is no digital copy content having both a matching audio language and a matching subtitle language, the BD-J application searches for a digital copy content having either a matching audio language or a matching subtitle language (Step S1107). When there is no digital copy content having a matching audio language or a matching subtitle language, the BD-J application searches for a digital copy content whose menu language code stored in PSR(18) matches either the subtitle language or the audio language included in the language table (Step S1108).

When a digital copy content is found whose language preference in the PSR set 421 matches the language included in the language table through the search conducted in Steps S1106 through S1108, the digital copy content is specified as the copy target (Step S1109). In contrast, when a copy target digital copy content is not found through the search conducted in Steps S1106 through S1108, the BD-J application does not perform the selection of a digital copy content. Instead, the BD-J application presents a list of digital copy contents which can be copied to the user, and waits for a selection to be made by the user (Step S1102).

Note that search may be conducted with respect to other search targets in addition to the search targets searched in the processing of Steps S1106-S1108. Such additional search targets may include: the audio stream number of PSR(1): the subtitle stream number of PSR(2): and the values of the respective backup registers (PSRs (21) and (22)) of PSRs (1) and (2). Further, in a case where a plurality of digital copy contents having matching languages are found, the user may be urged to select the copy target digital copy content. Especially, it depends to a great extent on the user's preference whether a dubbed version or a subtitled version of a content is preferred. Thus, in a case where a plurality of target digital copy contents are found through the successive execution of Steps S1106-S1108, the user may be presented with a list of digital copy contents which are available for copying, and urged to select one content from the list according to user preference. The user may either be prompted to make a selection of copy target content every time a digital copy is to be executed, or be inquired beforehand whether he/she prefers a dubbed version or a subtitled version. In the latter case, the results of the inquiry may be recorded and held in a local variable within the BD-J application or on the local storage. Thus, the selection of copy target content prior to the execution of digital copying may be skipped, and instead, the copy target digital copy content may be determined according to the user preferences stored in the BD-J application. This concludes the description on the first pattern of multi-language compatible digital copying which is illustrated in FIG. 42A. In the following, description is provided on the second pattern of multi-language compatible digital copying which is illustrated in FIG. 42B.

FIG. 44 is a flowchart illustrating the selection of copy content performed by the digital copy module. When making the selection of a digital copy content to be copied from the playback device, the digital copy module firstly makes a judgment of whether a specification of a language table is made from the BD-J application (Step S1201). The SET_LANGTABLE command is used by the BD-J application in the specification of a language table. When a specification of a language table has been made from the BD-J application, the digital copy module reads the specified language table (Step S1202).

When it is judged that a specification of a language table has not been made from the BD-J application in Step S1201, the digital copy module judges whether a language table exists either on the BD-ROM or the removable medium (Step S1203). When digital copy contents have been additionally downloaded to the removable medium, a search is conducted with respect to the updated language table existing in the removable medium. When a language table is found to exist on the BD-ROM or on the removable medium, the digital copy module reads the language table found (Step S1204).

When, as a result of the search, no language table exists, mapping between the digital copy content and the languages corresponding thereto cannot be performed. Thus, the digital copy module presents a list of digital copy contents which can be copied to the user, and waits for a selection to be made by the user (Step S1205). When a selection is made by the user, the digital copy module specifies the digital copy content having been selected by the user as the copy target (Step S1206).

When the reading of a language table in either Step S1202 or S1204 has been completed, the digital copy module conducts a comparison between the language table which has been read and the language preferences stored in the PSR set 421. In detail, first, the digital copy module checks whether the audio stream language code stored in PSR (16) and the audio language stored in the language table match, and whether the subtitle language code stored in PSR (17) and the subtitle language included in the language table match, and searches for a digital copy content having a matching audio language and a matching subtitle language (Step S1207). When there is no digital copy contents having both a matching audio language and a matching subtitle language, the digital copy module searches for a digital copy content having either a matching audio language or a matching subtitle language (Step S1208). When there is no digital copy content having a matching audio language or a matching subtitle language, the digital copy module searches for a digital copy content whose menu language code stored in PSR(18) matches either the subtitle language or the audio language included in the language table (Step S1209).

When a digital copy content is found whose language preference in the PSR set 421 matches the language included in the language table through the search conducted in Steps S1207 through S1209, the digital copy content is specified as the copy target (Step S1210). In contrast, when a copy target digital copy content is not found through the search conducted in Steps S1207 through S1209, the digital copy module presents a list of digital copy contents which can be copied to the user, and waits for a selection to be made by the user (Step S1205). This concludes the description on the second pattern of multi-language compatible digital copying, where the digital copy module performs the selection of copy content.

The above-described structure of the present embodiment enables multi-language compatible digital copying. This is made possible by specifying a copy target digital copy content while taking language into consideration, or more specifically, by using the language preferences stored in the playback device and the language table provided along with digital copy contents.

(Supplement)

Although the present invention has been fully described in the above according to exemplary embodiments thereof, it is to be understood that the present invention is not limited to its exemplary embodiments, and such changes and modifications as introduced in the following can be made without departing from the spirit and scope thereof.

(a) The present invention may be an application execution method which is disclosed through the processing procedures described in each of the embodiments. In addition, the present invention may be a computer program which includes a program code for running a computer according to the above-described processing procedures.

(b) The present embodiment may be structured as a package of integrated circuits such as an IC, an LSI or the like which performs application execution control. Such a package of integrated circuits may be incorporated in various devices, and thereby the various devices may realize each of the functions described in the embodiments. Further, the method applied for forming integrating circuits is not limited to the LSI, and the present invention may also be realized on a dedicated circuit or a general purpose processor. For instance, the present invention may be realized on a FPGA (Field Programmable Gate Array) being an LSI which can be programmed after manufacturing, or a reconfigurable processor being a LSI reconfiguration of which could be made to the connection of internal circuit cells and settings. Further in addition, if a new technology of circuit integration replacing that of the LSI emerges as a result of the progress made in the field of semiconductor technology or technology deriving therefrom, the integration of function blocks may be performed applying such technology. At present, there is a possibility of biotechnology being applied to induce the future development of circuit integration technology.

(c) In the above-described embodiments, description has been made on a playback device which only has a playback function for playing back contents on a recording medium. However, the present invention is not limited to this, and the device may be, for instance, a recording and playback device provided with a recording function.

(d) In the above described embodiments, Java™ has been applied as the programming language for the virtual machine. However, the present invention is not limited to this, and other programming languages may be applied besides Java™, such as the B-Shell used in the UNIX™ OS and the like, the Perl Script, and the ECMA Script.

(e) In the above-described embodiments, description has been made on a playback device for playing back BD-ROMs. However, the same effects as produced in the above-described embodiments may be yielded when a writable optical recording medium having the necessary data as recorded on the BD-ROM in the above-described embodiments is played back.

(f) In the above-described embodiments, description is made on the copy source recording medium taking a BD-ROM and a writable optical recording medium as specific examples. However, the present invention is not limited to this, and the copy source recording medium may be a removable medium, namely a portable recording medium such as an SD memory card, a memory stick, a Compact Flash™, a SmartMedia™, and a multimedia card.

When a removable medium is used as the copy source recording medium, the removable medium is to be provided with an area (user area) in which data equivalent to that having the directory structure recorded in the volume area illustrated in FIG. 2 is recorded, as well as the protection area and the system area illustrated in FIG. 6.

Further, in such a case, contents for portable terminals recorded on the copy source removable medium is copied to the copy destination removable medium. As a matter of course, the copy source removable medium and the copy destination removable medium are separate.

When a BD-ROM is used as the copy source recording medium, according to the above-described embodiments, for instance, the key information reading unit 602 reads PMSN (Pre-recorded Media Serial Number) indicating the physical serial ID of the recording medium from the copy source 801, or more specifically, from the BCA (Burst Cutting Area) which is a special area provided on the BD-ROM. On the other hand, when a removable medium is used as the copy source recording medium, information (a media ID) unique to the copy source removable medium may be read instead of the PMSN.

As could be seen from the above example, by replacing the BD-ROM which is the copy source recording medium with the removable medium, and replacing the serial ID of the BD-ROM which is the copy source medium with the information (a media ID) unique to a removable medium in the description provided in the above embodiments and in the drawings, the description and the drawings will read as describing the operations performed when a removable medium is used as the copy source recording medium.

Also, when a removable medium is used as the copy source recording medium, among the data recorded in the area (user area) for storing data equivalent to that having the directory structure recorded in the volume area of the BD-ROM, a certain portion of the data (for instance, stream data) is encrypted.

Furthermore, when a removable medium is used as the copy source recording medium, data may be recorded in the user area in advance, before the removable medium is distributed. In such a case, in a case where a certain portion of data among the data recorded in the user area is encrypted, a decryption key, which includes key information (a title key) to be used to decrypt the encrypted data, is to be recorded in the protected area of the copy source recording medium in advance, before the removable medium is distributed. Further, in such a case, the decryption key should be encrypted such that decryption thereof can be performed by using an MKB in the system area of the copy source recording medium.

Alternatively, when a removable medium is used as the copy source recording medium, data may not be recorded in the user area in advance before the removable medium is distributed, but data equivalent to that having the directory structure recorded in the volume area of the BD-ROM may be recorded in the user area after the distribution, upon receiving a download request or the like. The device that is used to request a download may be the playback device described in the above embodiments, or may be a terminal device differing from the playback device described in the above embodiments that is for performing downloads. In such a case, first, a distributed removable medium is inserted into the device that is used to request a download, and while the removable medium is electrically connected with the device, the device reads the media ID and MKB from the removable medium and transmits the read data to the distribution server, in addition to making the request to download data. The distribution server then returns a piece of data which corresponds to a decryption key to the device that has transmitted the download request. The piece of data is generated by using the media ID and MKB of the removable medium. The device that transmitted the download request records the received piece of data into the user area of the removable medium, and records a received public key file into the protected area of the removable medium. In such a case, if a certain portion of data among the data to be recorded in the user area is encrypted, a decryption key, which includes key information (a title key) to be used to decrypt the encrypted data, is to be recorded in the protected area of the copy source recording medium. Further, in such a case, the decryption key is to be encrypted such that decryption thereof can be performed by using the MKB in the system area of the copy source recording medium.

By making such configurations as have been described in the above, a removable medium may be used as the copy source recording medium.

Furthermore, when making such a configuration, even if only contents for portable terminals recorded in the user area is recorded onto another removable medium in a method that is different from the methods presented in the embodiments, playback by thereof by the execution of unauthorized copying can be prevented. This is since other removable media do not have information regarding the decryption key recorded thereon.

If, by any chance, the decryption key is also recorded onto other removable media as well, the MKB of the other removable media would still differ from the MKB of the copy source removable medium. Thus, the encrypted decryption key cannot be decrypted, and the data recorded in the user area of the copy source removable medium can be prevented from being used in an unauthorized manner.

Although the present invention has been fully described by way of example with reference to accompanying drawings, it is to be noted that various changes and modifications will be apparent to those skilled in the art. Therefore, unless otherwise such changes and modifications depart from scope of the present invention, they should be constructed as being included therein.

INDUSTRIAL APPLICABILITY

The present invention provides a playback device which incorporates a technology (digital copying) which allows video data recorded on a first recording medium for the purpose of viewing on a portable terminal to be recorded to a second recording medium which differs from the first recording medium. What characterizes the present invention is that playback of contents can be performed seamlessly, between viewing on a stationary playback device and viewing on a portable terminal. Further, the present invention is particularly usable in the movie industry and the commercial device industry, both of which being related to the creation of image contents.

REFERENCE SIGNS LIST

| | |
|---|---|
| 101 | playback device |
| 102 | remote controller |
| 103 | output monitor |
| 104 | removable medium |
| 105 | BD-ROM |
| 106 | portable terminal |
| 401 | read-only BD drive |
| 402 | reading control unit |
| 403 | demultiplexer |
| 404 | video decoder |
| 405 | video plane |
| 406 | audio decoder |
| 407 | image memory |
| 408 | image plane |
| 409 | image decoder |
| 410 | adder |
| 411 | static scenario memory |
| 412 | dynamic scenario memory |
| 413 | HDMV module |
| 414 | BD-J module |
| 415 | UO detection module |
| 416 | mode management module |
| 417 | dispatcher |
| 418 | rendering engine |
| 419 | writing control unit |
| 420 | AV playback library |
| 421 | PSR set |
| 422 | network interface |
| 423 | local storage |
| 424 | digital copy module |
| 601 | communication management unit |
| 602 | key information reading unit |
| 603 | media state management unit |

-continued

| | |
|---|---|
| 604 | copy execution unit |
| 605 | copy state notification unit |
| 606 | copy progress management unit |
| 608 | key information writing unit |
| 610 | free capacity judging unit |
| 701 | BD-J application |
| 702 | digital copy library |
| 704 | media playback module |
| 705 | file I/O module |
| 706 | network module |
| 707 | application manager |
| 801 | copy source disc |
| 802 | copy destination medium |
| 803 | digital copy server |

What is claimed is:

1. A playback apparatus for playing back a first content recorded on a first recording medium, the playback apparatus comprising:
   a reading unit configured to read an application recorded on the first recording medium;
   a platform unit configured to execute the application;
   a copy unit configured to execute copy processing of a second content recorded on the first recording medium; and
   a register configured to store a parameter indicating a playback point on the first content, the playback point on the first content updated as the playback of the first content progresses,
   wherein the platform unit includes a communication programming interface for use by the application, and
   the application (i) reads the parameter from the register, (ii) establishes a socket connection with the copy unit by using the communication programming interface, and (iii) causes the copy unit to execute the copy processing via the socket connection, the copy processing including copying of the second content to a second recording medium and setting of a playback point on the copied second content, the playback point on the copied second content specified by the application according to the parameter.

2. The playback apparatus of claim 1, wherein
   the first recording medium has an on-media library recorded thereon, the on-media library providing the application with a copy-control programming interface, the application using the copy-control programming interface to cause the copy unit to execute the copy processing via the communication programming interface,
   when the application issues a call using the copy-control programming interface, the on-media library (i) converts the call into a socket command, (ii) outputs the socket command to the copy unit, (iii) converts a response from the copy unit into a signal, the signal being one of a return value and an event, and (iv) returns the signal to the application, and
   the socket connection constitutes a communication path on which the socket command and the response are transferred.

3. The playback apparatus of claim 1, wherein
   the second recording medium is provided with a first directory and a second directory, the first directory being provided for storing the copied second content and the second directory being provided for storing another parameter indicating the playback point on the copied second content, and
   the application causes the copy unit to copy the second content to the first directory and to set the playback point on the copied second content by writing the parameter to the second directory as the other parameter.

4. The playback apparatus of claim 1, wherein
   the application specifies the playback point on the copied second content by converting the parameter into another parameter suitable for the second recording medium, the conversion being a unit conversion.

5. The playback apparatus of claim 1, wherein
   the first recording medium has recorded thereon an offset table indicating an offset between the first content and the second content,
   the application specifies the playback point on the copied second content by converting the parameter according to the offset table, and
   the copy unit sets, as the playback point on the copied second content, a playback point on the copied second content indicated by the converted parameter.

6. The playback apparatus of claim 5, wherein
   the offset table includes location information of a scene added and a scene deleted in a digital stream constituting the second content with respect to a digital stream constituting the first content, and
   the application converts the parameter into the converted parameter according to the location information.

7. The playback apparatus of claim 1 further comprising a playback control unit, wherein
   the first recording medium has recorded thereon a volume ID that identifies the first content,
   the copy unit writes the volume ID to the second recording medium when copying the second content to the second recording medium, and
   upon loading of a recording medium, the playback control unit (i) judges whether the volume ID recorded on the first recording medium and a volume ID recorded on the recording medium match, (ii) only when the result of the judgment is affirmative, reads, from the recording medium, a new parameter indicating a playback point on a content recorded on the recording medium, (iii) sets the new parameter as the parameter stored in the register, and (iv) launches playback of the first content from the playback point indicated by the parameter.

8. The playback apparatus of claim 7, wherein
   the first recording medium has recorded thereon differential information indicating a difference between the first content and the second content, and
   the playback control unit, converts the new parameter according to the differential information, and overwrites the parameter with the new parameter so converted.

9. The playback apparatus of claim 1, wherein
   the register stores an audio language code and a subtitle language code of a digital stream constituting the first content in addition to the parameter,
   the second content is constituted from a plurality of digital streams each being in a different language, and
   the application (i) reads the audio language code and the subtitle language code from the register, (ii) specifies, from among the digital streams constituting the second content, a digital stream having an audio language and a subtitle language respectively matching the audio language code and the subtitle language code read from the register, and (iii) causes the copy unit to execute copying of the digital stream so specified to the second recording medium.

10. The playback apparatus of claim 9, wherein
the first recording medium has recorded thereon language information defining correspondence between each of the digital streams constituting the second content and an audio language and a subtitle language, and
the application specifies, from among the digital streams constituting the second content, a digital stream having an audio language and a subtitle language respectively matching the audio language code and the subtitle language code read from the register according to the language information in addition to the audio language code and the subtitle language code.

11. A non-transitory recording medium that has recorded thereon a computer readable program for causing a computer to playback a first content recorded on a first recording medium, the computer readable program causing the computer to execute operations comprising:
reading an application recorded on the first recording medium;
causing a platform unit of the computer to execute the application; and
causing a copy unit of the computer to execute copy processing of a second content recorded on the first recording medium wherein
the application (i) reads a parameter indicating a playback point on the first content from a register of the computer, the playback point on the first content updated as the playback of the first content progresses, (ii) establishes a socket connection with the copy unit by using a communication programming interface included in the platform unit, (iii) causes the copy unit to execute the copy processing via the socket connection, the copy processing including copying of the second content to a second recording medium and setting of a playback point on the copied second content, the playback point on the copied second content specified by the application according to the parameter.

12. A playback method for executing playback of a first content recorded on a first recording medium, the playback method comprising:
reading an application recorded on the first recording medium;
causing a platform unit of a computer to execute the application; and
causing a copy unit of the computer to execute copy processing of a second content recorded on the first recording medium wherein
the application (i) reads a parameter indicating a playback point on the first content from a register of the computer, the playback point on the first content updated as the playback of the first content progresses, (ii) establishes a socket connection with the copy unit by using a communication programming interface included in the platform unit, (iii) causes the copy unit to execute the copy processing via the socket connection, the copy processing including copying of the second content to a second recording medium and setting of a playback point on the copied second content, the playback point on the copied second content specified by the application according to the parameter.

13. A non-transitory recording medium that has recorded thereon: a first content that is subject to playback; and an application, wherein
the application is executed by a platform unit of a playback apparatus, the platform unit including a communication programming interface used by the application
the application (i) reads a parameter indicating a playback point on the first content from a register of the playback apparatus, the playback point on the first content updated as playback of the first content progresses, (ii) establishes a socket connection with a copy unit of the playback apparatus by using the communication programming interface, (iii) causes the copy unit to execute copy processing of a second content, recorded on the non-transitory recording medium that is different from the first content, via the socket connection, the copy processing including copying of the second content to another recording medium and setting of a playback point on the copied second content, the playback point on the copied second content specified by the application according to the parameter.

* * * * *